(12) United States Patent
Sato et al.

(10) Patent No.: US 12,179,249 B2
(45) Date of Patent: Dec. 31, 2024

(54) MANUFACTURING METHOD OF MEMBER, MANUFACTURING METHOD OF MEMBER FOR VEHICLE, AND DIE AND PUNCH

(71) Applicant: NIPPON STEEL CORPORATION, Tokyo (JP)

(72) Inventors: Masahiko Sato, Tokyo (JP); Tohru Yoshida, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 473 days.

(21) Appl. No.: 17/442,938

(22) PCT Filed: Mar. 27, 2020

(86) PCT No.: PCT/JP2020/014336
§ 371 (c)(1),
(2) Date: Sep. 24, 2021

(87) PCT Pub. No.: WO2020/203899
PCT Pub. Date: Oct. 8, 2020

(65) Prior Publication Data
US 2022/0126349 A1 Apr. 28, 2022

(30) Foreign Application Priority Data

Mar. 29, 2019 (JP) ................................ 2019-066238
Mar. 29, 2019 (JP) ................................ 2019-066239

(51) Int. Cl.
*B21D 22/26* (2006.01)
*B21C 37/08* (2006.01)
(Continued)

(52) U.S. Cl.
CPC .............. *B21D 22/26* (2013.01); *B21C 37/08* (2013.01); *B21D 5/01* (2013.01); *B21D 51/10* (2013.01); *B21D 53/88* (2013.01)

(58) Field of Classification Search
CPC ........ B21D 5/01; B21D 5/015; B21D 11/203; B21D 22/26; B21D 51/10; B21D 53/88;
(Continued)

(56) References Cited

U.S. PATENT DOCUMENTS 4,148,426 A * 4/1979 Midzutani ........... B21C 37/0815
228/151
4,294,095 A * 10/1981 Kawano ................... B21D 5/01
72/368
(Continued)

FOREIGN PATENT DOCUMENTS

EP  1 698 407 A1  9/2006
EP  3 195 951 A1  7/2017
(Continued)

OTHER PUBLICATIONS

JP 03-161117A, Matsumura et al. Jul. 1991.*
(Continued)

*Primary Examiner* — Edward T Tolan
(74) *Attorney, Agent, or Firm* — Birch, Stewart, Kolasch & Birch, LLP

(57) ABSTRACT

A manufacturing method of a member according to an aspect of the present invention is a manufacturing method of a member including a specific three-dimensional tubular portion, the manufacturing method including: a U-forming step of performing U-forming on metal material sheet using a U-forming die and punch including a U-forming punch to manufacture a U-formed article having a recessed cross-sectional shape; and an O-forming step of causing side end portions of the U-formed article to abut each other by an O-forming die to form abutting portions, in which a forming condition ratio a=Du/Do is set to 0.85 to 0.95.

9 Claims, 45 Drawing Sheets

(51) Int. Cl.
   *B21D 5/01* (2006.01)
   *B21D 51/10* (2006.01)
   *B21D 53/88* (2006.01)

(58) Field of Classification Search
   CPC ... B21C 37/0815; B21C 37/16; B21C 37/185;
   B21C 37/08
   USPC .................................................. 72/51, 389.1
   See application file for complete search history.

(56) References Cited

U.S. PATENT DOCUMENTS

| | | | | |
|---|---|---|---|---|
| 7,231,792 | B2 * | 6/2007 | Shitamoto | B21C 37/08 |
| | | | | 72/368 |
| 9,327,327 | B2 * | 5/2016 | Shinmiya | B21C 37/16 |
| 11,148,183 | B2 * | 10/2021 | Sato | B21D 5/01 |
| 2015/0224842 | A1 | 8/2015 | Matsumoto et al. | |

FOREIGN PATENT DOCUMENTS

| | | |
|---|---|---|
| JP | 3114918 B2 | 12/2000 |
| JP | 2004-141936 A | 5/2004 |
| JP | 2005-169486 A | 6/2005 |
| JP | 2012-115905 A | 6/2012 |
| JP | 2018-167283 A | 11/2018 |
| WO | WO 2014/033933 A1 | 3/2014 |

OTHER PUBLICATIONS

Translation JP 03-161117A, Matsumura et al. Jul. 1991.*
JP 03-291115A, Sekido Dec. 1991.*
Translation JP 03-191115A, Sekido Dec. 1991.*
JP 59-209425A Nishino et al. Nov. 1984.*
Kawada et al., "Analysis of Profile of the Blank After O-Forming-Study of the Press Forming of a Circular Tube from Sheet VII-", Journal of the Japan Society for Technology of Plasticity, 1980, vol. 21, No. 230, pp. 234-240.

* cited by examiner

TENSILE STRAIN
COMPRESSIVE STRAIN

→ ← TENSILE STRAIN
→ ← COMPRESSIVE STRAIN

⟵ ⟶ TENSILE STRAIN
⟶ ⟵ COMPRESSIVE STRAIN

←——→ TENSILE STRAIN
—→←— COMPRESSIVE STRAIN $$a_i = \frac{\text{WIDTH Du OF PRESS FORMING PUNCH D12}}{\text{WIDTH Do OF LOWER DIE RECESSED PART D31A OF ABUTTING PORTION FORMING DIE D30}}$$

← → TENSILE STRAIN
→ ← COMPRESSIVE STRAIN

← → TENSILE STRAIN
→ ← COMPRESSIVE STRAIN

⟵ ⟶ TENSILE STRAIN
⟶ ⟵ COMPRESSIVE STRAIN

⟵——⟶ TENSILE STRAIN
——⟶ ⟵—— COMPRESSIVE STRAIN $$a_i = \frac{\text{WIDTH } D_u \text{ OF BENDING FORMING PUNCH D12'}}{\text{WIDTH } D_o \text{ OF LOWER DIE RECESSED PART D31A'} \\ \text{OF ABUTTING PORTION FORMING DIE D30'}}$$

MANUFACTURING METHOD OF MEMBER, MANUFACTURING METHOD OF MEMBER FOR VEHICLE, AND DIE AND PUNCH

TECHNICAL FIELD OF THE INVENTION

The present invention relates to a manufacturing method of a member for forming a tubular portion from a metal material sheet, a manufacturing method of a member for a vehicle, and a die and punch.

Priority is claimed on Japanese Patent Application Nos. 2019-066238 and 2019-066239, filed Mar. 29, 2019, the contents of which are incorporated herein by reference.

RELATED ART

As is well known, in the automobile industry, various vehicle suspensions have been put into practical use depending on the application.

For example, a torsion beam type suspension device has a configuration including a torsion beam Assy that rotatably supports left and right steel wheels with an arm and allows one end of a spring to be disposed in the vicinity of the left and right ends thereof, the spring that connects the torsion beam and the vehicle body, and an absorber.

In the torsion beam Assy, for example, left and right trailing arms forming a pair that rotatably supports the left and right steel wheels are connected by the torsion beam, and spring receiving portions forming a pair are formed in the vicinity of the left and right ends of the torsion beam.

The torsion beam Assy is connected to the vehicle body via pivot shafts extending from the left and right sides of the vehicle body toward the center, so that the left and right steel wheels oscillate with respect to the vehicle body.

One end side of the spring is disposed in the spring receiving portion, and the load received from the road surface is transmitted to the vehicle via the steel wheels, the trailing arms, and the springs. Therefore, for example, the trailing arm undergoes a large load, and is required to have high strength.

As described above, a member for a vehicle (for example, a link member) such as the trailing arm is required to have high strength, and is also required to be lightweight. For this reason, a complex tubular shape is required. For example, there are cases where a member for a vehicle has a specific three-dimensional tubular portion in which at least any one of a circumferential length change rate changing portion in which the change rate of the circumferential length (the circumferential length of a cross section orthogonal to a centroid line) changes along the centroid line, a cross-sectional shape changing portion in which the shape of the cross section orthogonal to the centroid line changes along the centroid line, or a curved portion in which the centroid line has a curvature is formed. In the related art, in a case where a tubular member for a vehicle is manufactured from a metal material sheet, a joint portion is often welded after forming by multiple steps of press working including trimming therein, so that it cannot be easily said that a cost reduction is easy (for example, refer to Patent Documents 1 and 2).

On the other hand, in the manufacturing of a thick straight round pipe, such as a line pipe, a UO-forming method in which a steel sheet (metal material sheet) is subjected to cross-sectional U-shaped U-forming (for example, press forming or bending forming) and is then subjected to O-forming into a round pipe (tubular body) having a circular cross section has been used (for example, refer to Patent Document 3).

In addition, regarding the circularity after an abutting portion forming step for the straight round pipe and the adhesion of a seam portion, the influence of the ratio a (=Du/Do, hereinafter referred to as the forming condition ratio a) based on the width Du of a U-forming punch and the recessed part width Do of an O-forming die (abutting portion forming die) has been sufficiently examined in terms of both aspects of analysis and experiment and has been technically established (for example, refer to Non-Patent Document 1).

In recent years, in the above-mentioned UO-forming method, there has been a demand for a technique for efficiently manufacturing a member (member for a vehicle) having the above-mentioned specific three-dimensional tubular portion.

PRIOR ART DOCUMENT

Patent Document

[Patent Document 1] Japanese Patent No. 3114918
[Patent Document 2] Japanese Unexamined Patent Application, First Publication No. 2012-115905
[Patent Document 3] Japanese Unexamined Patent Application, First Publication No. 2004-141936

Non-Patent Document

[Non-Patent Document 1] "Analysis of Shape of Formed Article (Katsumi Kawada, Yasutoshi Tozawa)" (Plasticity and Processing, vol. 21, no. 230 (1980), P234 to P240

DISCLOSURE OF THE INVENTION

Problems to be Solved by the Invention

However, for example, the technique described in Patent Document 3 targets a thick straight round pipe (API X60 or more, the ratio of thickness/exterior shape is 4% or more) and discloses that UO-forming is performed by setting a forming condition ratio a (=Du/Do) based on the width Du of a press forming punch and the recessed part width Do of an O-forming die to 0.7 or less (preferably 0.65 or less) in order to improve circularity, but is not suitable as, for example, a technique for causing abutting scheduled portions of the above-mentioned specific three-dimensional tubular portion to abut each other at high accuracy.

Furthermore, it can be said that it is impossible to manufacture a member including a three-dimensional shape such as a member for a vehicle having the above-mentioned specific three-dimensional tubular portion by using, for example, ultrahigh tensile strength steel.

In addition, in a thin tubular portion (the ratio of thickness/outer diameter is 10% or less) such as a member for a vehicle, when the above-mentioned forming condition ratio a (=Du/Do) is too small, the closed cross section after an abutting portion forming step has an elongated oval shape, resulting in a decrease in circularity. Therefore, there is a problem that application to a thin member is difficult.

Moreover, research results described in Non-Patent Document 1 also targets a straight round pipe, and application to a tubular portion including a three-dimensional shape other than a round pipe having a straightly continuous circular closed cross section, for example, the above-mentioned specific three-dimensional tubular portion is difficult.

In a case of manufacturing a member having the above-mentioned specific three-dimensional tubular portion by applying UO-forming, there are cases where a gap is generated between abutting portions (joining scheduled portions) due to springback. Therefore, in joining the abutting portions, it is necessary to perform the joining after minimizing the gap generated between the abutting portions by restraining the abutting portions. However, in this case, it is necessary to restrain the abutting portions during the joining, which causes problems that the workability is deteriorated and the productivity is lowered, such as jigs for restraining the pipe becoming complex.

In particular, a high strength thin steel sheet, which is desirably applied to a member for a vehicle, has a large springback and causes a large gap between the abutting portions, so that it is extremely difficult to bring the three-dimensional shape of the tubular portion into close contact with a jig or the like. For this reason, there is a demand for a technique capable of efficiently manufacturing the above-mentioned member by bringing the abutting scheduled portions of a tubular portion having a three-dimensional shape or a deformed cross section, particularly the above-mentioned specific three-dimensional tubular portion, into close contact with each other at high accuracy.

The present invention has been made in consideration of such circumstances, and an object thereof is to provide a manufacturing method of a member in which a member including the above-described specific three-dimensional tubular portion can be efficiently formed (manufactured) by processing a metal material sheet, a manufacturing method of a member for a vehicle, and a die and punch.

Means for Solving the Problem

In order to solve the above problems, this invention proposes the following means.

According to an aspect of the present invention, there is provided a manufacturing method of a member for manufacturing a member which includes a specific three-dimensional tubular portion including at least any one of a cross-sectional shape changing portion in which a cross-sectional shape of a tubular portion changes along a centroid line, a circumferential length change rate changing portion in which a circumferential length of the tubular portion changes along the centroid line and a change rate of the circumferential length changes, and a curved portion in which the centroid line of the tubular portion has a curvature, by processing a metal material sheet, the manufacturing method including: a U-forming step of performing U-forming on the metal material sheet using a U-forming die and punch including a U-forming punch to manufacture a U-formed article having a recessed cross-sectional shape; and an O-forming step of causing side end portions of the U-formed article to abut each other by an O-forming die to form abutting portions, in which a forming condition ratio a=Du/Do which is a ratio of a punch width Du of a portion of the U-forming punch corresponding to the specific three-dimensional tubular portion to a recessed part width Do of a portion of the O-forming die corresponding to the specific three-dimensional tubular portion is set to 0.85 to 0.95.

According to another aspect of the present invention, there is provided a manufacturing method of a member for a vehicle, including: applying the manufacturing method of a member.

According to another aspect of the present invention, there is provided a die and punch used in the manufacturing method of a member, including: the U-forming die and punch; and the O-forming die, in which the forming condition ratio a is set to 0.85 to 0.95.

According to the manufacturing method of a member, the manufacturing method of a member for a vehicle, and the die and punch according to the aspects of the present invention, since the forming condition ratio a=Du/Do which is the ratio of the width Du of the press forming punch used when forming the U-formed article from the metal material sheet in the U-forming step to the recessed part width (the width of an abutting portion forming recessed part) Do of the O-forming die used in the O-forming step of causing the side end portions of the U-formed article to abut each other is set to 0.85 to 0.95, the springback can be appropriately suppressed, and the side end portions of the specific three-dimensional tubular portion formed in the O-forming step can be accurately and efficiently brought into close contact with each other or approach a target position. Here, in a case where the forming condition ratio a is less than 0.85, the springback of the specific three-dimensional tubular portion becomes excessive, and the closed cross section (cross section perpendicular to a longitudinal direction) of the specific three-dimensional tubular portion significantly deviates from the target shape. For example, in a case where the target shape is a true circle, the closed cross section becomes an elongated oval shape, resulting in a decrease in circularity. In a case where the forming condition ratio a exceeds 0.95, the side end portions of the specific three-dimensional tubular portion formed in the O-forming step are not sufficiently brought into close contact with each other.

In addition, after the O-forming step, the end portions of abutting scheduled portions are brought into close contact with each other or disposed close to the target state and thus can be efficiently joined to each other without a complex jig or the like.

In addition, since the forming condition ratio a is set to less than 1.0, the U-formed article can be easily disposed in the O-forming die.

As a result, a tubular portion formed of a specific three-dimensional tubular portion or a tubular portion of which at least a portion is formed of a specific three-dimensional tubular portion can be efficiently formed. Furthermore, a reduction in the weight of the member and the member for a vehicle can be easily achieved and the manufacturing cost can be reduced.

Here, the U-forming die and punch may have a press forming punch which is the U-forming punch, and a press forming recessed die in which a press forming recessed part corresponding to the press forming punch is formed, and the U-forming step may include press forming step of relatively moving the press forming punch in a direction toward the press forming recessed die to form the metal material sheet into a press-formed article having a recessed cross-sectional shape portion and an extending portion extending outward from both side end portions of the recessed cross-sectional shape portion, and a flangeless forming step of removing the extending portion from the press-formed article to manufacture the U-formed article.

In this specification, press forming refers to forming a press-formed article by the press forming punch and the press forming recessed die in which the press forming recessed part is formed. More specifically, press forming refers to pressing a metal material sheet on the outer side (side portion) of the press forming recessed part by a metal material pressing tool (for example, a blank holder), relatively moving (advancing) the press forming punch in a direction toward the press forming recessed die, and while pressing an extending portion extending outward from the end portions of the press forming recessed part, forming a recessed cross-sectional shape portion in the metal material sheet.

In addition, the flangeless forming step refers to forming a press-formed article without the extending portion (=flangeless press-formed article), and includes, for example, in addition to a step of removing a flange-shaped extending portion extending outward from both side end portions having a recessed cross-sectional shape after the press forming by trimming or the like, a step of pressing the extending portion temporarily formed during the press forming into the press forming recessed part to be formed as a portion of the recessed cross-sectional shape portion, a step of bending-forming the extending portion that has been temporarily formed to be formed as a portion of the recessed cross-sectional shape portion, and the like. The flangeless press-formed article is a form of the press-formed article, and is sometimes simply referred to as a press-formed article.

In this specification, causing the abutting scheduled portions to abut each other includes, in addition to bringing the corresponding side end portions of the flangeless press-formed article into close contact with each other, for example, forming a gap (target interval) at which joining can be performed by welding or the like, forming a gap in a portion of the side end portions which are in close contact with each other, disposing the side end portions close to each other at a predetermined gap over the entire length.

In a case where a gap is formed, the interval of the gap may be formed so that a portion of a section in which the gap is formed is different from other portions. That is, the interval of the gap does not have to be constant over the entire section.

In addition, the U-forming die and punch may have a bending forming punch which is the U-forming punch, and a bending forming recessed die in which a bending forming recessed part corresponding to the bending forming punch is formed, and in the U-forming step, the bending forming punch may be relatively moved in a direction toward the bending forming recessed die to manufacture the U-formed article.

In this specification, bending forming refers to forming a U-formed portion by the bending forming punch and the bending forming recessed die, and more specifically, forming without pressing the metal material sheet by a blank holder or the like when pressing the metal material sheet by the bending forming punch. That is, the purpose of bending forming is not to form an extending portion (flange portion) extending outward from both side end portions of the metal material sheet having a recessed cross-sectional shape, or an excess thickness portion by drawing.

In this specification, the longitudinal direction is a direction in which a long member (for example, a member having a specific three-dimensional tubular portion) extends. The centroid line refers to a line connecting the centroids of the minimum cross sections (that is, the cross sections orthogonal to the longitudinal direction) having the minimum cross-sectional area in each portion of the tubular portion in the longitudinal direction.

It is needless to say that the advancing and retreating directions of the press forming punch in the press forming step and the relative movement directions of a first recessed die and a second recessed die (dies constituting the O-forming die) in the O-forming step do not need to be directions orthogonal to the centroid line.

The cross-sectional shape of the tubular portion is the shape of a cross section orthogonal to the centroid line (longitudinal direction) of the tubular portion. The circumferential length changing portion refers to a portion in which the circumferential length defined as being orthogonal to the centroid line in the tubular portion (that is, the length of an outer circumferential circle of a cross section orthogonal to the centroid line (longitudinal direction)) changes along the centroid line, and can be specified by a change in the circumferential length between any two points along the centroid line.

In addition, in the circumferential length changing portion, (the percentage of) a numerical value obtained by dividing the difference between the circumferential lengths at any two points set along the centroid line by the length between the two points along the centroid line is referred to as a circumferential length change rate.

The circumferential length change rate changing portion refers to a portion in which the circumferential length change rate changes along the centroid line.

Here, the flangeless forming step may be performed by further advancing the press forming punch after forming the recessed cross-sectional shape portion and the extending portion in the press forming step.

According to this aspect, since the flangeless forming step is performed by further advancing the press forming punch after forming the recessed cross-sectional shape portion and the extending portion in the press forming step, the extending portion necessary for pressing the metal material sheet can be formed into the flangeless press-formed article without taking the press-formed article out of the U-forming die and punch.

As a result, it is not necessary to provide a step of trimming the extending portion necessary for pressing the metal material sheet, and it is possible to efficiently form a flangeless formed article, thereby improving productivity.

In addition, a counter of the press forming recessed die may be caused to advance and retreat along the advancing and retreating directions of the press forming punch with respect to the press forming recessed part.

Here, the press forming recessed die may be provided with the counter.

According to this aspect, since the press-formed article can be sandwiched between the counter of the press forming recessed die and the press forming punch, the press-formed article can be efficiently manufactured.

In addition, in the cross-sectional shape changing portion, a change in the length in a direction including the centroid line of the cross-sectional shape (the shape of a cross section orthogonal to the centroid line of the tubular portion) and an abutting portion (that is, the length of a line segment that passes through the centroid of the cross section and the abutting portion and intersects the outer circumference of the cross section) along the centroid line may be 10% to 50%.

Here, the die and punch may be designed so that the cross-sectional shape changing portion has the above-mentioned properties.

According to this aspect, the cross-sectional shape changing portion is a cross-sectional shape changing portion in which the change in the length in the direction (=press forming direction) including the centroid line of the cross-sectional shape and an abutting portion along the centroid line is 10% to 50%, and a member including a cross-sectional shape changing portion that is not easily formed can be efficiently manufactured.

Here, the cross-sectional shape changing portion refers to a portion in which the cross-sectional shape orthogonal to the centroid line changes along the centroid line.

The change in the cross-sectional shape in the cross-sectional shape changing portion is represented by (the percentage of) a numerical value obtained by dividing the difference between the lengths in the direction including the centroid line of the cross-sectional shape and the abutting portion at any two points set along the centroid line by the length between the two points along the centroid line.

In addition, the change in the circumferential length change rate between a first end portion and a second end portion of the circumferential length change rate changing portion may be 0.035 mm$^{-1}$ to 0.35 mm$^{-1}$.

Here, the die and punch may be designed so that the circumferential length change rate changing portion has the above-mentioned properties.

According to this aspect, a member in which the change in the circumferential length change rate between the first end portion and the second end portion of the circumferential length change rate changing portion is set to 0.035 mm$^{-1}$ to 0.35 mm$^{-1}$ and thus forming is difficult can be efficiently manufactured.

Here, the circumferential length change rate changing portion is a portion in which the circumferential length change rate of a tubular portion changes along the centroid line, and mathematically, refers to a portion in which the circumferential length change rate obtained by differentiating a circumferential length change amount along the centroid line changes along the centroid line.

In addition, the change (numerical value) in the circumferential length change rate between the first end portion and the second end portion of the circumferential length change rate changing portion is defined by a value (absolute value) obtained by dividing the difference in circumferential length change rate between the first end portion (start point) and the second end portion (end point) of the circumferential length change rate changing portion by the interval (length or dimension) along the centroid line between the first end portion and the second end portion.

The circumferential length change rate can be calculated based on, for example, a curved surface shape measured by a shape measuring instrument or data measured by another measuring method. Other parameters related to the shape of the present invention can be measured by the same method.

In addition, the curvature of the centroid line at the curved portion may be in a range of 0.002 mm$^{-1}$ to 0.02 mm$^{-1}$.

Here, the die and punch may be designed so that the curved portion has the above-mentioned properties.

According to this aspect, a member including a curved portion that includes a portion in which the curvature of the centroid line in the tubular portion is in a range of 0.002 mm$^{-1}$ to 0.02 mm$^{-1}$ and thus cannot be easily formed can be efficiently manufactured.

In addition, the forming condition ratio a may change along the centroid line of the specific three-dimensional tubular portion.

Here, the die and punch may be designed so that the forming condition ratio a has the above-mentioned properties.

According to this aspect, since the forming condition ratio a changes along the centroid line of the specific three-dimensional tubular portion, the side end portions can be accurately and efficiently brought into close contact with each other or approach a target position over the entire length of the abutting portions of the specific three-dimensional tubular portion.

The manufacturing method of a member according to this aspect may further include: a forming condition ratio setting step performed in one or a plurality of cycles before the U-forming step, in which, in the forming condition ratio setting step, a finite element analysis is performed in consideration of conditions including the forming condition ratio a set in the forming condition ratio setting step in a previous cycle or an initial value of the forming condition ratio a, material properties of the member, a shape and a sheet thickness of the metal material sheet, forming conditions in the U-forming step, and forming conditions in the O-forming step to estimate a shape parameter including a strain amount generated in the U-forming step in a direction along the centroid line of the specific three-dimensional tubular portion, a strain amount generated in the O-forming step in the direction along the centroid line of the specific three-dimensional tubular portion, and relative positions of the side end portions, and the forming condition ratio setting step is repeated until the shape parameter satisfies desired conditions.

Here, the die and punch may be designed based on the forming condition ratio a designed by the forming condition ratio setting step.

According to this aspect, the finite element analysis is performed in consideration of the conditions including the forming condition ratio a, the material properties of the member, the shape and the sheet thickness of the metal material sheet, the forming conditions in the U-forming step, and the forming conditions in the O-forming step to estimate the shape parameter including the strain amount generated in the U-forming step in the direction along the centroid line of the specific three-dimensional tubular portion, the strain amount generated in the O-forming step in the direction along the centroid line of the specific three-dimensional tubular portion, and the relative positions of the side end portions. Since the forming condition ratio a is set based on this shape parameter, the accuracy of the forming condition ratio a can be further improved. Furthermore, the specific three-dimensional tubular portion can be formed more efficiently and stably.

In this specification, the material properties of the member refer to the Young's modulus, the yield strength (proof stress), the relationship between stress and strain in a tensile test (stress-strain curve and the like), and the like of the material forming the member.

In addition, the shape and the sheet thickness of the metal material sheet refer to the shape of the metal material sheet and the sheet thickness of the metal material sheet formed to correspond to the member and the specific three-dimensional tubular portion.

The forming conditions in the U-forming step refer to, for example, the width Du of the U-forming punch (for example, the press forming punch or the bending forming punch), the shape of the forming recessed die (for example, the press forming recessed die or the bending forming recessed die), the forming load in the U-forming step or the displacement of the U-forming punch with respect to the forming recessed die in the U-forming step (relative positions of the forming recessed die and the U-forming punch), and the like.

In addition, the forming conditions in the O-forming step refer to the shape of the abutting portion forming recessed part of the O-forming die (including the recessed part width Do), and the forming load in the O-forming step, or the displacement of the second recessed die with respect to the first recessed die in the O-forming die (relative positions of the first recessed die and the second recessed die of the O-forming die).

Parameters that can be substituted for the above parameters may be used, or parameter other than the above parameters may be included.

Effects of the Invention

According to the manufacturing method of a member, the manufacturing method of a member for a vehicle, and the die and punch according to the above aspects of the present invention, it is possible to efficiently manufacture a member including a specific three-dimensional tubular portion including at least any one of a cross-sectional shape changing portion, a circumferential length change rate changing portion, or a curved portion in a tubular portion.

BRIEF DESCRIPTION OF THE DRAWINGS

FIG. 2 is a view conceptually showing an outline of the press forming step and the abutting portion forming step according to the present invention, and a press forming punch width Du and a recessed part width Do of an O-forming die (abutting portion forming die) constituting a forming condition ratio a.

FIG. 19 is a view conceptually illustrating an outline of the bending forming step and the abutting portion forming step according to the present invention, and a bending forming punch width Du and a recessed part width Do of an O-forming die constituting a forming condition ratio a.

EMBODIMENTS OF THE INVENTION

The inventors of the present invention intensively studied a technique of efficiently manufacturing a member applicable to a member for a vehicle or the like having a tubular portion as shown in (1) to (3) below by applying a tubular portion forming method for forming a tubular portion from a metal material sheet. (1) A circumferential length change rate changing portion in which the change rate of the peripheral length changes in a circumferential length changing portion in which the circumferential length of a cross section orthogonal to a centroid line (cross section orthogonal to a longitudinal direction) changes along the centroid line, (2) a cross-sectional shape changing portion in which the shape of the cross section orthogonal to the centroid line changes along the centroid line, and (3) a curved portion in which the centroid line has a curvature.

As a result, the following first to sixth findings were obtained. In the present embodiment, the numerical range represented using "to" means the range including the numerical values before and after "to" as the lower limit and the upper limit

[First Finding]

The first finding is a finding regarding the circumferential length change rate changing portion.

Hereinafter, the first finding of the present invention will be described with reference to FIGS. 1A to 1F and FIG. 2. FIGS. 1A to 1F and FIG. 2 are views illustrating the first finding according to the present invention. In FIGS. 1D, 1E, and 1G, the arrows facing each other indicate compressive strain, and the arrows pointing to the opposite sides indicate tensile strain.

Figure 1A:
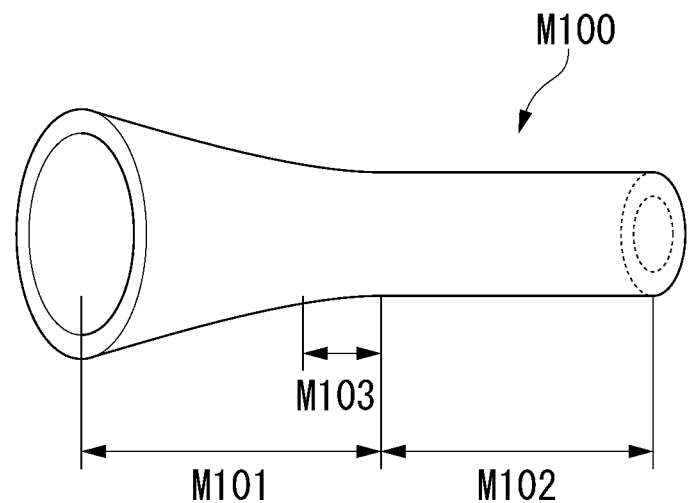
FIG. 1A is a view illustrating a first finding according to the present invention, and is a view showing an example of a first model according to the first finding.

The first finding is, for example, as shown in FIG. 1A, an example of a member model (hereinafter, referred to as a first model) M100 having a closed cross section that is circular when viewed in an axis (centroid line) direction and including a conical shape portion M101 in which the circumferential length of the closed cross section gradually changes at a constant change rate along the centroid line, a straight portion M102 having a circular cross section connected to the small-diameter side of the conical shape portion M101, and a circumferential length change rate changing portion M103 that is formed at the connection portion between the conical shape portion M101 and the straight portion M102 and changes in circumferential length change rate.

Figure 1B:
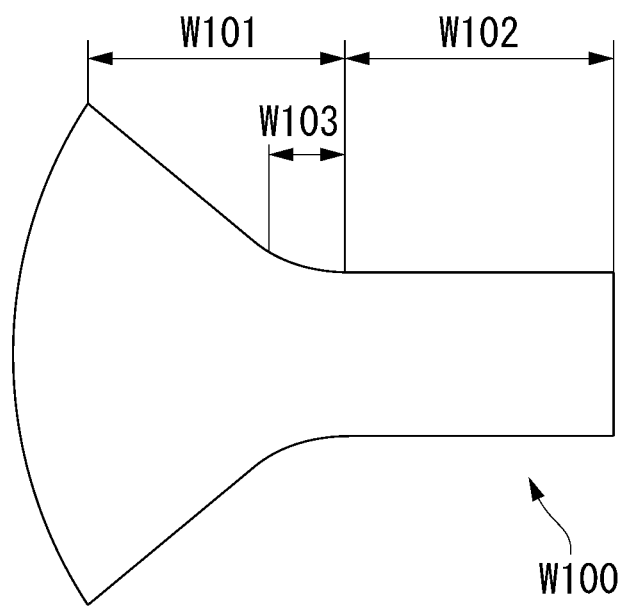
FIG. 1B is a view illustrating the first finding according to the present invention, and is a view showing an example of a metal material sheet according to the first model.

The first model M100 is formed by forming a metal material sheet W100 as shown in FIG. 1B in order of a press forming step, a flangeless forming step, and an O-forming step (abutting portion forming step). In the O-forming step, for example, a flangeless press-formed article (U-formed article) having a side end portion formed in the press forming step is used. Here, an example in which the first model M100 is formed by the press forming (drawing) will be described, but the same finding is established even in a case where the first model M100 is formed by bending forming. The bending forming will be described later.

The metal material sheet W100 includes a fan-shaped portion W101 corresponding to the conical shape portion M101, a rectangular portion W102 corresponding to the straight portion M102, and a connection portion W103 corresponding to the circumferential length change rate changing portion M103.

Figure 1C:
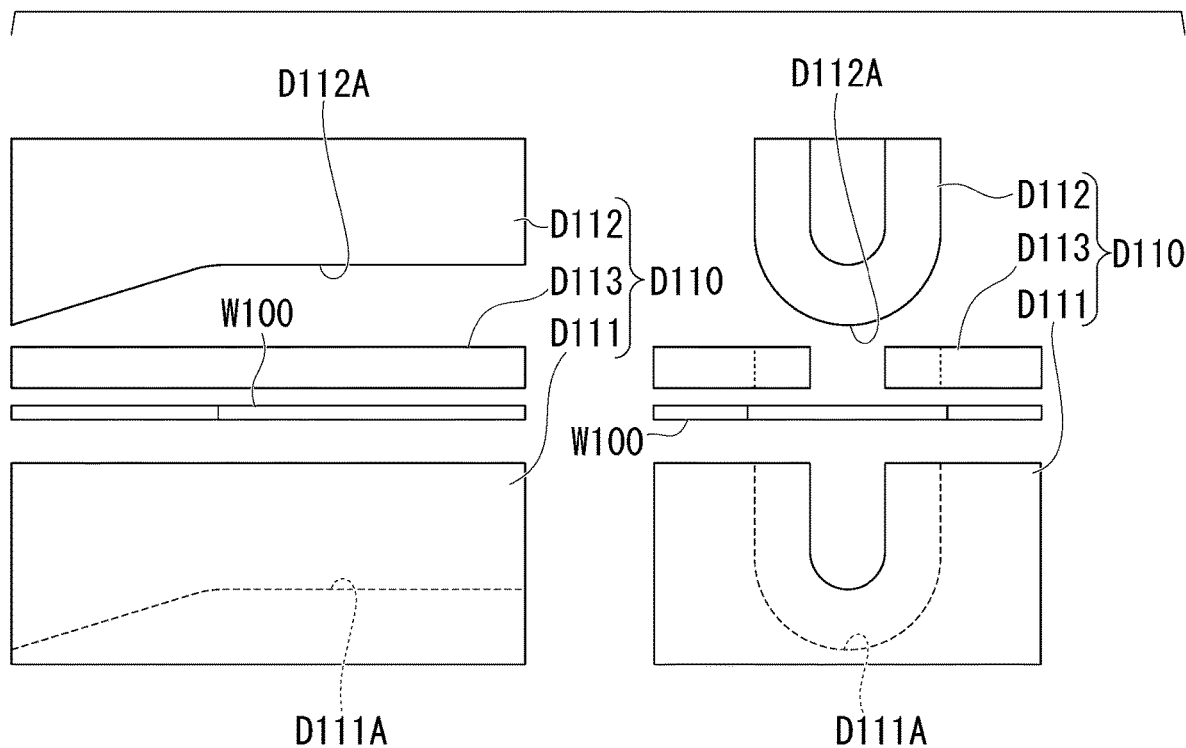
FIG. 1C is a view illustrating the first finding according to the present invention, and is a view showing an example of a press forming step according to the first model.
Figure 1D:
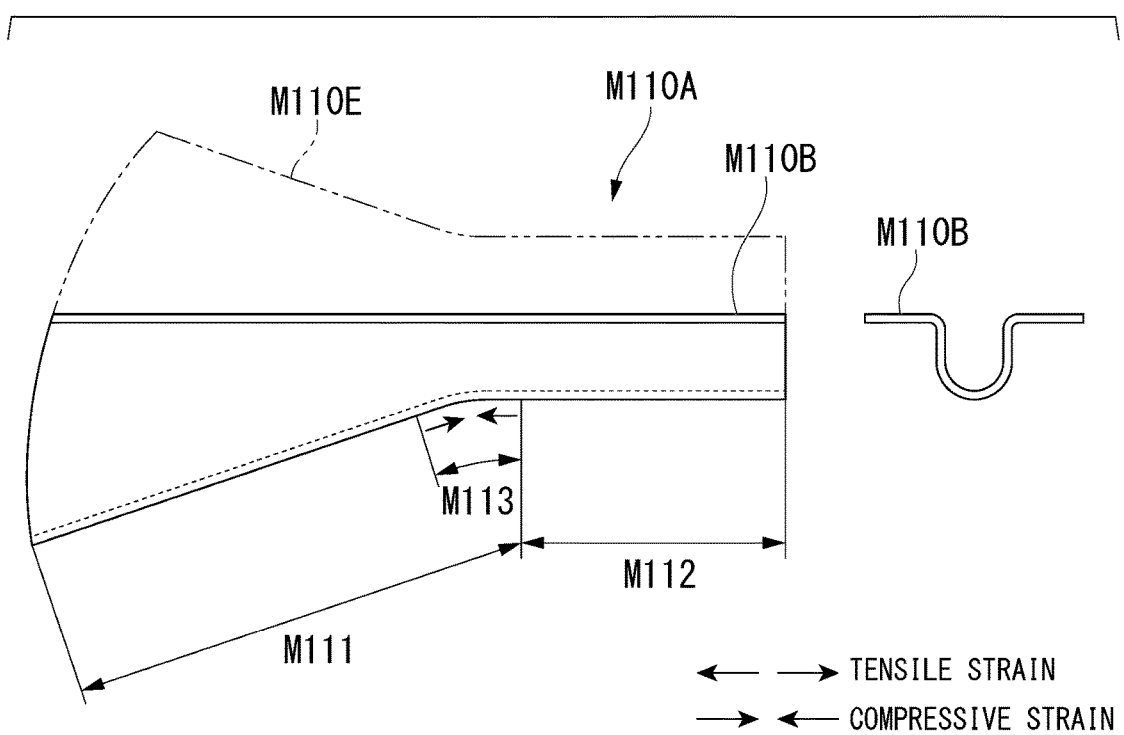
FIG. 1D is a view illustrating the first finding according to the present invention, and is a conceptual view showing an example of a press-formed article having an extending portion during forming in the press forming step according to the first model.
Figure 1E:
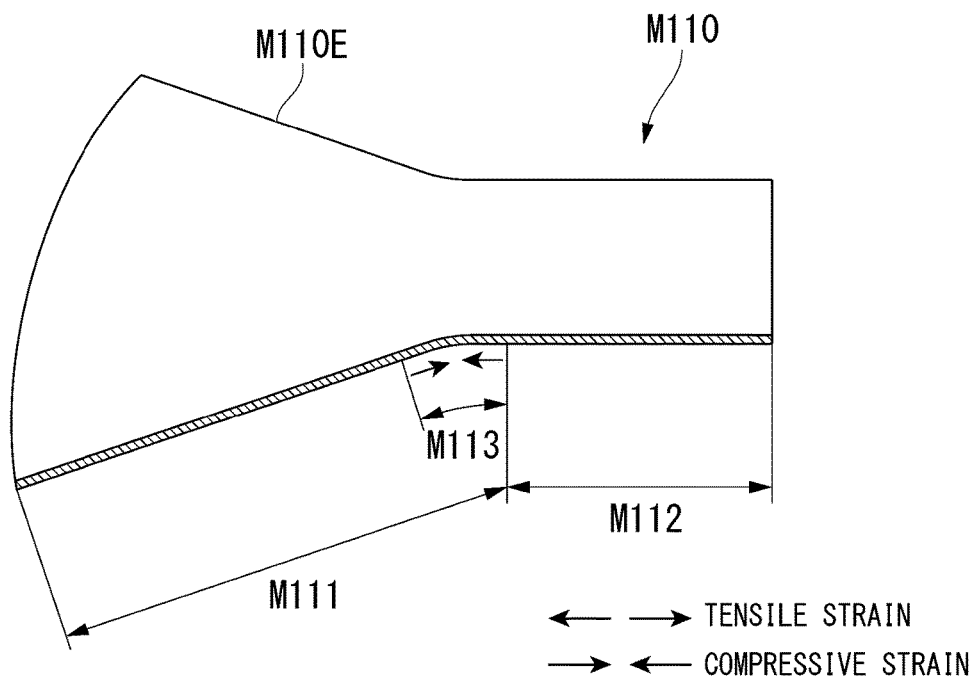
FIG. 1E is a view illustrating the first finding according to the present invention, and is a view of a cross section including a centroid line showing an example of the press forming step according to the first model.

In the press forming step, as shown in FIG. 1C, a press-formed article is formed using a press forming die and punch (U-forming die and punch) D110 including a press forming recessed die D111, a press forming punch D112, a metal material sheet pressing tool D113. The left figure of FIG. 1C is a side view of the press forming die and punch D110 and the metal material sheet W100 set in the press forming die and punch D110, and the right figure is a right side view of these members (a figure of the structure of the left figure viewed from the right side surface).

In the press forming recessed die D111, a press forming recessed part D111A having a lower forming shape portion corresponding to the final shape of the first model M100 in a range of approximately 180° (lower half) with respect to the centroid line when viewed in the centroid line direction of the first model M100 and an upper forming shape portion that is connected to the lower forming shape portion and is formed to extend upward from the upper end of the lower forming shape portion is formed.

In addition, in the press forming punch D112, a press forming protrusion D112A configured to correspond to the inner circumferential surface of the press-formed article at a predetermined interval from the press forming recessed part D111A is formed.

Regarding the metal material sheet pressing tool D113, the metal material sheet W100 disposed across the press forming recessed part D111A is pressed against the press forming recessed die D111 on both outer sides of the press forming recessed part D111A by the metal material sheet pressing tool D113 during press forming.

Next, the press forming punch D112 advances (is lowered) to insert the metal material sheet W100 into the press forming recessed die D111. At this time, in the portion of the metal material sheet W100 pressed by the metal material sheet pressing tool D113, a tensile force is applied to the formed portion.

As a result, as shown in FIG. 1D, a member (an intermediate article of the press-formed article) M110A having a recessed shape portion (recessed cross-sectional shape portion) formed to be open to the press forming punch D112 side and to be recessed toward the press forming recessed die D111 side and having an extending portion M110B extending outward from the press forming recessed part D111A is formed in the press forming recessed die D111. The left figure of FIG. 1D is a side view of the member M110A, and the right figure is a right side view of the member M110A (a figure of the structure of the left figure viewed from the right side).

Next, the press forming punch D112 further advances (is lowered) (the flangeless forming step) to insert the extending portion M110B into the press forming recessed die D111, whereby a flangeless press-formed article M110 having no extending portion as shown in FIG. 1E is formed. The flangeless press-formed article M110 has a portion M111 corresponding to the conical shape portion M101, a portion M112 corresponding to the straight portion M102, and a portion M113 corresponding to the circumferential length change rate changing portion M103. In this example, the flangeless forming step is a part of the press forming step.

In the press forming step, as shown in FIGS. 1D and 1E, compressive strain is generated in the portion M113 corresponding to the circumferential length change rate changing portion M103. In the flangeless forming step, the extending portion may be inserted into the press forming recessed die described above, or the extending portion may be trimmed as shown in a first embodiment, which will be described later.

Figure 1F:
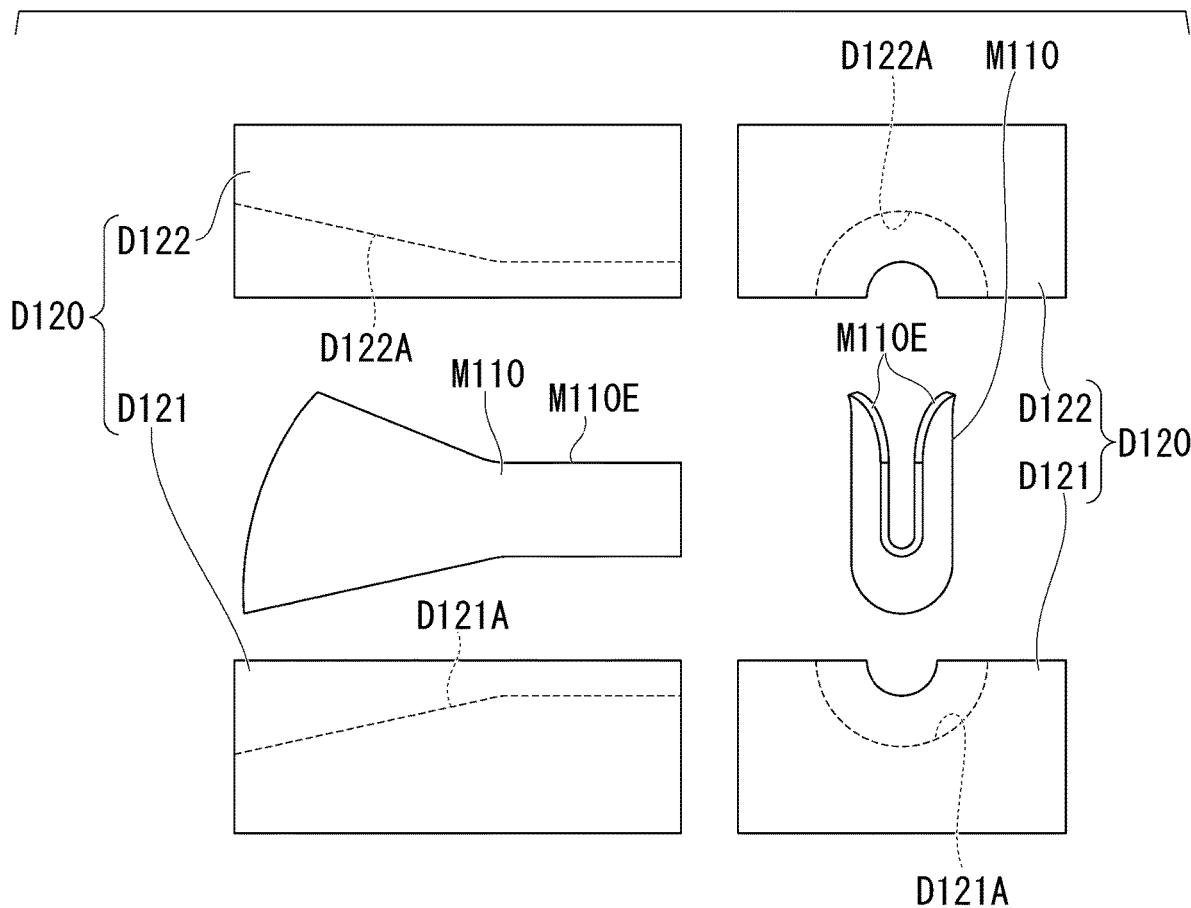
FIG. 1F is a view illustrating the first finding according to the present invention, and is a view showing an example of an abutting portion forming step according to the first model.
Figure 1G:
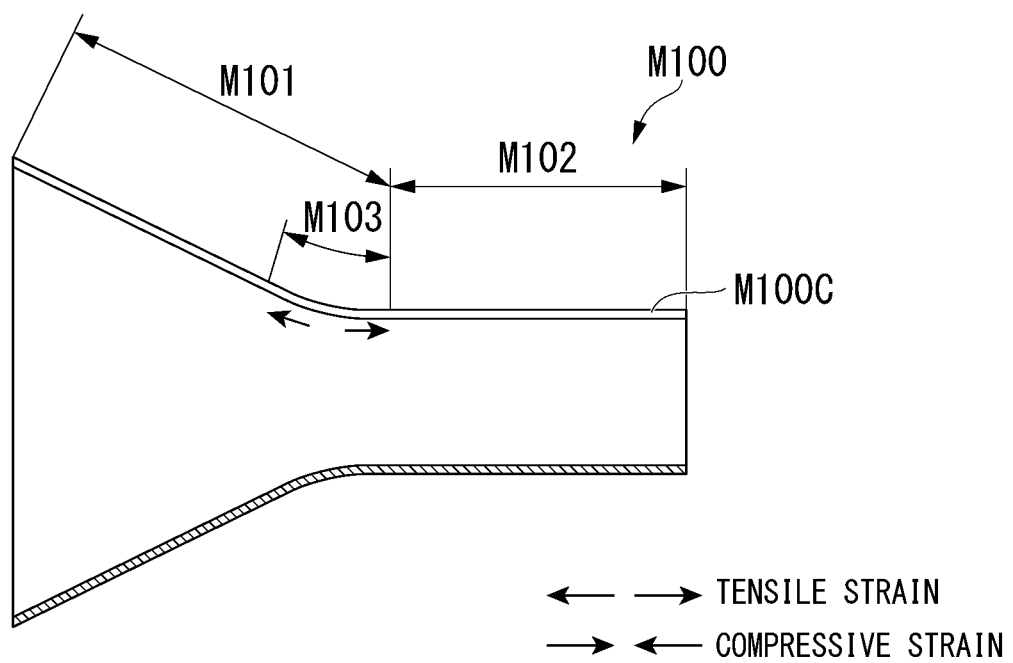
FIG. 1G is a view illustrating the first finding according to the present invention, and is a view of a cross section including a centroid line showing an example of an abutting portion formed article according to the first model.

In the O-forming step, as shown in FIG. 1F, the O-forming step is performed using an O-forming die D120. Specifically, by a lower die (first recessed die) D121 in which a lower die recessed part D121A is formed and an upper die (second recessed die) D122 in which an upper die recessed part D122A that side end portions M110E of abutting scheduled portions are to follow is formed, the respective side end portions M110E of the abutting scheduled portions of the flangeless press-formed article M110 are caused to abut each other to form abutting portions M100C, whereby the first model M100 is formed. The left figure of FIG. 1F is a side view of the lower die D121, the upper die D122, and the flangeless press-formed article M110 disposed therebetween, and the right figure is a right side view of these members (a figure of the structure of the left figure viewed from the right side surface).

In the abutting portion forming step, as shown in FIG. 1G, tensile strain is generated in the abutting portions M100C of the circumferential length change rate changing portion M103.

Here, the change in circumferential length change rate between a first end portion and a second end portion of the circumferential length change rate changing portion M103 may be 0.035 to 0.35. Here, the first end portion may be one end portion of the circumferential length change rate changing portion M103 in the longitudinal direction, the second end portion may be the other end portion. The change (numerical value) in circumferential length change rate between the first end portion and the second end portion of the circumferential length change rate changing portion M103 is defined by a value (absolute value) obtained by dividing the difference in circumferential length change rate between the first end portion (start point) and the second end portion (end point) of the circumferential length change rate changing portion by the interval (length or dimension) along the centroid line between the first end portion and the second end portion. The circumferential length change rate can be calculated based on, for example, a curved surface shape measured by a shape measuring instrument or data measured by another measuring method.

Next, the concept of a forming condition ratio a and a method for calculating the forming condition ratio a will be described with reference to FIG. 2.

Figure 2:
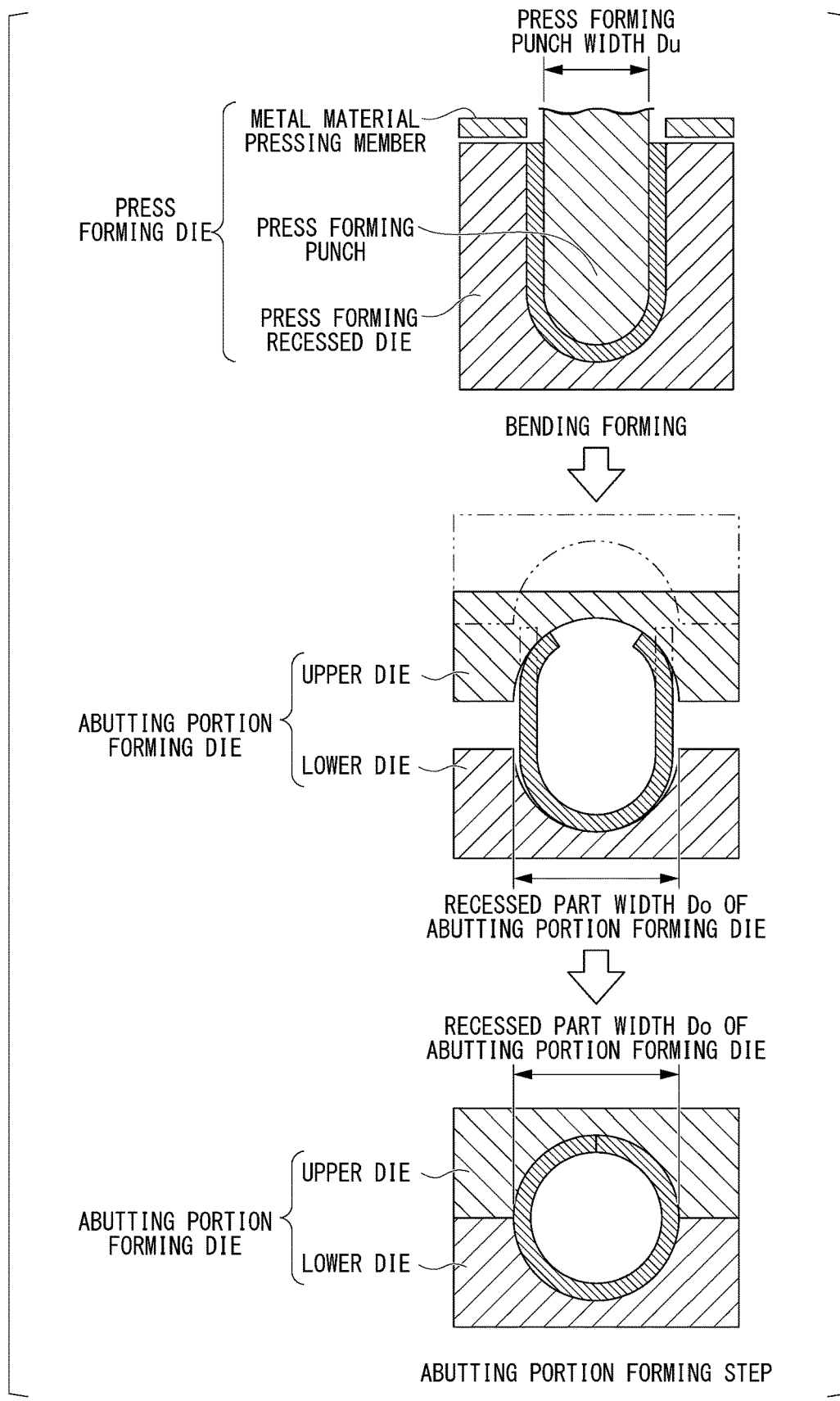

FIG. 2 is a view conceptually showing an outline of the press forming step according to the present invention, an outline of the O-forming step, and a press forming punch width Du and a recessed part width (the width of an abutting portion forming recessed part) Do of the O-forming die constituting the forming condition ratio a.

As shown in FIG. 2, regarding the formation of the tubular portion according to the present finding, in the press forming step, the metal material sheet is pressed against the press forming recessed die by the metal material pressing tool and is press-formed into the press-formed article (press-formed portion) by the press forming punch. Thereafter, the press-formed article is trimmed to obtain the flangeless press-formed article. Then, in the O-forming step, the side end portions of the flangeless press-formed article are formed to follow the recessed part of the O-forming die (the first recessed die and the second recessed die), whereby the side end portions (both end portions in a cross section, that is, abutting scheduled portions) of the flangeless press-formed article (side end portion forming press-formed portion) abut each other.

As shown in FIG. 2, the forming condition ratio a is a numerical value defined by the ratio (Du/Do) of the width Du of the press forming protrusion of the press forming punch that presses the metal material against the press forming recessed die in the press forming die and punch in which press forming is performed in the press forming step to the recessed part width Do of the abutting portion forming recessed part of the O-forming die (the first recessed die and the second recessed die) used in the O-forming step.

In this case, the forming condition ratio a is set to 0.85 to 0.95 (fourth finding). By setting the forming condition ratio a to a value within such a range, the abutting scheduled portions of the circumferential length change rate changing portion M103 can be brought into close contact with each other at high accuracy during the O-forming step, and furthermore, the first model M100 having the circumferential length change rate changing portion M103 can be efficiently manufactured. The forming condition ratio a of the die and punch corresponding to at least the specific three-dimensional tubular portion (here, the circumferential length change rate changing portion M103) may be 0.85 to 0.95. The forming condition ratio a may be 0.85 to 0.95 over the entire area of the die and punch. The same applies to other findings and embodiments described later.

In a case where the forming condition ratio a is smaller than 0.85, the strain generated in the press forming step and the O-forming step becomes excessive, and the springback of the circumferential length change rate changing portion M103 becomes excessive. Therefore, the closed cross section (cross section orthogonal to the longitudinal direction) of the circumferential length change rate changing portion M103 has an elongated oval shape that significantly deviates from the target shape (in this case, a true circle), resulting in a decrease in circularity. In a case where the forming condition ratio a exceeds 0.95, the side end portions of the circumferential length change rate changing portion M103 formed in the O-forming step are not sufficiently brought into close contact with each other or do not approach each other.

The first model M100 including the circumferential length change rate changing portion M103 can take various shapes. Therefore, depending on the shape of the first model M100, there is a probability that the suitable range of the forming condition ratio a may exist within the range of 0.85 to 0.95. In order to find such a suitable forming condition ratio a, the following processing may be performed prior to the U-forming step (here, the press forming step).

That is, prior to the U-forming step, a forming condition ratio setting step is performed in one or a plurality of cycles to set a suitable forming condition ratio a. Here, in the forming condition ratio setting step, a finite element analysis is performed in consideration of conditions including the forming condition ratio a (initial value of the preset forming condition ratio a in the case of the first cycle) set in the forming condition ratio setting step of the previous cycle, the material properties of the member, the shape and sheet thickness of the metal material sheet, the forming conditions in the U-forming step, and the forming conditions in the O-forming step. Accordingly, shape parameters including the amount of strain in the direction along the centroid line of the specific three-dimensional tubular portion (here, the circumferential length change rate changing portion M103) generated by the U-forming step, the amount of strain in the direction along the centroid line of the specific three-dimensional tubular portion (here, the circumferential length change rate changing portion M103) generated by the O-forming step, and the relative positions of the side end portions (the abutting scheduled portions) are estimated.

Here, the material properties of the member refer to the Young's modulus, the yield strength (proof stress), the relationship between stress and strain in a tensile test (stress-strain curve and the like), and the like of the material forming the member.

In addition, the shape and sheet thickness of the metal material sheet refer to the shape of the metal material sheet and the sheet thickness of the metal material sheet formed to correspond to the member and the specific three-dimensional tubular portion (here, the circumferential length change rate changing portion M103).

The forming conditions in the U-forming step (here, the press forming step) refer to, for example, the width Du of the U-forming punch (here, the press forming punch), the shape of the forming recessed die (here, the press forming recessed die), the forming load in the U-forming step or the displacement of the U-forming punch with respect to the forming recessed die in the U-forming step (relative positions of the press forming recessed die and the press forming punch), and the like.

In addition, the forming conditions in the O-forming step refer to the shape of the abutting portion forming recessed part of the O-forming die (including the recessed part width Do), and the forming load in the O-forming step, or the displacement of the second recessed die with respect to the first recessed die in the O-forming die (relative positions of the first recessed die and the second recessed die of the O-forming die). As a matter of course, parameters other than the above may be considered.

Then, the forming condition ratio setting step is repeated until the shape parameters estimated above satisfy the desired conditions. Here, the desired conditions can be variously set according to the properties (strength, dimensional accuracy, and the like) required for the specific three-dimensional tubular portion. In any case, in a case of manufacturing a member having a specific three-dimensional tubular portion, by setting the forming condition ratio a within the range of 0.85 to 0.95, the abutting scheduled portions of the specific three-dimensional tubular portion can be brought into close contact with each other at high accuracy, and furthermore, the member having the specific three-dimensional tubular portion can be efficiently manufactured.

The first finding is also applied to bending forming. Hereinafter, an example in which the first finding of the present invention is applied to bending forming will be described with reference to FIGS. 18A to 18F and FIG. 19. FIGS. 18A to 18F and FIG. 19 are views illustrating the example in which the first finding according to the present invention is applied to bending forming. In FIGS. 18D and 18F, the arrows facing each other indicate compressive strain, and the arrows pointing to the opposite sides indicate tensile strain.

Figure 18A:
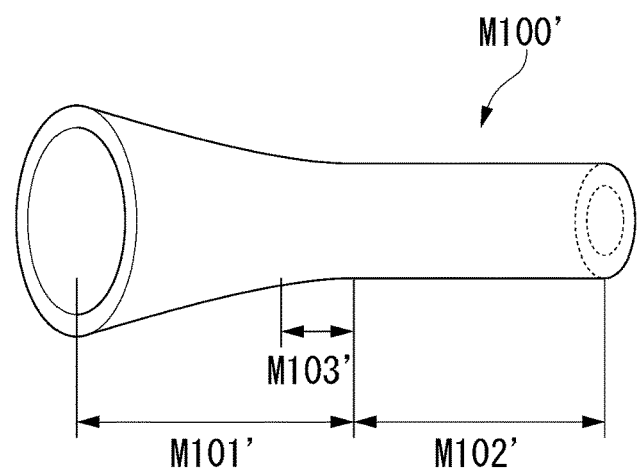
FIG. 18A is a view illustrating the first finding according to the present invention, and is a view showing an example of a first model according to the first finding.

The first finding is, for example, as shown in FIG. 18A, an example of a member model (hereinafter, referred to as a first model) M100' having a closed cross section that is circular when viewed in an axis (centroid line) direction and including a conical shape portion M101' in which the circumferential length of the closed cross section gradually changes at a constant change rate along the centroid line, a straight portion M102' having a circular cross section connected to the small-diameter side of the conical shape portion M101', and a circumferential length change rate changing portion M103' that is formed at the connection portion between the conical shape portion M101' and the straight portion M102' and changes in circumferential length change rate.

Figure 18B:
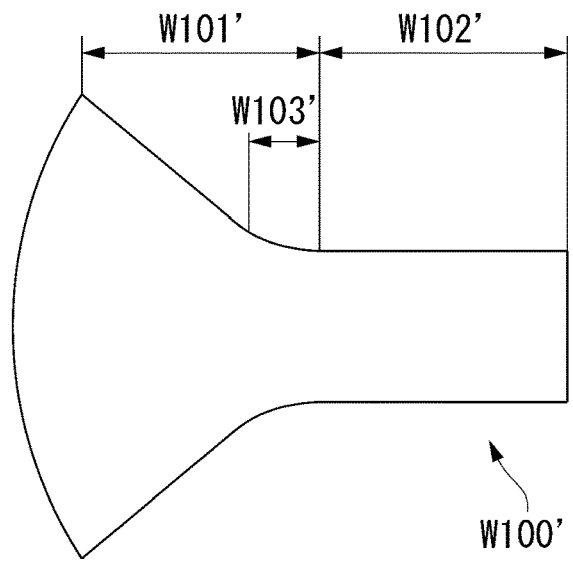
FIG. 18B is a view illustrating the first finding according to the present invention, and is a view showing an example of a metal material sheet according to the first model.

The first model M100' is formed by forming a metal material sheet W100 as shown in FIG. 18B in order of a bending forming step and an O-forming step (abutting portion forming step).

The metal material sheet W100' includes a fan-shaped portion W101' corresponding to the conical shape portion M101', a rectangular portion W102' corresponding to the straight portion M102', and a connection portion W103' corresponding to the circumferential length change rate changing portion M103'.

Figure 18C:
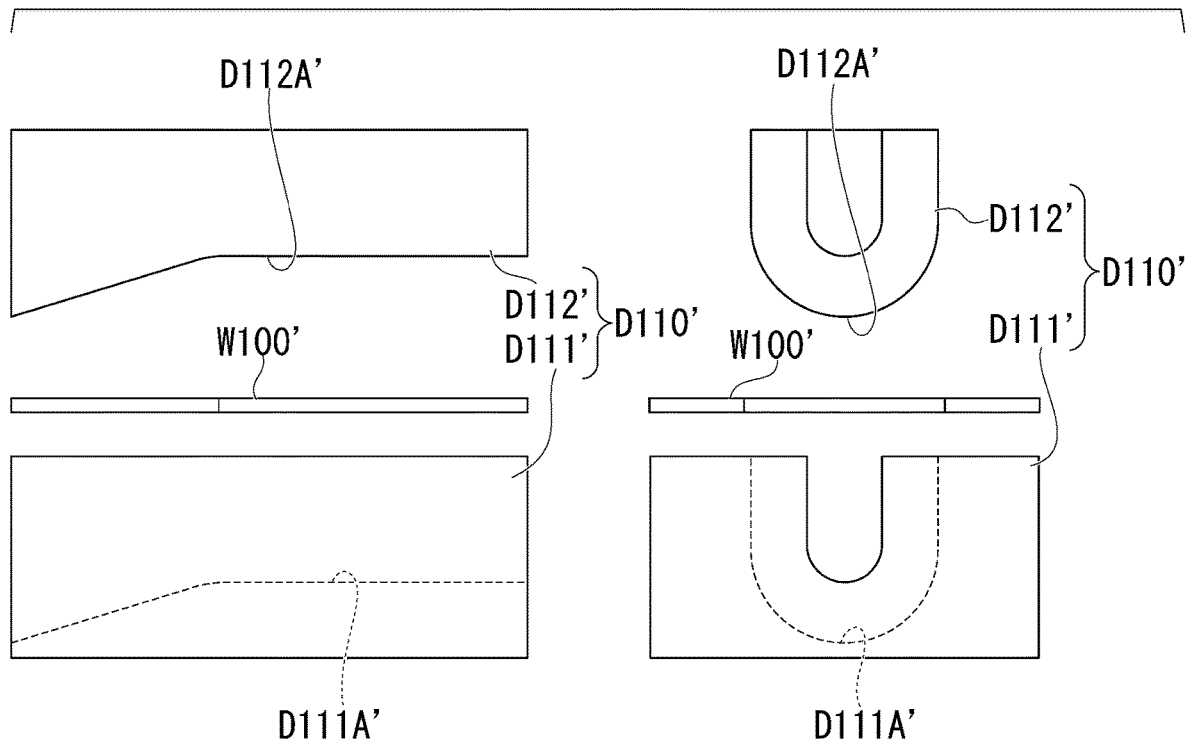
FIG. 18C is a view illustrating the first finding according to the present invention, and is a view showing an example of a bending forming step according to the first model.
Figure 18D:
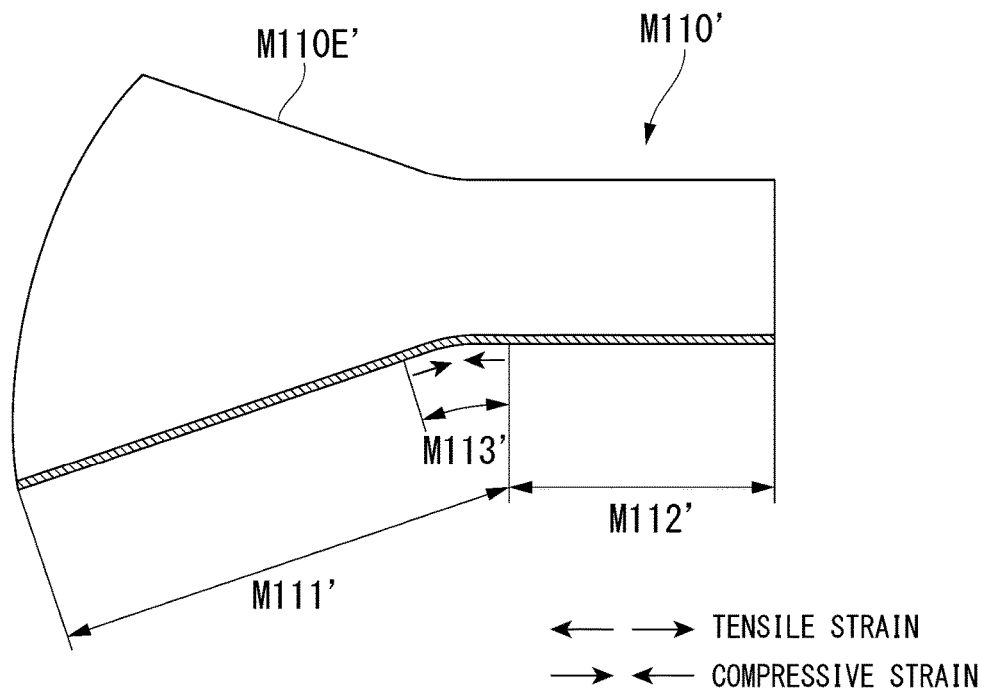
FIG. 18D is a view illustrating the first finding according to the present invention, and is a view of a cross section including a centroid line showing an example of a bending-formed article according to the first model.

In the bending forming step, as shown in FIG. 18C, a bending-formed article M110' is formed using a bending forming die and punch (U-forming die and punch) D110' including a bending forming recessed die D111' and a bending forming punch D112'. The left figure of FIG. 18C is a side view of the bending forming die and punch D110' and the metal material sheet W100' set in the bending forming die and punch D110', and the right figure is a right side view of these members (a figure of the structure of the left figure viewed from the right side surface).

In the bending forming recessed die D111', a bending forming recessed part D111A' having a lower forming shape portion corresponding to the final shape of the first model M100' in a range of approximately 180° (lower half) with respect to the centroid line when viewed in the centroid line direction of the first model M100' and an upper forming shape portion that is connected to the lower forming shape portion and is formed to extend upward from the upper end of the lower forming shape portion is formed.

In addition, in the bending forming punch D112', a bending forming protrusion D112A' configured to correspond to the inner circumferential surface of the bending-formed article M110' at a predetermined interval from the bending forming recessed part D111A' is formed.

Next, the bending forming punch D112' advances (is lowered) to insert the metal material sheet W100' placed on the bending forming recessed part D111A' into the bending forming recessed die D111'.

As a result, as shown in FIG. 18D, a member (bending-formed article) M110' having a recessed shape portion formed to be open to the bending forming punch D112' side and be recessed toward the bending forming recessed die D111' side is formed.

In the bending forming step, compressive strain as shown in FIG. 18D is generated on the recessed shape portion of a portion M113' corresponding to the circumferential length change rate changing portion M103'. The bending-formed article M110' has a portion M111' corresponding to the conical shape portion M101', a portion M112' corresponding to the straight portion M102', and a portion M113' corresponding to the circumferential length change rate changing portion M103'.

Figure 18E:
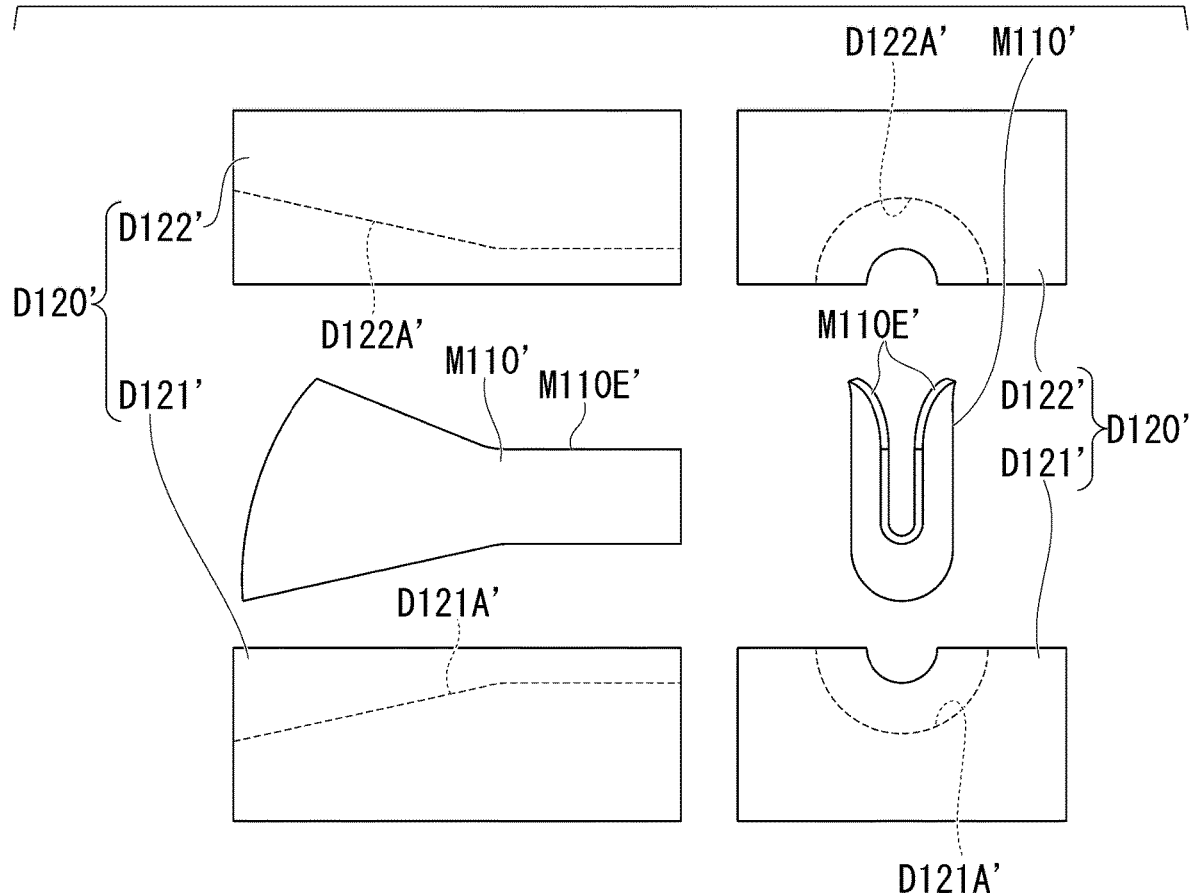
FIG. 18E is a view illustrating the first finding according to the present invention, and is a view showing an example of an abutting portion forming step according to the first model.
Figure 18F:
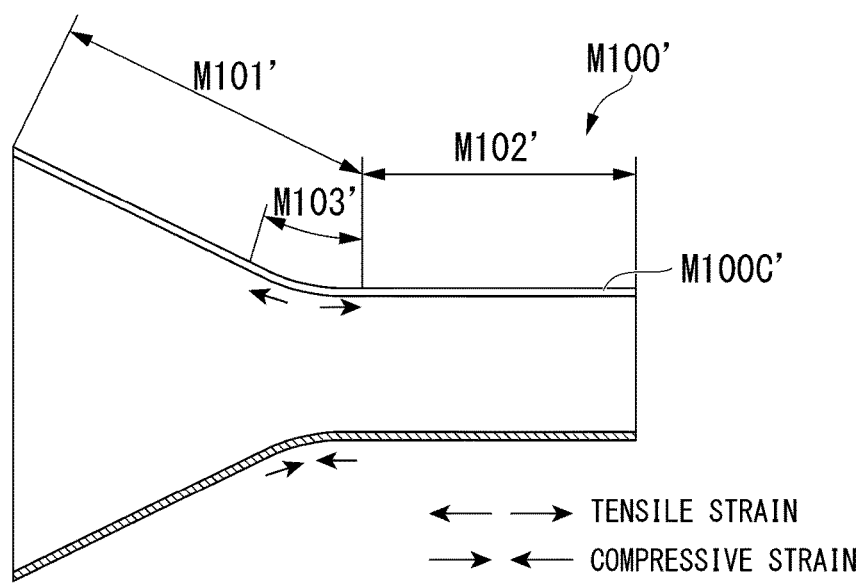
FIG. 18F is a view illustrating the first finding according to the present invention, and is a view of a cross section including a centroid line showing an example of an abutting portion formed article according to the first model.

In the O-forming step, as shown in FIG. 18E, the O-forming step is performed using an O-forming die D120'. Specifically, by a lower die (first recessed die) D121' in which a lower die recessed part D121A' is formed and an upper die (second recessed die) D122' in which an upper die recessed part D122A' that side end portions M110E' of abutting scheduled portions are to follow is formed, the respective side end portions M110E' of the abutting scheduled portions of the bending-formed article M110' are caused to abut each other to form abutting portions M100C', whereby the first model M100' is formed. The left figure of FIG. 18E is a side view of the lower die D121', the upper die D122', and the bending-formed article M110' disposed therebetween, and the right figure is a right side view of these members (a figure of the structure of the left figure viewed from the right side surface).

In the O-forming step, tensile strain as shown in FIG. 18F is generated in the abutting portions M100C of the circumferential length change rate changing portion M103.

Next, the concept of a forming condition ratio a and a method for calculating the forming condition ratio a will be described with reference to FIG. 19A.

Figure 19:
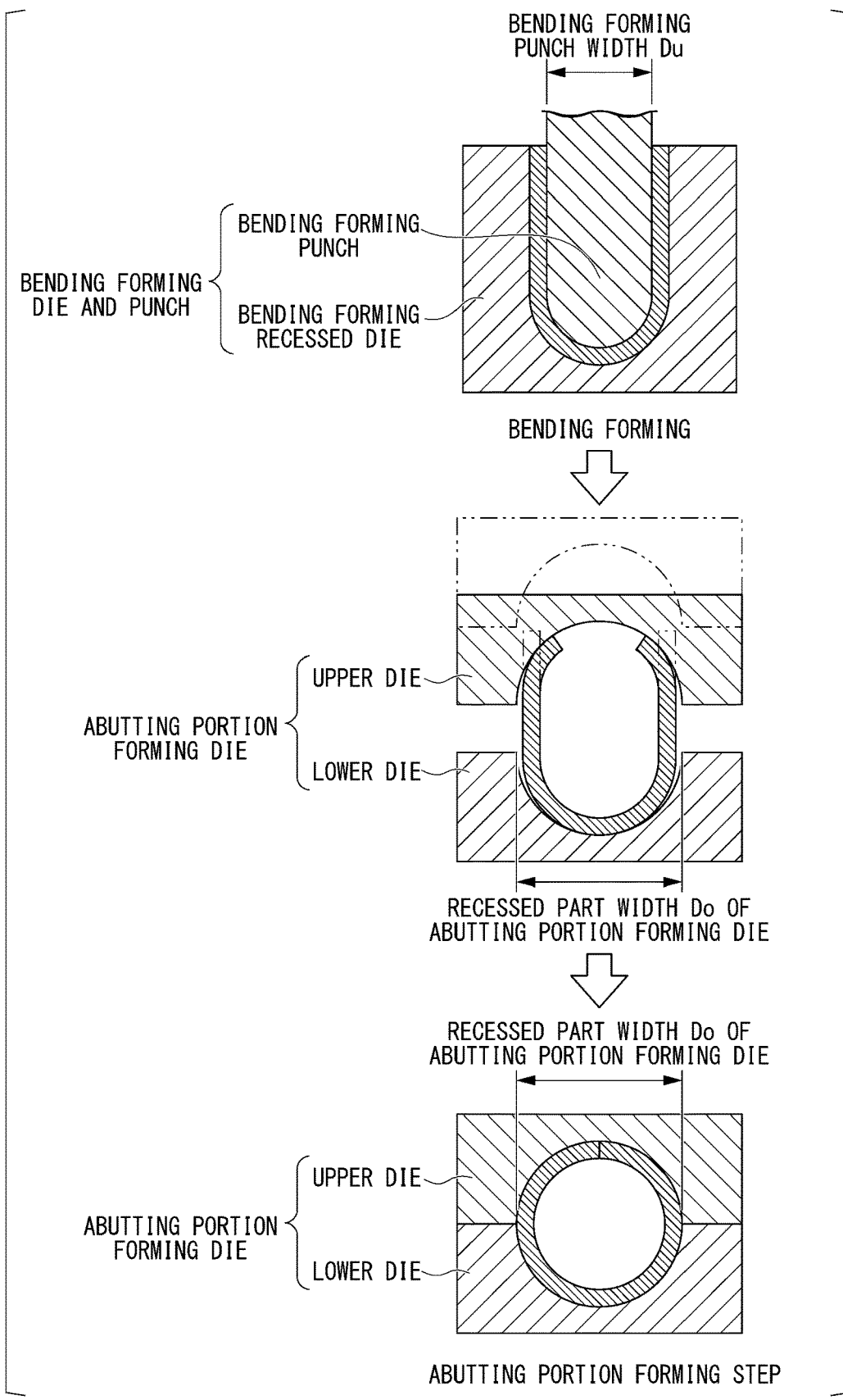

FIG. 19 is a view conceptually showing an outline of the bending forming step according to the present invention, an outline of the O-forming step, and a bending forming punch width Du and a recessed part width (the width of an abutting portion forming recessed part) Do of the O-forming die constituting the forming condition ratio a.

As shown in FIG. 19, regarding the formation of the tubular portion according to the present finding, the bending-formed article (bending-formed portion) that has been bending-formed in the bending forming step is formed to follow the recessed parts of the O-forming die (the first recessed die and the second recessed die) in the O-forming step. Accordingly, the side end portions (both end portions in a cross section) of the bending-formed article (bending-formed portion) abut each other.

As shown in FIG. 19, the forming condition ratio a is a numerical value defined by the ratio (Du/Do) of the width Du of the bending forming protrusion of the bending forming punch that presses the metal material against the bending forming recessed die in the bending forming die and punch in which bending forming is performed in the bending forming step to the width Do of the abutting portion forming recessed part of the O-forming die (the first recessed die and the second recessed die) used in the O-forming step.

As in the case of the press forming, the forming condition ratio a is set to 0.85 to 0.95 (fourth finding). By setting the forming condition ratio a to a value within such a range, the abutting scheduled portions of the circumferential length change rate changing portion M103' can be brought into close contact with each other at high accuracy during the O-forming step, and furthermore, the first model M100' having the circumferential length change rate changing portion M103' can be efficiently manufactured. The forming condition ratio a of the die and punch corresponding to the overall length or a part of at least the specific three-dimensional tubular portion (here, the circumferential length change rate changing portion M103') may be 0.85 to 0.95. The forming condition ratio a may be 0.85 to 0.95 over the entire area of the die and punch.

In a case where the forming condition ratio a is smaller than 0.85, the strain generated in the bending forming step and the O-forming step becomes excessive, and the springback of the circumferential length change rate changing portion M103' becomes excessive. Therefore, the closed cross section (cross section orthogonal to the longitudinal direction) of the circumferential length change rate changing portion M103' has an elongated oval shape that significantly deviates from the target shape (in this case, a true circle), resulting in a decrease in circularity. In a case where the forming condition ratio a exceeds 0.95, the side end portions of the circumferential length change rate changing portion M103' formed in the O-forming step are not sufficiently brought into close contact with each other or do not approach each other.

The first model M100' including the circumferential length change rate changing portion M103' can take various shapes. Therefore, depending on the shape of the first model M100', there is a probability that the suitable range of the forming condition ratio a may exist within the range of 0.85 to 0.95. Here, as described above, a suitable forming condition ratio a may be found by the finite element analysis. The specific processing method is as described above.

Here, the parameters to be considered include, for example, the material properties of the member, the shape and sheet thickness of the metal material sheet, the forming conditions in the bending forming step, the forming conditions in the O-forming step, and the like. Particularly, the material properties of the member, the shape and sheet thickness of the metal material sheet, and the forming conditions in the O-forming step are as described above. The forming conditions in the bending forming step refer to, for example, the width Du of the bending forming punch, the shape of the bending forming recessed die, the forming load in the bending forming step or the displacement of the bending forming punch with respect to the bending forming recessed die in the bending forming step (relative positions between the bending forming recessed die and the bending forming punch), and the like.

[Second Finding]

The second finding is a finding regarding the cross-sectional shape changing portion.

Hereinafter, the second finding of the present invention will be described with reference to FIGS. 3A to 3D. FIGS. 3A to 3D are views illustrating the second finding according to the present invention. In FIGS. 3D and 3F, the arrows facing each other indicate compressive strain, and the arrows pointing to the opposite sides indicate tensile strain.

Figure 3A:
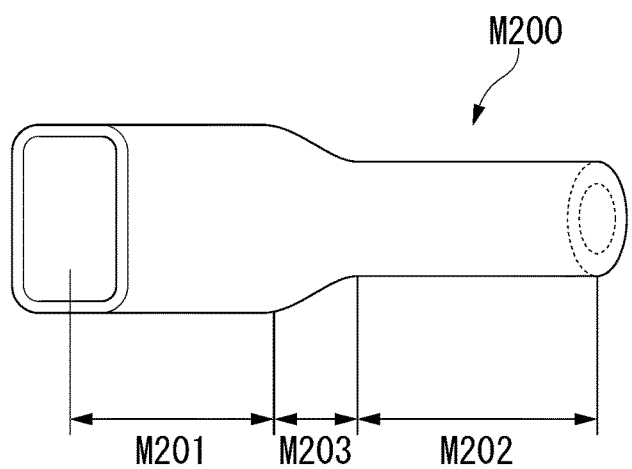
FIG. 3A is a view illustrating a second finding according to the present invention, and is a view showing an example of a second model according to the second finding.

The second finding is, for example, as shown in FIG. 3A, an example of a member model (hereinafter, referred to as a second model) M200 including a rectangular closed cross section M201 that is rectangular when viewed in an axis (centroid line) direction, a circular closed cross section M202 that is circular, and a cross-sectional shape changing portion M203 that is formed between the circular closed cross section and the rectangular closed cross section and gradually changes in shape along the centroid line.

Figure 3B:
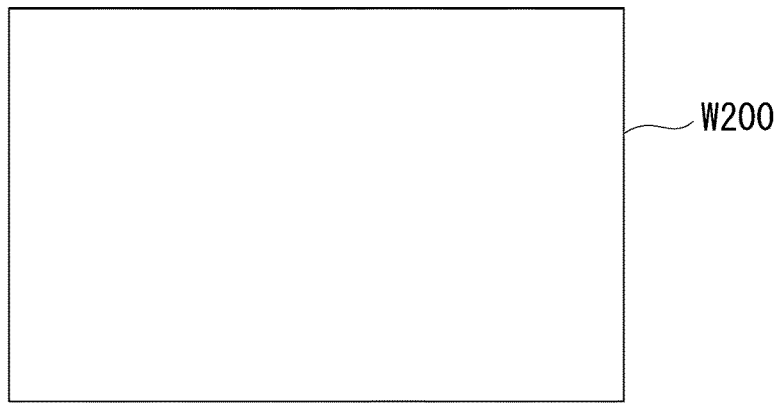
FIG. 3B is a view illustrating the second finding according to the present invention, and is a view showing an example of a metal material sheet according to the second model.

The second model M200 is formed by forming a rectangular metal material sheet W200 as shown in FIG. 3B in order of a press forming step, a flangeless forming step, and an O-forming step (abutting portion forming step). Here, an example in which the second model M200 is formed by the press forming will be described, but the same finding is established even in a case where the second model M200 is formed by bending forming. The bending forming will be described later.

Figure 3C:
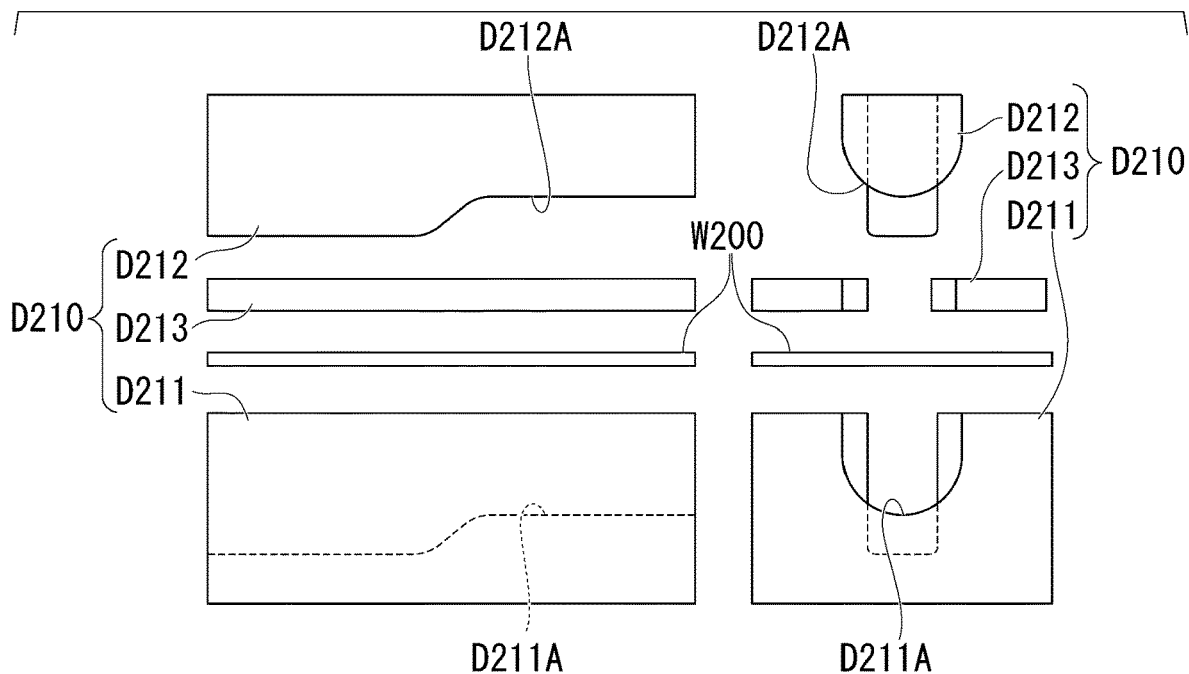
FIG. 3C is a view illustrating the second finding according to the present invention, and is a view showing an example of a press forming step according to the second model.
Figure 3D:
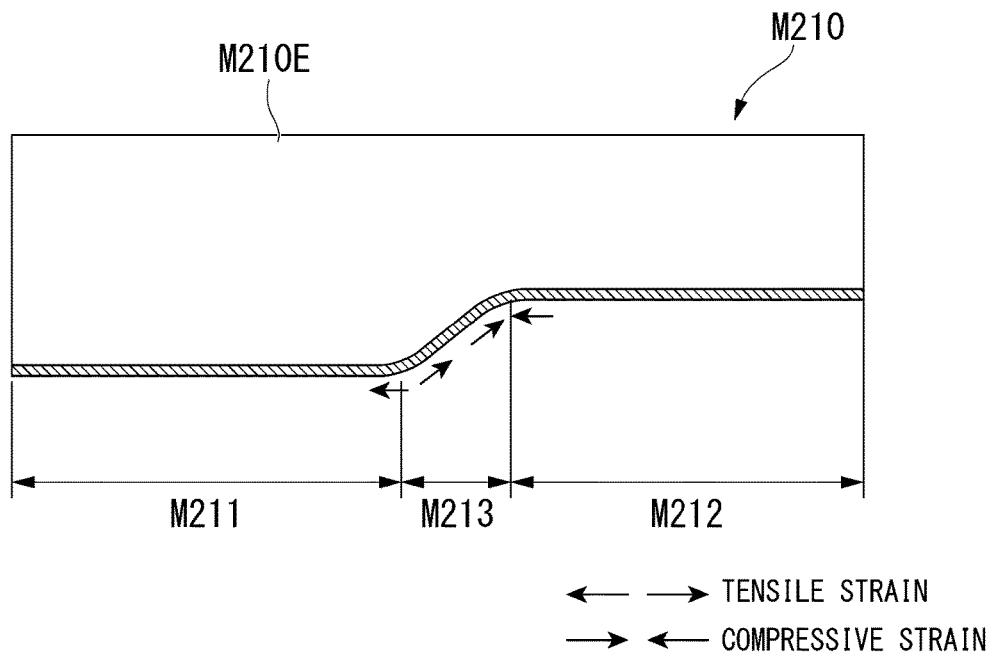
FIG. 3D is a view illustrating the second finding according to the present invention, and is a view of a cross section including a centroid line showing an example of the press forming step according to the second model.

In the press forming step, as shown in FIG. 3C, a press-formed article is formed using a press forming die and punch (U-forming die and punch) D210 including a press forming recessed die D211, a press forming punch D212, a metal material sheet pressing tool D213. The left figure of FIG. 3C is a side view of the press forming die and punch D210 and the metal material sheet W200 set in the press forming die and punch D210, and the right figure is a right side view of these members (a figure of the structure of the left figure viewed from the right side surface).

In the press forming recessed die D211, a press forming recessed part D211A having a lower forming shape portion corresponding to the final shape of the second model M200 in a range of approximately 180° (lower half) with respect to the centroid line when viewed in the centroid line direction of the second model M200 and an upper forming shape portion that is connected to the lower forming shape portion and is formed to extend upward from the upper end of the lower forming shape portion is formed. In addition, in the press forming punch D212, a press forming protrusion D212A configured to correspond to the inner circumferential surface of the press-formed article at a predetermined interval from the press forming recessed part D211A is formed.

The metal material sheet pressing tool D213 presses the metal material sheet W200 against the press forming recessed die D211 on both sides across the press forming recessed part D211A during press forming.

Then, the metal material sheet W200 is press-formed by the press forming punch D212 and the press forming recessed die D211, whereby a press-formed article that is open to the press forming punch D212 side and has a recessed shape portion on the press forming recessed die D211 side is formed.

In the press forming step, compressive and tensile strains as shown in FIG. 3D are generated on the recessed shape portion side of a portion M213 corresponding to the cross-sectional shape changing portion M203. Reference numeral M210 denotes a flangeless press-formed article. The flangeless press-formed article M210 includes a portion M211 corresponding to the rectangular closed cross section M201, a portion M212 corresponding to the circular closed cross section M202, and the portion M213 corresponding to the cross-sectional shape changing portion M203.

Figure 3E:
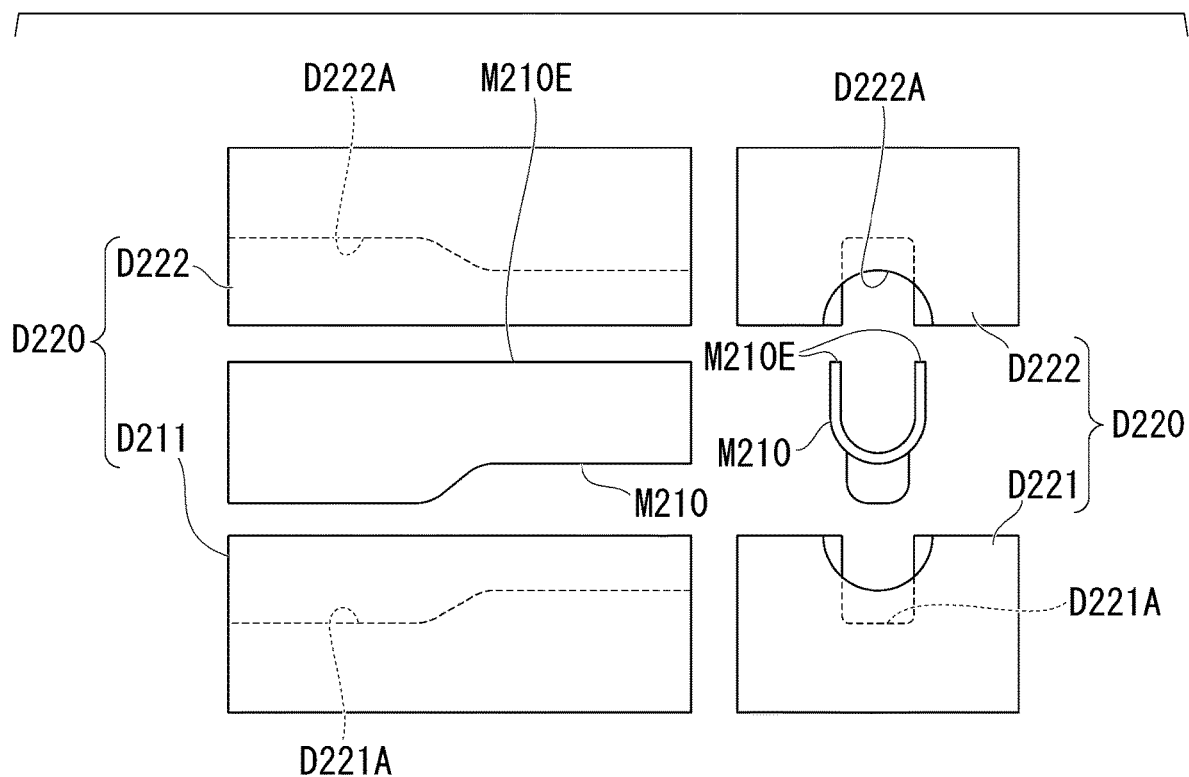
FIG. 3E is a view illustrating the second finding according to the present invention, and is a view showing an example of an abutting portion forming step according to the second model.
Figure 3F:
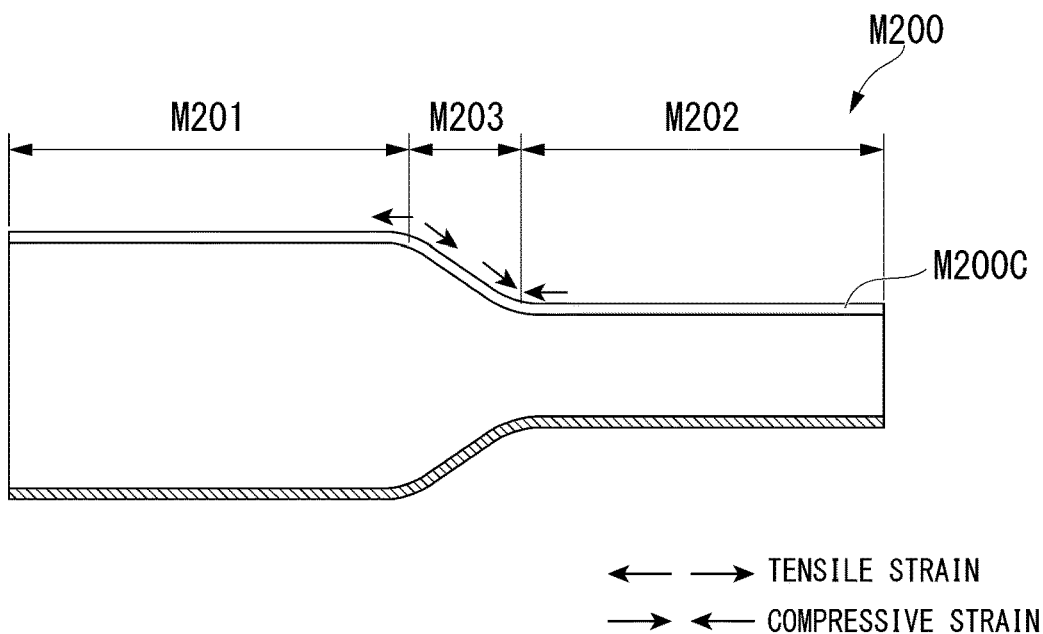
FIG. 3F is a view illustrating the second finding according to the present invention, and is a view of a cross section including a centroid line showing an example of an abutting portion formed article according to the second model.

In the O-forming step, as shown in FIG. 3E, the O-forming step is performed using an O-forming die D220. Specifically, by a lower die (first recessed die) D221 in which a lower die recessed part D221A is formed and an upper die (second recessed die) D222 in which an upper die recessed part D222A that side end portions M210E of abutting scheduled portions are to follow is formed, the respective side end portions M210E of the abutting scheduled portions of the flangeless press-formed article M210 are caused to abut each other to form abutting portions M200C, whereby the second model M200 is formed. The left figure of FIG. 3E is a side view of the lower die D221, the upper die D222, and the flangeless press-formed article M210 disposed therebetween, and the right figure is a right side view of these members (a figure of the structure of the left figure viewed from the right side surface).

In the O-forming step, compressive and tensile strains as shown in FIG. 3F are generated on the abutting portion M200C side of the cross-sectional shape changing portion M203.

Here, a change in the length in the direction including the centroid line of the cross-sectional shape of the cross-sectional shape changing portion M203 (the shape of the cross section orthogonal to the centroid line of the cross-sectional shape changing portion M203) and the abutting portion M200C (that is, the length of a line segment that passes through the centroid of the cross section and the abutting portion M200C and intersects the outer circumference of the cross section) along the centroid line may be 10% to 50%. The change in the cross-sectional shape in the cross-sectional shape changing portion M203 is represented by (the percentage of) a numerical value obtained by dividing the difference between the lengths in the direction including the centroid line of the cross-sectional shape and the abutting portion M200C at any two points set along the centroid line by the length between the two points along the centroid line.

Even in such press forming, the forming condition ratio a is set to 0.85 to 0.95 (fourth finding). By setting the forming condition ratio a to a value within such a range, the abutting scheduled portions of the cross-sectional shape changing portion M203 can be brought into close contact with each other at high accuracy during the O-forming step, and furthermore, the second model M200 having the cross-sectional shape changing portion M203 can be efficiently manufactured. By performing the above-mentioned forming condition ratio setting step in one or a plurality of cycles, a preferable range of the forming condition ratio a may be found.

The second finding is also applied to bending forming. Hereinafter, an example in which the second finding of the present invention is applied to bending forming will be described with reference to FIGS. 20A to 20D. FIGS. 20A to 20D are views illustrating the example in which the second finding according to the present invention is applied to bending forming. In FIGS. 20D and 20F, the arrows facing each other indicate compressive strain, and the arrows pointing to the opposite sides indicate tensile strain.

Figure 20A:
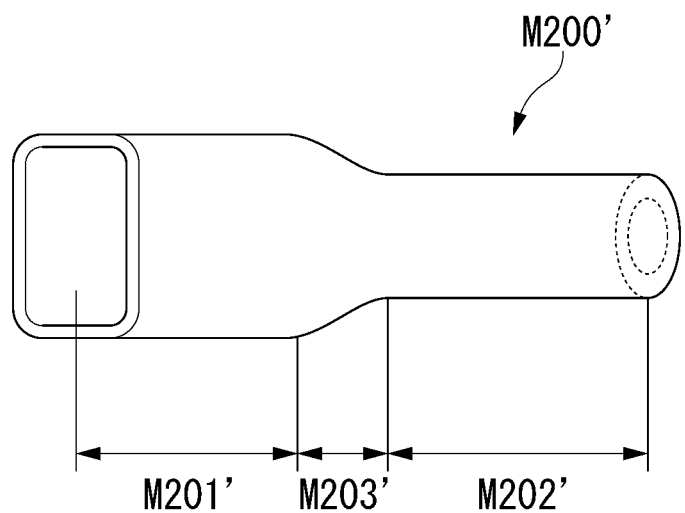
FIG. 20A is a view illustrating the second finding according to the present invention, and is a view showing an example of a second model according to the second finding.

The second finding is, for example, as shown in FIG. 20A, an example of a member model (hereinafter, referred to as a second model) M200' including a rectangular closed cross section M201' that is rectangular when viewed in an axis (centroid line) direction, a circular closed cross section M202' that is circular, and a cross-sectional shape changing portion M203' that is formed between the circular closed cross section and the rectangular closed cross section and gradually changes in shape along the centroid line.

Figure 20B:
FIG. 20B is a view illustrating the second finding according to the present invention, and is a view showing an example of a metal material sheet according to the second model.

The second model M200' is formed by forming a rectangular metal material sheet W200' as shown in FIG. 20B in order of a bending forming step and an O-forming step (abutting portion forming step).

Figure 20C:
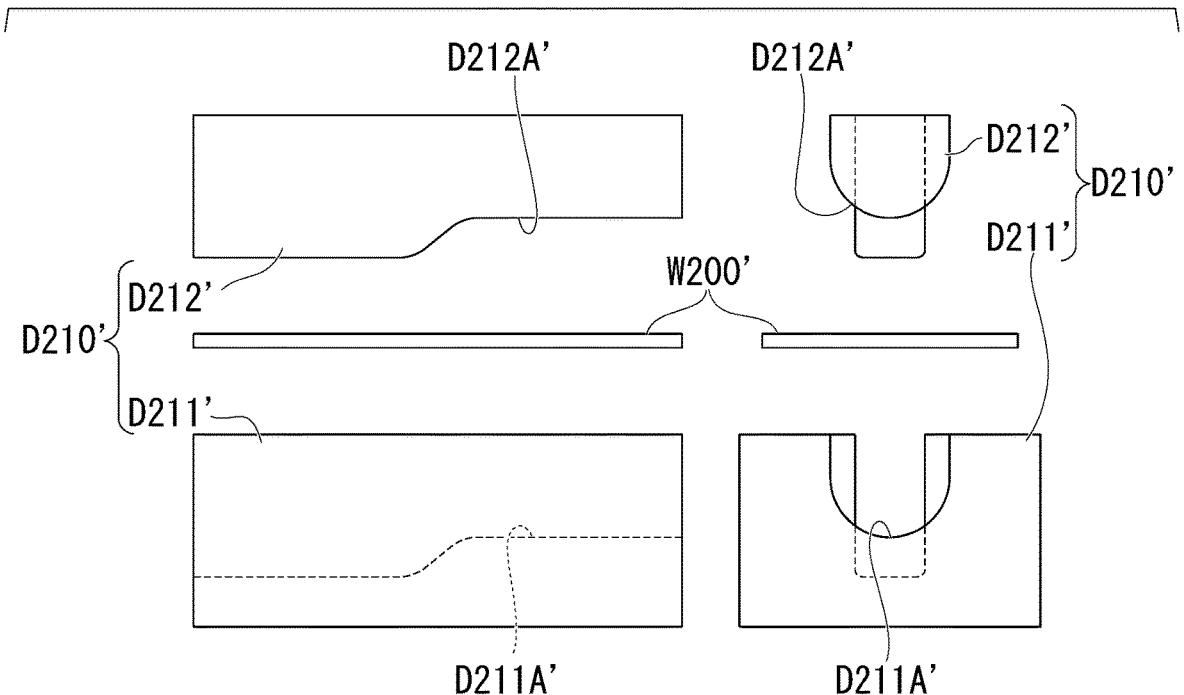
FIG. 20C is a view illustrating the second finding according to the present invention, and is a view showing an example of a bending forming step according to the second model.
Figure 20D:
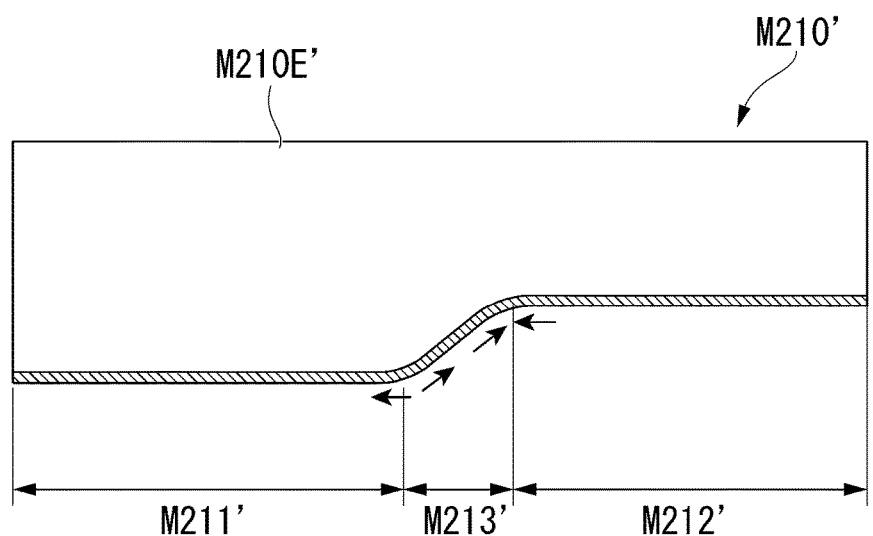
FIG. 20D is a view illustrating the second finding according to the present invention, and is a view of a cross section including a centroid line showing an example of a bending-formed article according to the second model.

In the bending forming step, as shown in FIG. 20C, a bending-formed article M210' is formed using a bending forming die and punch (U-forming die and punch) D210' including a bending forming recessed die D211' and a bending forming punch D212'. The left figure of FIG. 20C is a side view of the bending forming die and punch D210' and the metal material sheet W200' set in the bending forming die and punch D210', and the right figure is a right side view of these members (a figure of the structure of the left figure viewed from the right side surface).

In the bending forming recessed die D211', a bending forming recessed part D211A' having a lower forming shape portion corresponding to the final shape of the second model M200' in a range of approximately 180° (lower half) with respect to the centroid line when viewed in the centroid line direction of the second model M200' and an upper forming shape portion that is connected to the lower forming shape portion and is formed to extend upward from the upper end of the lower forming shape portion is formed. In addition, in the bending forming punch D212', a bending forming protrusion D212A' configured to correspond to the inner circumferential surface of the bending-formed article M210' at a predetermined interval from the bending forming recessed part D211A' is formed.

Then, the metal material sheet W200' is bending-formed by the bending forming punch D212' and the bending forming recessed die D211', whereby the bending-formed article M210' that is open to the bending forming punch D212' side and has a recessed shape portion on the bending forming recessed die D211' side is formed.

In the bending forming step, compressive and tensile strains as shown in FIG. 20D are generated on the recessed shape portion side of a portion M213' corresponding to the cross-sectional shape changing portion M203'. The flangeless press-formed article M210' includes a portion M211' corresponding to the rectangular closed cross section M201', a portion M212' corresponding to the circular closed cross section M202', and the portion M213' corresponding to the cross-sectional shape changing portion M203'.

Figure 20E:
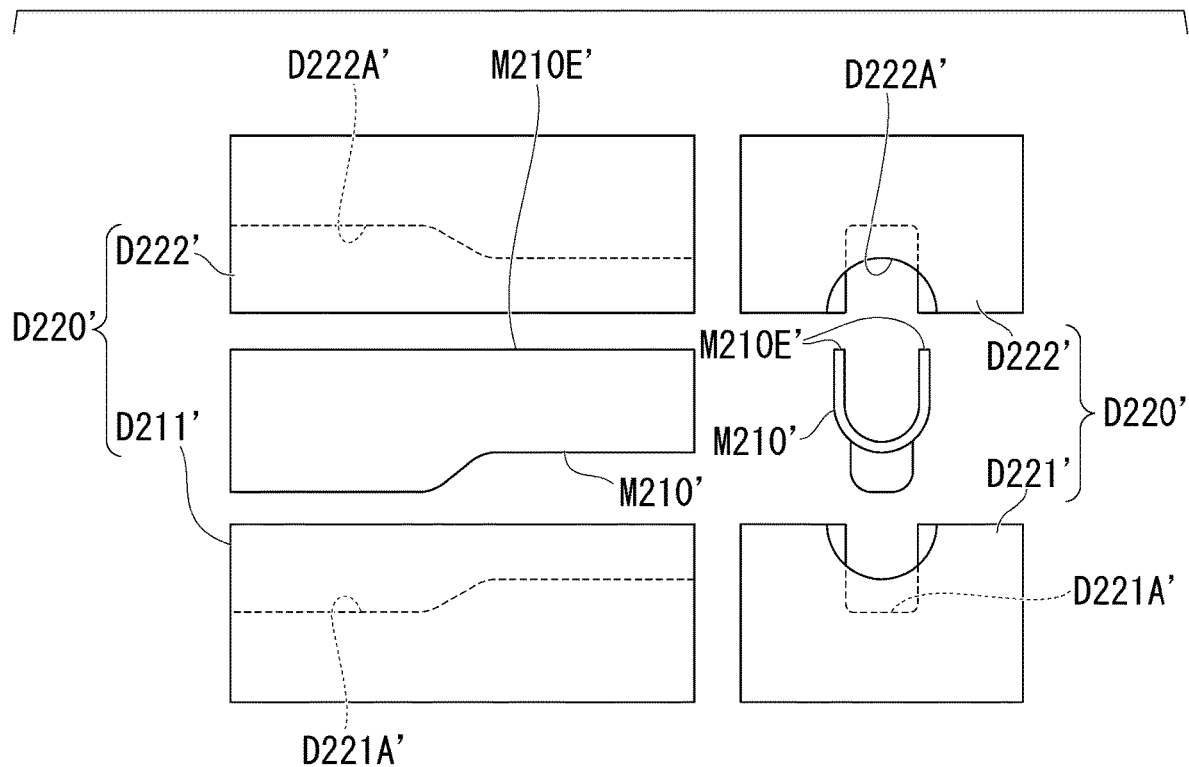
FIG. 20E is a view illustrating the second finding according to the present invention, and is a view showing an example of an abutting portion forming step according to the second model.
Figure 20F:
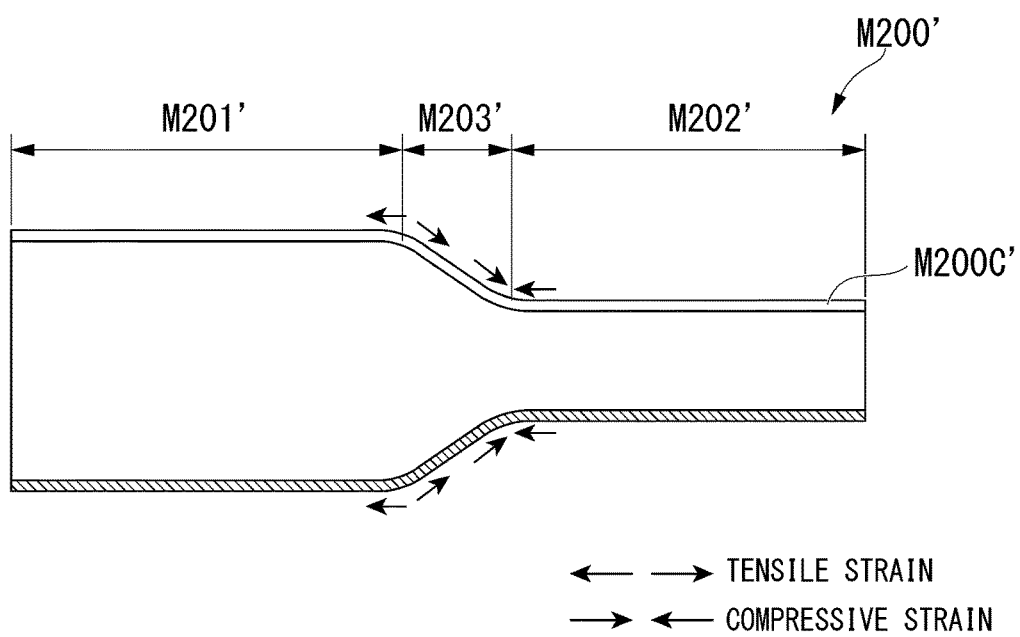
FIG. 20F is a view illustrating the second finding according to the present invention, and is a view of a cross section including a centroid line showing an example of an abutting portion formed article according to the second model.

In the O-forming step, as shown in FIG. 20E, the O-forming step is performed using an O-forming die D220'. Specifically, by a lower die (first recessed die) D221 in which a lower die recessed part D221A' is formed and an upper die (second recessed die) D222' in which an upper die recessed part D222A' that side end portions M210E' of abutting scheduled portions are to follow is formed, the respective side end portions M210E' of the abutting scheduled portions of the bending-formed article M210' are caused to abut each other to form abutting portions M200C', whereby the second model M200' is formed. The left figure of FIG. 20E is a side view of the lower die D221', the upper die D222', and the bending-formed article M210' disposed therebetween, and the right figure is a right side view of these members (a figure of the structure of the left figure viewed from the right side surface).

In the O-forming step, compressive and tensile strains as shown in FIG. 20F are generated on the abutting portion M200C' side of the cross-sectional shape changing portion M203'.

Here, a change in the length in the direction including the centroid line of the cross-sectional shape of the cross-sectional shape changing portion M203' (the shape of the cross section orthogonal to the centroid line of the cross-sectional shape changing portion M203') and the abutting portion M200C' (that is, the length of a line segment that passes through the centroid of the cross section and the abutting portion M200C' and intersects the outer circumference of the cross section) along the centroid line may be 10% to 50%. The change in the cross-sectional shape in the cross-sectional shape changing portion M203' is represented by (the percentage of) a numerical value obtained by dividing the difference between the lengths in the direction including the centroid line of the cross-sectional shape and the abutting portion M200C' at any two points set along the centroid line by the length between the two points along the centroid line.

Even in such bending forming, the forming condition ratio a is set to 0.85 to 0.95 (fourth finding). By setting the forming condition ratio a to a value within such a range, the abutting scheduled portions of the cross-sectional shape changing portion M203' can be brought into close contact with each other at high accuracy during the O-forming step, and furthermore, the second model M200' having the cross-sectional shape changing portion M203' can be efficiently manufactured. By performing the above-mentioned forming condition ratio setting step in one or a plurality of cycles, a preferable range of the forming condition ratio a may be found.

[Third Finding]

The third finding is a finding regarding the curved portion.

Hereinafter, the third finding of the present invention will be described with reference to FIGS. 4A to 4D. FIGS. 4A to 4D are views illustrating the third finding according to the present invention. In FIGS. 4D and 4F, the arrows facing each other indicate compressive strain, and the arrows pointing to the opposite sides indicate tensile strain.

Figure 4A:
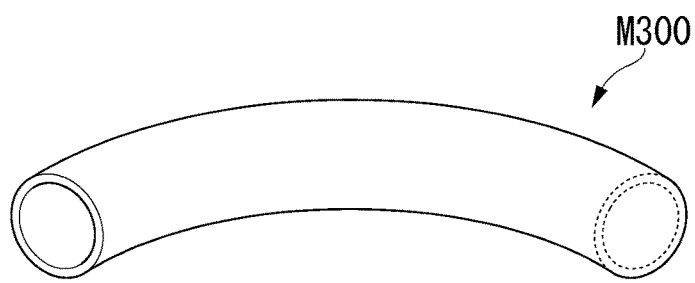
FIG. 4A is a view illustrating a third finding according to the present invention, and is a view showing an example of the third model according to the third finding.

The third finding is, for example, as shown in FIG. 4A, an example of a member model (hereinafter, referred to as a third model) M300 including, for example, a curved portion having a circular closed cross section that is bent in a curved shape in the forming direction.

Figure 4B:
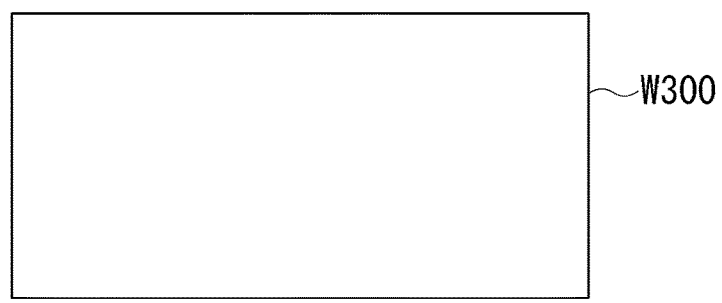
FIG. 4B is a view illustrating the third finding according to the present invention, and is a view showing an example of a metal material sheet according to the third model.

The third model M300 is formed by forming a rectangular metal material sheet W300 as shown in FIG. 4B in order of a press forming step, a flangeless forming step, and an O-forming step (abutting portion forming step). Here, an example in which the third model M300 is formed by the press forming will be described, but the same finding is established even in a case where the third model M300 is formed by bending forming. The bending forming will be described later.

Figure 4C:
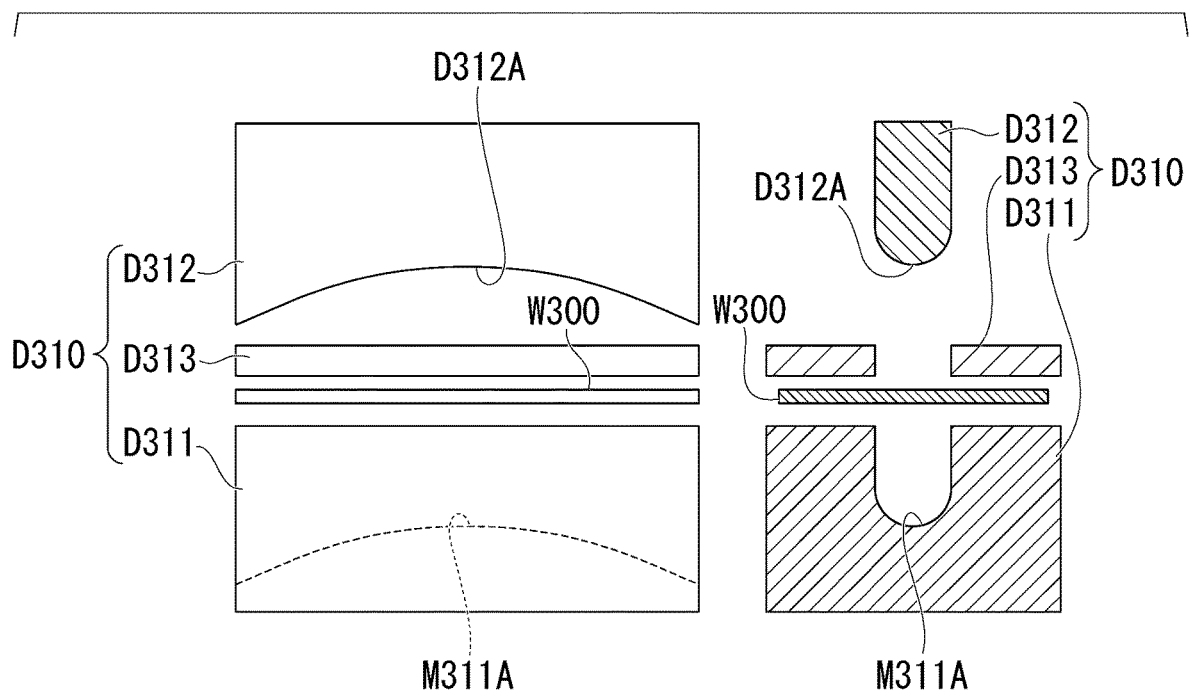
FIG. 4C is a view illustrating the third finding according to the present invention, and is a view showing an example of a press forming step according to the third model.
Figure 4D:
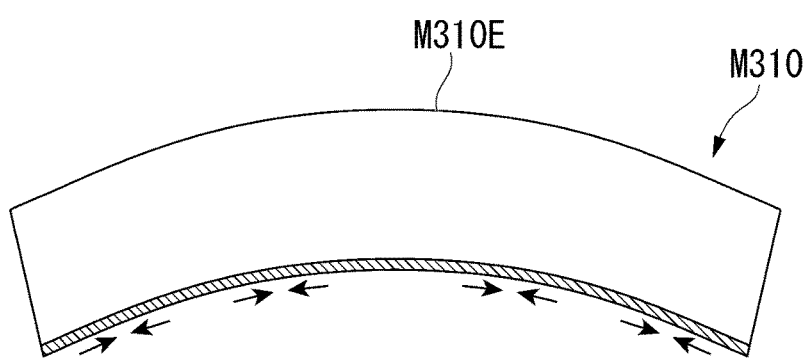
FIG. 4D is a view illustrating the third finding according to the present invention, and is a view of a cross section including a centroid line showing an example of the press forming step according to the third model.

In the press forming step, as shown in FIG. 4C, a press-formed article is formed using a press forming die and punch D (U-forming die and punch) 310 including a press forming recessed die D311, a press forming punch D312, a metal material sheet pressing tool D313. The left figure of FIG. 4C is a side view of the press forming die and punch D310 and the metal material sheet W300 set in the press forming die and punch D310, and the right figure is a cross-sectional view perpendicular to the longitudinal direction of these members.

In the press forming recessed die D311, a press forming recessed part D311A having a lower forming shape portion corresponding to the final shape of the third model M300 in a range of approximately 180° (lower half) with respect to the centroid line when viewed in the centroid line direction of the third model M300 and an upper forming shape portion that is connected to the lower forming shape portion and is formed to extend upward from the upper end of the lower forming shape portion is formed. In addition, in the press forming punch D312, a press forming protrusion D312A configured to correspond to the inner circumferential surface of the press-formed article at a predetermined interval from the press forming recessed part D311A is formed.

The metal material sheet pressing tool D313 presses the metal material sheet W300 against the press forming recessed die D311 on both sides across the press forming recessed part D311A during press forming.

Then, the metal material sheet W300 is press-formed by the press forming punch D312 and the press forming recessed die D311, whereby a press-formed article that is open to the press forming punch D312 side and has a recessed shape portion on the press forming recessed die D311 side is formed.

In the press forming step, compressive strain as shown in FIG. 4D is generated on the recessed shape portion side of a press-formed article M310. Reference numeral M310 denotes a flangeless press-formed article.

Figure 4E:
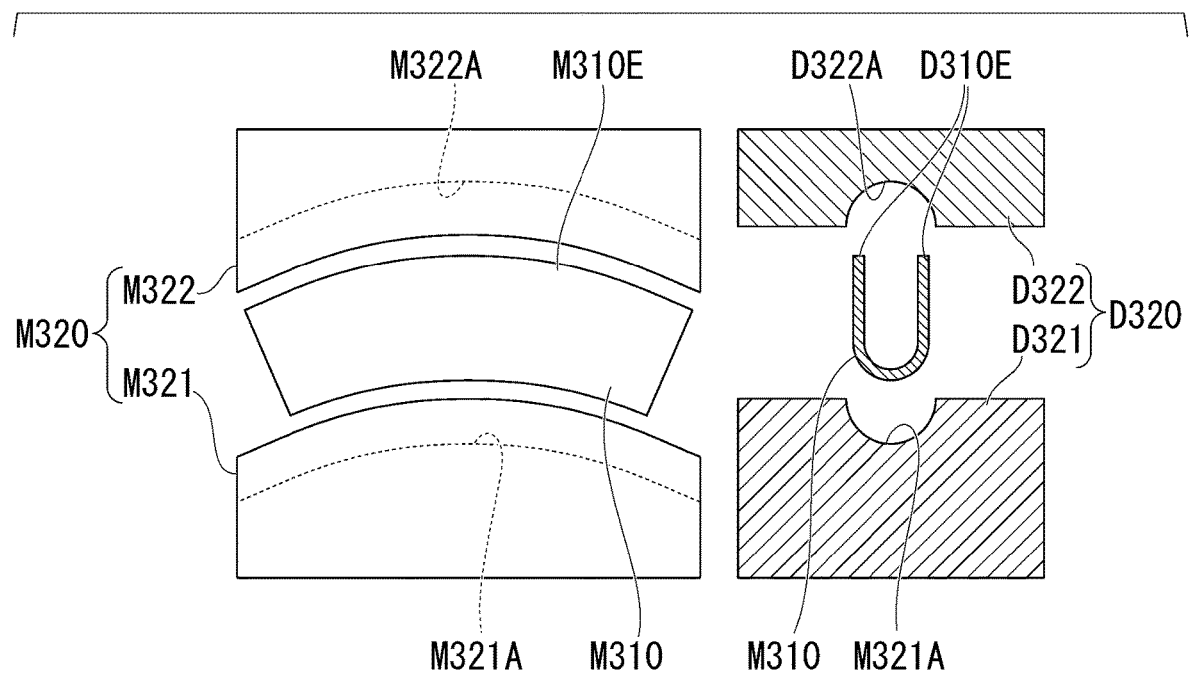
FIG. 4E is a view illustrating the third finding according to the present invention, and is a view showing an example of an abutting portion forming step according to the third model.
Figure 4F:
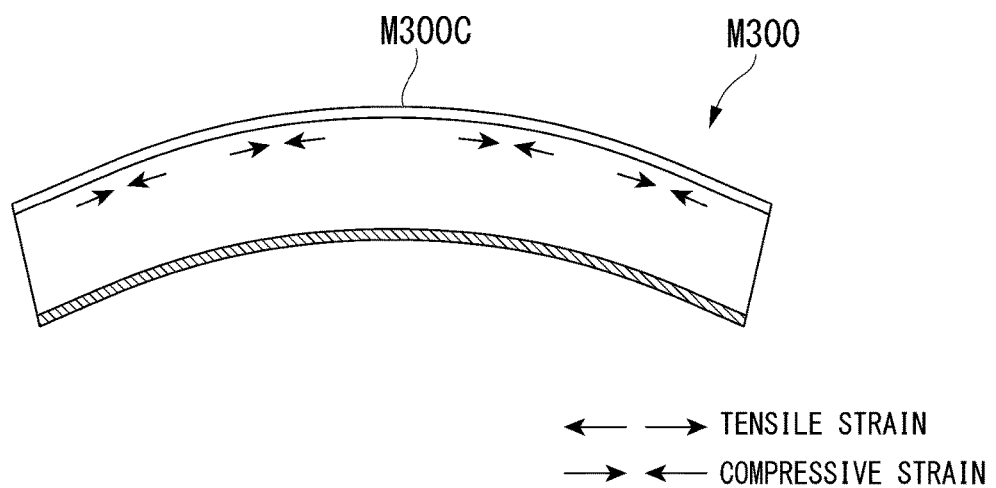
FIG. 4F is a view illustrating the third finding according to the present invention, and is a view of a cross section including a centroid line showing an example of an abutting portion formed article according to the third model.

In the O-forming step, as shown in FIG. 4E, the O-forming step is performed using an O-forming die D320. Specifically, by a lower die (first recessed die) D321 in which a lower die recessed part D321A is formed and an upper die (second recessed die) D322 in which an upper die recessed part D322A that side end portions M310E of abutting scheduled portions are to follow is formed, the respective side end portions M310E of the abutting scheduled portions of the flangeless press-formed article M310 are caused to abut each other to form abutting portions M300C, whereby the third model M300 is formed. The left figure of FIG. 4E is a side view of the lower die D321, the upper die D322, and the flangeless press-formed article M310 disposed therebetween, and the right figure is a cross-sectional view perpendicular to the longitudinal direction of these members.

In the O-forming step, compressive strain as shown in FIG. 4F is generated on the abutting portion M300C side.

Here, the curvature of the centroid line at the curved portion may be in a range of 0.002 mm$^{-1}$ to 0.02 mm$^{-1}$.

Even in such press forming, the forming condition ratio a is set to 0.85 to 0.95 (fourth finding). By setting the forming condition ratio a to a value within such a range, the abutting scheduled portions of the curved portion can be brought into close contact with each other at high accuracy during the O-forming step, and furthermore, the third model M300 having the curved portion can be efficiently manufactured.

By performing the above-mentioned forming condition ratio setting step in one or a plurality of cycles, a preferable range of the forming condition ratio a may be found.

The third finding is also applied to bending forming. Hereinafter, an example in which the third finding of the present invention is applied to bending forming will be described with reference to FIGS. 21A to 21D. FIGS. 21A to 21D are views illustrating the example in which the third finding according to the present invention is applied to bending forming. In FIGS. 21D and 21F, the arrows facing each other indicate compressive strain, and the arrows pointing to the opposite sides indicate tensile strain.

Figure 21A:
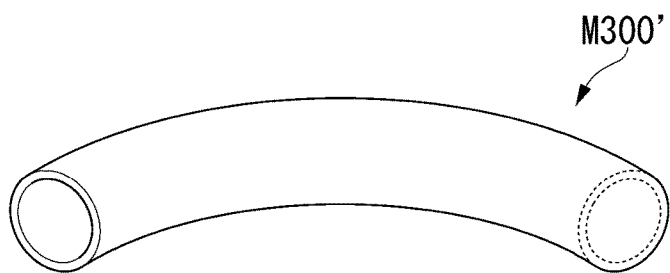
FIG. 21A is a view illustrating the third finding according to the present invention, and is a view showing an example of a third model according to the third finding.

The third finding is, for example, as shown in FIG. 21A, an example of a member model (hereinafter, referred to as a third model) M300' including, for example, a curved portion having a circular closed cross section that is bent in a curved shape in the forming direction.

Figure 21B:
FIG. 21B is a view illustrating the third finding according to the present invention, and is a view showing an example of a metal material sheet according to the third model.

The third model M300' is formed by forming a rectangular metal material sheet W300' as shown in FIG. 21B in order of a bending forming step and an O-forming step (abutting portion forming step).

Figure 21C:
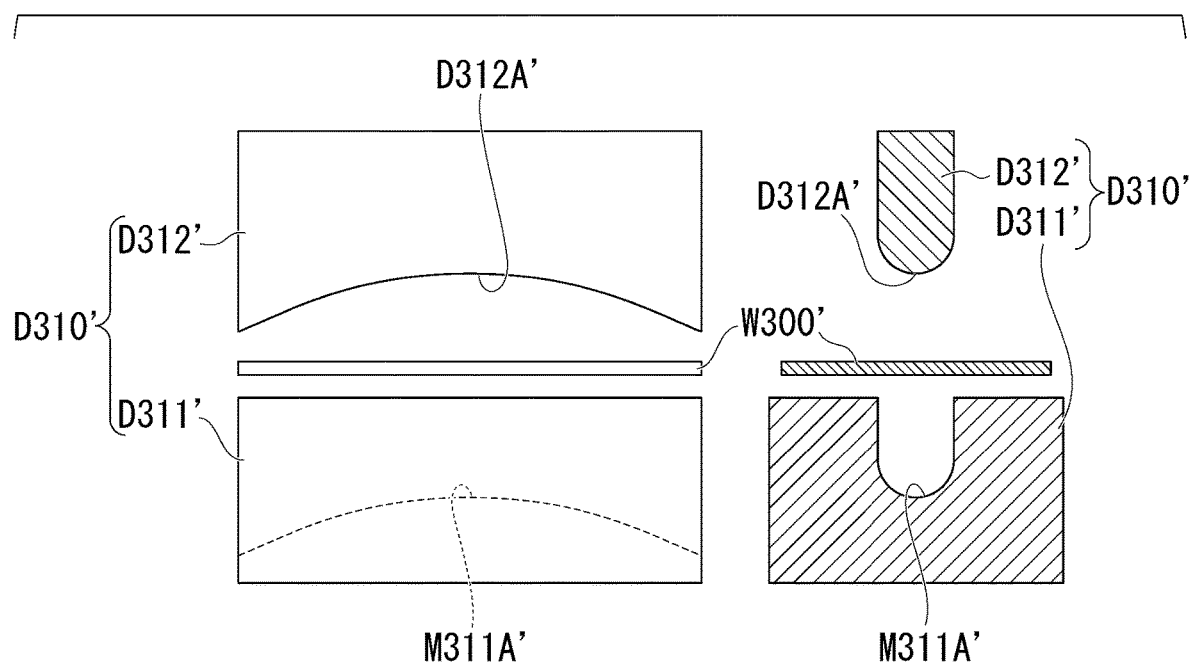
FIG. 21C is a view illustrating the third finding according to the present invention, and is a view showing an example of a bending forming step according to the third model.
Figure 21D:
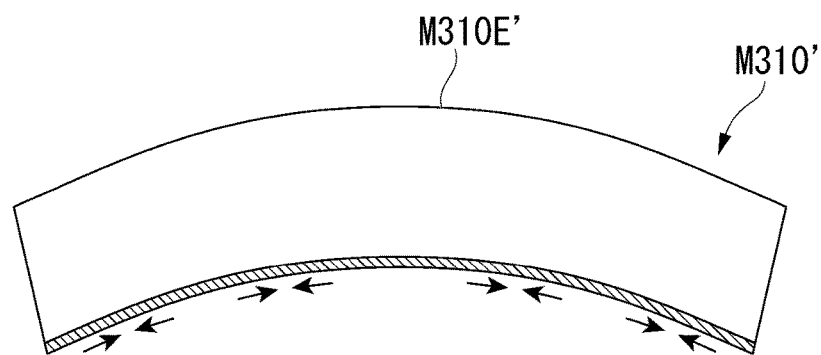
FIG. 21D is a view illustrating the third finding according to the present invention, and is a view of a cross section including a centroid line showing an example of a bending-formed article according to the third model.

In the bending forming step, as shown in FIG. 21C, a bending-formed article M310' is formed using a bending forming die and punch (U-forming die and punch) D310' including a bending forming recessed die D311' and a bending forming punch D312'. The left figure of FIG. 21C is a side view of the bending forming die and punch D310' and the metal material sheet W300' set in the bending forming die and punch D310', and the right figure is a cross-sectional view perpendicular to the longitudinal direction of these members.

In the bending forming recessed die D311', a bending forming recessed part D311A' having a lower forming shape portion corresponding to the final shape of the third model M300' in a range of approximately 180° (lower half) with respect to the centroid line when viewed in the centroid line direction of the third model M300' and an upper forming shape portion that is connected to the lower forming shape portion and is formed to extend upward from the upper end of the lower forming shape portion is formed. In addition, in the bending forming punch D312', a bending forming protrusion D312A' configured to correspond to the inner circumferential surface of the bending-formed article M310' at a predetermined interval from the bending forming recessed part D311A' is formed.

Then, the metal material sheet W300' is bending-formed by the bending forming punch D312' and the bending forming recessed die D311', whereby the bending-formed article M310' that is open to the bending forming punch D312' side and has a recessed shape portion on the bending forming recessed die D311' side is formed.

In the bending forming step, compressive strain as shown in FIG. 21D is generated on the recessed shape portion side of the bending-formed article M310'.

Figure 21E:
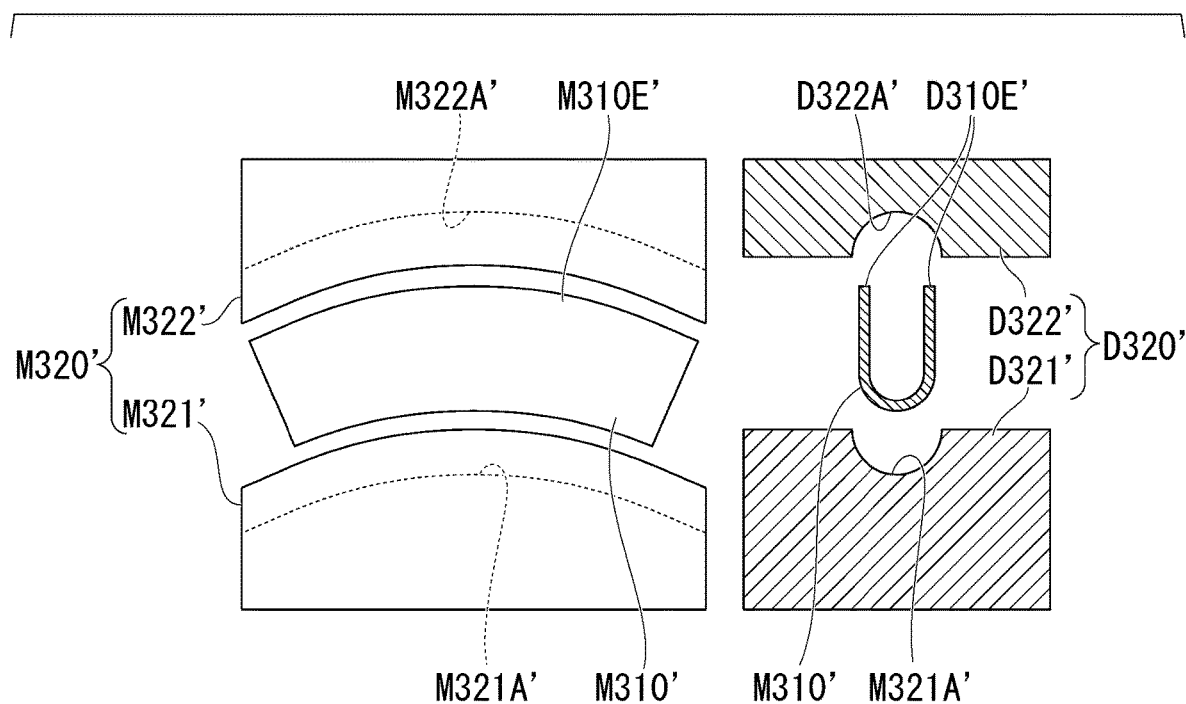
FIG. 21E is a view illustrating the third finding according to the present invention, and is a view showing an example of an abutting portion forming step according to the third model.
Figure 21F:
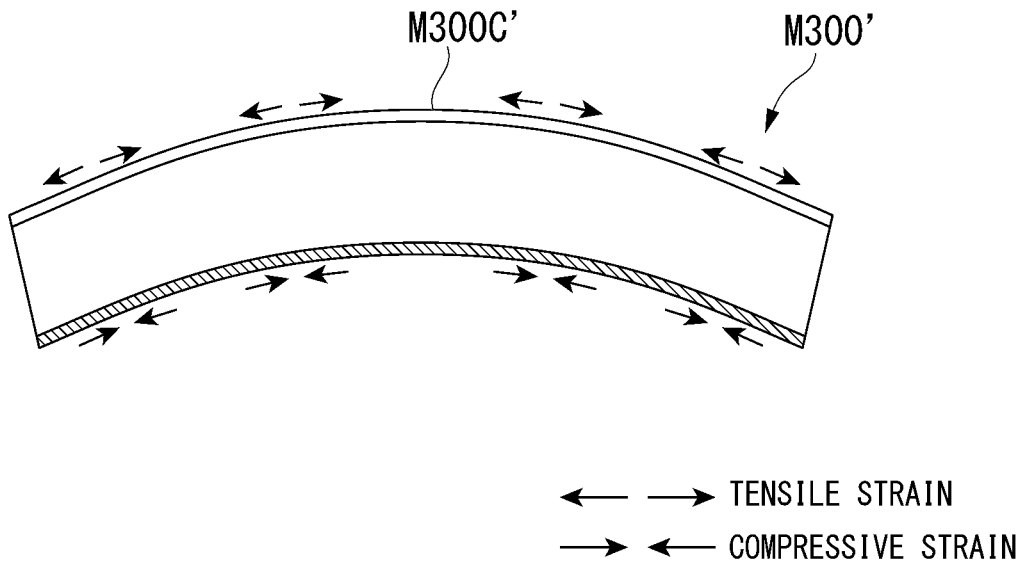
FIG. 21F is a view illustrating the third finding according to the present invention, and is a view of a cross section including a centroid line showing an example of an abutting portion formed article according to the third model.

In the O-forming step, as shown in FIG. 21E, the O-forming step is performed using an O-forming die D320'. Specifically, by a lower die (first recessed die) D321' in which a lower die recessed part D321A' is formed and an upper die (second recessed die) D322' in which an upper die recessed part D322A' that side end portions M310E' of abutting scheduled portions are to follow is formed, the respective side end portions M310E' of the abutting scheduled portions of the bending-formed article M310' are caused to abut each other to form abutting portions M300C', whereby the third model M300' is formed. The left figure of FIG. 21E is a side view of the lower die D321', the upper die D322', and the bending-formed article M310' disposed therebetween, and the right figure is a cross-sectional view perpendicular to the longitudinal direction of these members.

In the O-forming step, tensile and compressive strains as shown in FIG. 21F are generated on the abutting portion M300C' side.

Here, the curvature of the centroid line at the curved portion may be in a range of 0.002 mm$^{-1}$ to 0.02 mm$^{-1}$.

Even in such bending forming, the forming condition ratio a is set to 0.85 to 0.95 (fourth finding). By setting the forming condition ratio a to a value within such a range, the abutting scheduled portions of the curved portion can be brought into close contact with each other at high accuracy during the O-forming step, and furthermore, the third model M300' having the curved portion can be efficiently manufactured. By performing the above-mentioned forming condition ratio setting step in one or a plurality of cycles, a preferable range of the forming condition ratio a may be found.

[Fifth Finding]

The metal material (metal sheet) to which each of the above findings (and each embodiment described later) can be applied is not particularly limited, but may be, for example, a steel sheet. Examples of the steel sheet include a thin material (sheet thickness/equivalent diameter (diameter of a cross section perpendicular to the longitudinal direction of the tubular portion) is 10% or less) and a high tensile material (tensile strength (TS) is 300 MPa or more, and more preferably 400 MPa or more). In a case of using such a steel sheet, the springback increases. However, by setting the forming condition ratio a to 0.85 to 0.95, the springback can be appropriately suppressed. Examples of other kinds of metal sheet include an Al sheet. The thickness of the metal sheet is not particularly limited, but may be, for example, 1.0 to 2.9 mm.

[Sixth Finding]

For the evaluation of the strain amount of the abutting scheduled portion, the calculation based on the geometrical relationship is effective, and for example, the analysis using a finite element method is particularly effective.

As is clear from the above findings and examples described later, for example, in a case where all of the following conditions are satisfied when a steel sheet having a tensile strength of 300 to 600 MPa and a sheet thickness of 1.5 to 3.0 mm is subjected to UO forming into a specific three-dimensional tubular portion, it is possible to efficiently form (a member having) the specific three-dimensional tubular portion.

At least one or more of conditions that the change Rh in the length in the direction including the centroid line of the cross-sectional shape of the cross-sectional shape changing portion and the abutting portion along the centroid line is 10% to 50%, the change Re in the circumferential length change rate of the circumferential length change rate changing portion is 0.035 mm$^{-1}$ to 0.35 mm$^{-1}$, and the curvature R1 of the curved portion is 0.002 mm$^{-1}$ to 0.02 mm$^{-1}$ is satisfied.

The forming condition ratio a is 0.85 to 0.95.

First Embodiment

Hereinafter, a trailing arm body according to a first embodiment of the present invention will be described with reference to FIGS. 5 to 16G.

Figure 5:
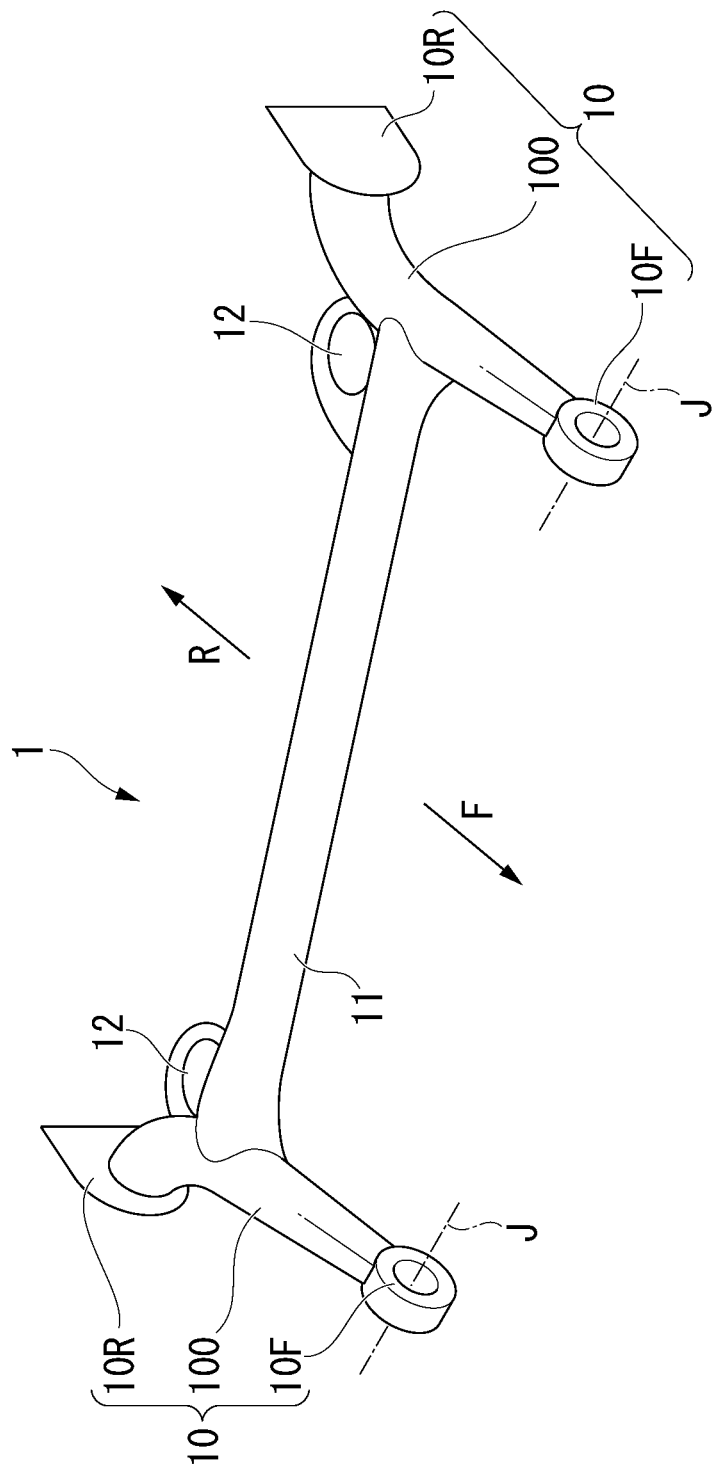
FIG. 5 is a view illustrating an example of a torsion beam Assy according to a first embodiment of the present invention.

FIG. 5 is a perspective view illustrating a schematic configuration of a torsion beam Assy used in a torsion beam type rear suspension device (torsion beam type suspension device) according to the first embodiment of the present invention.

In FIG. 5, reference numeral 1 denotes the torsion beam Assy, reference numeral 10 denotes a trailing arm, and reference numeral 11 denotes a torsion beam. Reference numeral F shown in the figure denotes the front of the vehicle, and reference numeral R denotes the rear.

As shown in FIG. 5, the torsion beam Assy 1 includes left and right trailing arms 10 forming a pair that rotatably supports the left and right steel wheels, the torsion beam 11 that connects the left and right trailing arms 10 to each other, and spring receiving portions 12 forming a pair that supports springs (not sown).

In addition, one end side of an absorber, which is a buffering device, is connected to a buffer receiving portion (not shown) of the torsion beam Assy 1.

As shown in FIG. 5, the trailing arm 10 includes, for example, a trailing arm body 100, a pivot attachment member 10F that is connected to the front side end of the trailing arm body 100 and supported by the vehicle body via a pivot shaft J, and a steel wheel attachment member 10R that is connected to the rear side end to support the steel wheel.

Hereinafter, the trailing arm body 100 according to the first embodiment will be described with reference to FIGS. 6 and 7A to 7D.

Figure 6:
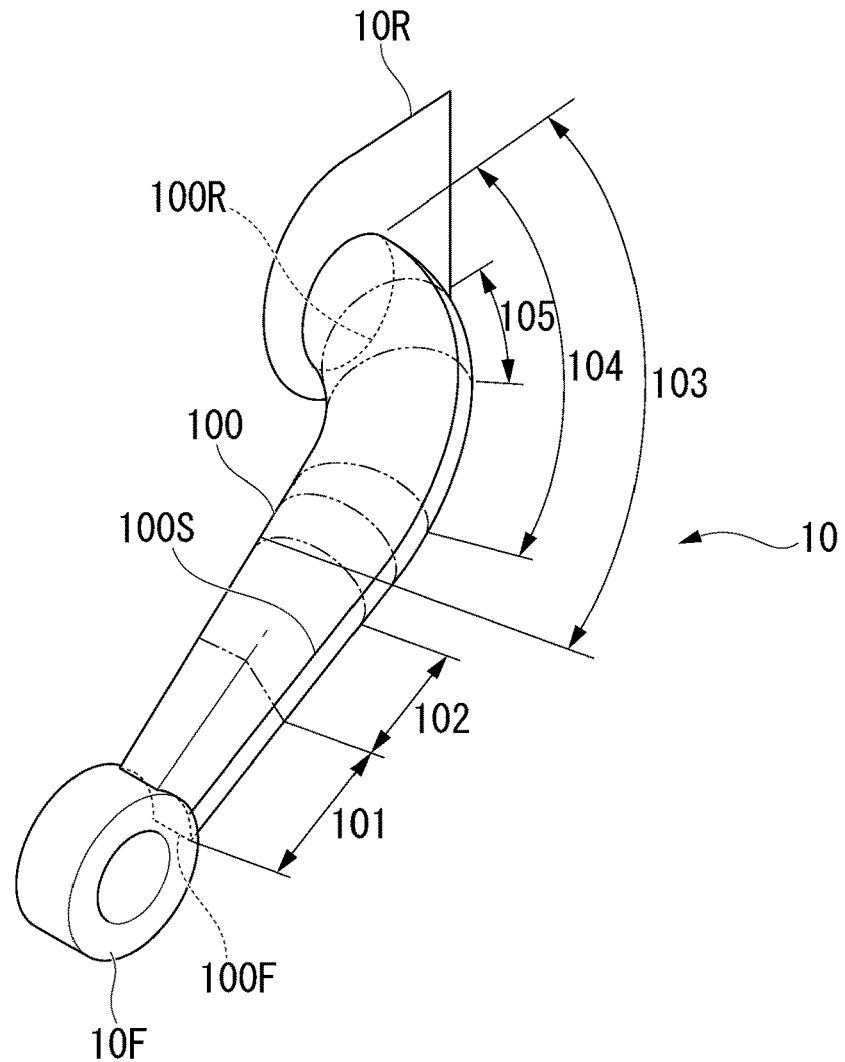
FIG. 6 is a view illustrating a trailing arm according to the first embodiment of the present invention, and is a perspective view showing a railing arm body.
Figure 7A:
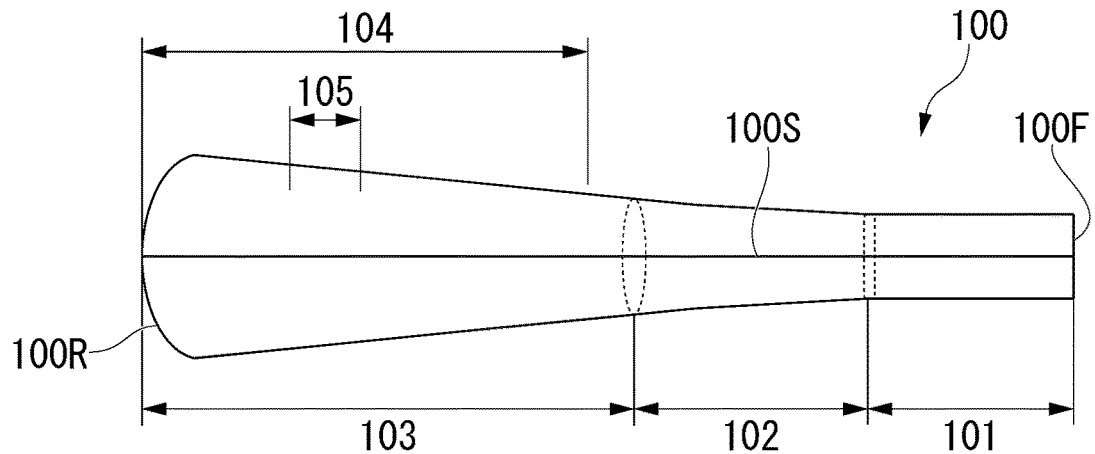
FIG. 7A is a view illustrating the trailing arm body according to the first embodiment, and is a view of the trailing arm body viewed from a punch side in a press forming direction.

FIG. 6 is a perspective view illustrating the trailing arm body 100. FIG. 7A is a view of the trailing arm body 100 viewed from a press forming punch side in a forming direction of the trailing arm body 100, FIG. 7B is a view of the trailing arm body 100 viewed in a direction orthogonal to a plane that includes a centroid line and is formed in the forming direction (that is, from a side), FIG. 7C is a view showing a front side closed cross section 100F of the trailing arm body 100 taken along the arrows VIIC-VIIC in FIG. 7B, and FIG. 7D is a view showing a rear side closed cross section 100R of the trailing arm body 100 taken along the arrows VIID-VIID in FIG. 7B.

Figure 7B:
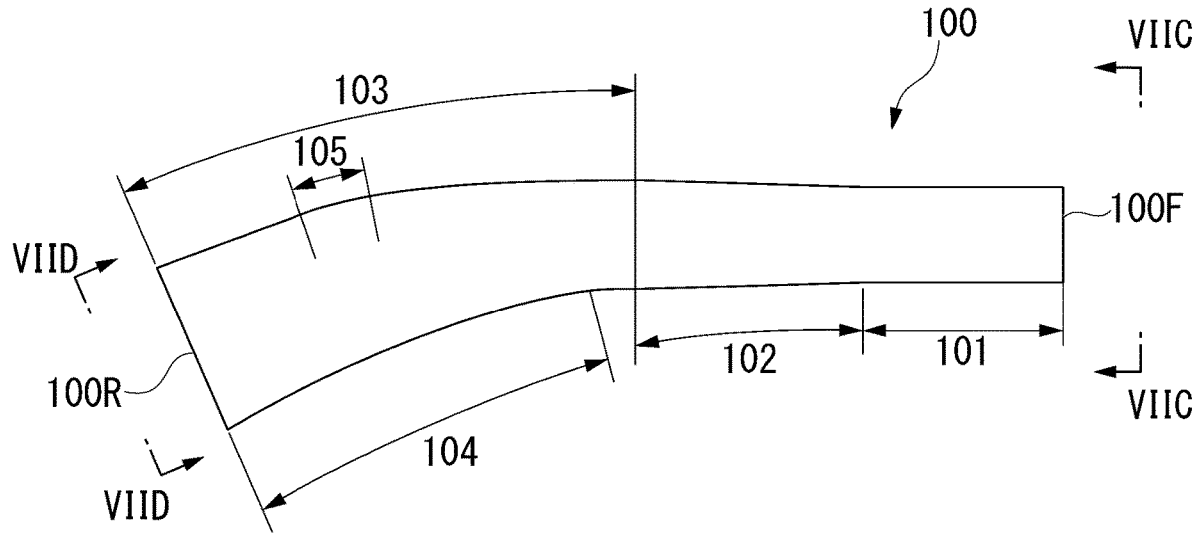
FIG. 7B is a view illustrating the trailing arm body according to the first embodiment, and is a view of the trailing arm body viewed from a side orthogonal to the press forming direction.

As shown in FIGS. 6, 7A, and 7B, the trailing arm body 100 is a member for a vehicle (member) having a tubular body (specific three-dimensional tubular portion) including, in a direction from the front side closed cross section 100F toward the rear side closed cross section 100R, a straight shape portion 101 having a rectangular closed cross section, a cross-sectional shape changing portion (specific three-dimensional shape portion) 102, a circumferential length changing portion 103, a curved portion (specific three-dimensional shape portion) 104 formed in the circumferential length changing portion 103, a circumferential length change rate changing portion (specific three-dimensional shape portion) 105, and a seam portion (joint portion) 100S joined by welding, which are sequentially formed along the centroid line.

Figure 7C:
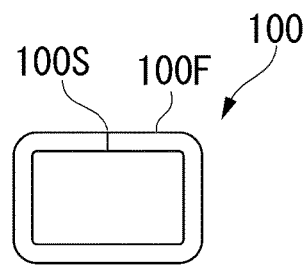
FIG. 7C is a view illustrating the trailing arm body according to the first embodiment, and is a front side closed cross section of a trailing arm body 100 taken along the arrows VIIC-VIIC in FIG. 7B.

As shown in FIGS. 6 and 7C, in the trailing arm body 100, for example, the front side closed cross section 100F is a rectangular closed cross section, and the pivot attachment member 10F is attached to the front side closed cross section 100F by welding.

Figure 7D:
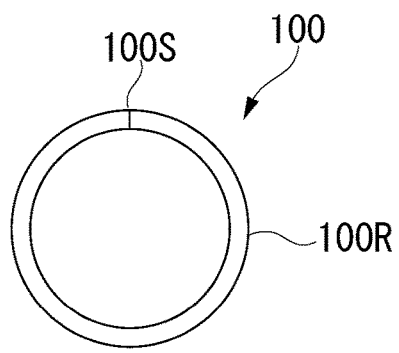
FIG. 7D is a view illustrating the trailing arm body according to the first embodiment, and is a rear side closed cross section of the trailing arm body 100 taken along the arrows VIID-VIID in FIG. 7B.

As shown in FIGS. 6 and 7D, the rear side closed cross section 100R is a circular closed cross section, and the steel wheel attachment member 10R side is attached to the rear side closed cross section 100R by welding.

In this embodiment, for example, the seam portion 100S is disposed on the vehicle body inner side in the torsion beam Assy 1.

As shown in FIGS. 6, 7A, and 7B, in the straight shape portion 101, the same rectangular closed cross section as the front side closed cross section 100F is formed linearly in a predetermined range from the front side closed cross section 100F side toward the rear side closed cross section 100R side.

The cross-sectional shape changing portion 102 is connected to the rear side closed cross section 100R side of the straight shape portion 101 and is formed so that the rectangular closed cross section of the straight shape portion 101 is gradually transitioned to the circular closed cross section toward the rear side closed cross section 100R side along the centroid line.

In this embodiment, in the cross-sectional shape changing portion 102, a change in length in a direction including the centroid line of the cross-sectional shape and an abutting portion is in a range of 10% to 50% (for example, 40%). Here, two points set along the centroid line are set to, for example, an R side end portion and an F side end portion of the cross-sectional shape changing portion 102.

The circumferential length changing portion 103 is configured by a circular closed cross section which is connected to the rear side of the cross-sectional shape changing portion 102 and is a portion in which the circumferential length of the circular closed cross section gradually increases (increases in diameter) toward the front side along the centroid line.

Furthermore, in this embodiment, for example, the curved portion 104 is formed in the circumferential length changing portion 103, and the circumferential length change rate changing portion 105 is formed in the curved portion 104.

In this embodiment, for example, the curved portion 104 is formed partway in the circumferential length changing portion 103 to the rear side closed cross section 100R, and is a portion having a centroid line formed in a curved shape in a side view.

In this embodiment, the curved portion 104 is configured such that the curvature of the centroid line (not shown) is in a range of 0.002 mm$^{-1}$ to 0.02 mm$^{-1}$.

In this embodiment, for example, the circumferential length change rate changing portion 105 is formed partway in the circumferential length changing portion 103, and in the circumferential length changing portion 103, the circumferential length change rate of the circular closed cross section that gradually increases in length toward the front side along the centroid line changes, and a recessed part or a protrusion is formed in the circumferential length changing portion 103.

In this embodiment, for example, the circumferential length change rate changing portion 105 is configured so that the change in the circumferential length change rate is in a range of 0.035 mm$^{-1}$ to 0.35 mm$^{-1}$.

In this embodiment, for example, although the diameter-increasing state of the circumferential length changing portion 103 is maintained in the circumferential length change rate changing portion 105, the circumferential length change rate changing portion 105 may be configured in a tubular portion that is transitioned to a diameter-reducing portion or a straight shape.

Figure 8:
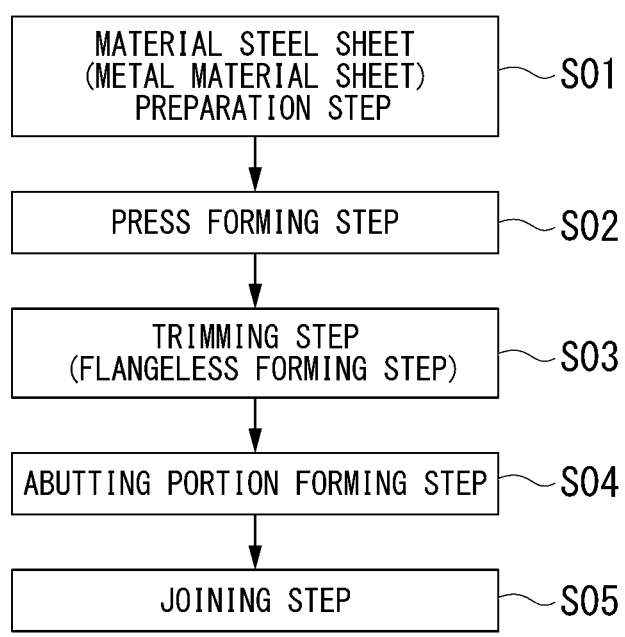
FIG. 8 is a flowchart illustrating an example of an outline of a manufacturing process of a member according to the present invention.

Next, an outline of a manufacturing method of the trailing arm body 100 to which the tubular portion forming method according to the present invention is applied will be described with reference to FIG. 8. FIG. 8 is an example of a flowchart illustrating an outline of a manufacturing method of a member according to the present invention. In the present embodiment, the trailing arm body 100 is manufactured by press forming.

As shown in FIG. 8, the manufacturing process of the trailing arm body 100 includes, for example, a material steel sheet (metal material sheet) preparation step (S01), a press forming step (S02), and a trimming step (flangeless forming step) (S03), an O-forming step (abutting portion forming step) (S04), and a joining step (S05).

In the first embodiment, die and punches used in the manufacturing process of the trailing arm body 100 include, for example, a press forming die and punch used in the press forming step, a trimming die used in the trimming step (flangeless forming step), and an O-forming die used in the O-forming step (abutting portion forming step).

[Material Steel Sheet (Metal Material Sheet) Preparation Step]

(1) The material steel sheet preparation step is a step of preparing a material steel sheet (metal material sheet) to be formed in the press forming step (S01).

In the material steel sheet preparation step, for example, a material steel sheet in which a flangeless press-formed article that is subjected to abutting in the abutting portion forming step is developed and an excess thickness portion is added to the exterior shape thereof is prepared. In a case where it is not necessary to set the trimming step described later, the material steel sheet may have an exterior shape in which the flangeless press-formed article is developed as it is. In addition, for example, it is possible to prepare a rectangular material steel sheet on the assumption that the shape is adjusted in the trimming step.

[Press Forming Step]

(2) The press forming step is a step of press-forming the material steel sheet (metal material sheet) with the press forming die and punch to form a press-formed portion of which a press forming punch side in a Z-axis direction is open (S02).

In the press forming step, the material steel sheet (metal material sheet) is press-formed (press forming) by the press forming die and punch (press forming die and punch) to form a press-formed article (press-formed portion) having a recessed cross-sectional shape.

[Trimming Step (Flangeless Forming Step)]

(3) In the first embodiment, the trimming step (flangeless forming step) is a step of removing an extending portion (excess thickness portion formed to extend outward from both side end portions of a recessed cross-sectional shape portion of the press-formed article) formed in the press forming step with the trimming die to form a flangeless press-formed article having side end portions on both sides (S03).

In the press forming step, in a case where it is possible to form a flangeless press-formed article having no excess thickness portion, the flangeless forming step may be completed in the press forming die and punch die.

[O-Forming Step]

(4) The O-forming step (abutting portion forming step) is a step of causing the side end portions (abutting scheduled portions) of the flangeless press-formed article to abut each other with the O-forming die (S04).

[Joining Step]

(5) The joining step is a step of joining both side end portions of an abutting portion formed article (O-formed article) to each other to form a joint portion (S05).

In the joining step, both side end portions of abutting portions of the abutting portion formed article are joined to each other by welding or the like to form a seam portion (joint portion).

For joining of the seam portion (joint portion), laser welding or the like as well as arc welding can be applied.

Next, the details of the manufacturing procedure of the trailing arm body 100 according to the first embodiment will be described with reference to FIGS. 9, 10, 11A to 11C, 12A to 12C, 13A to 13C, 15A to 15G, and 16A to 16G.

Figure 9:
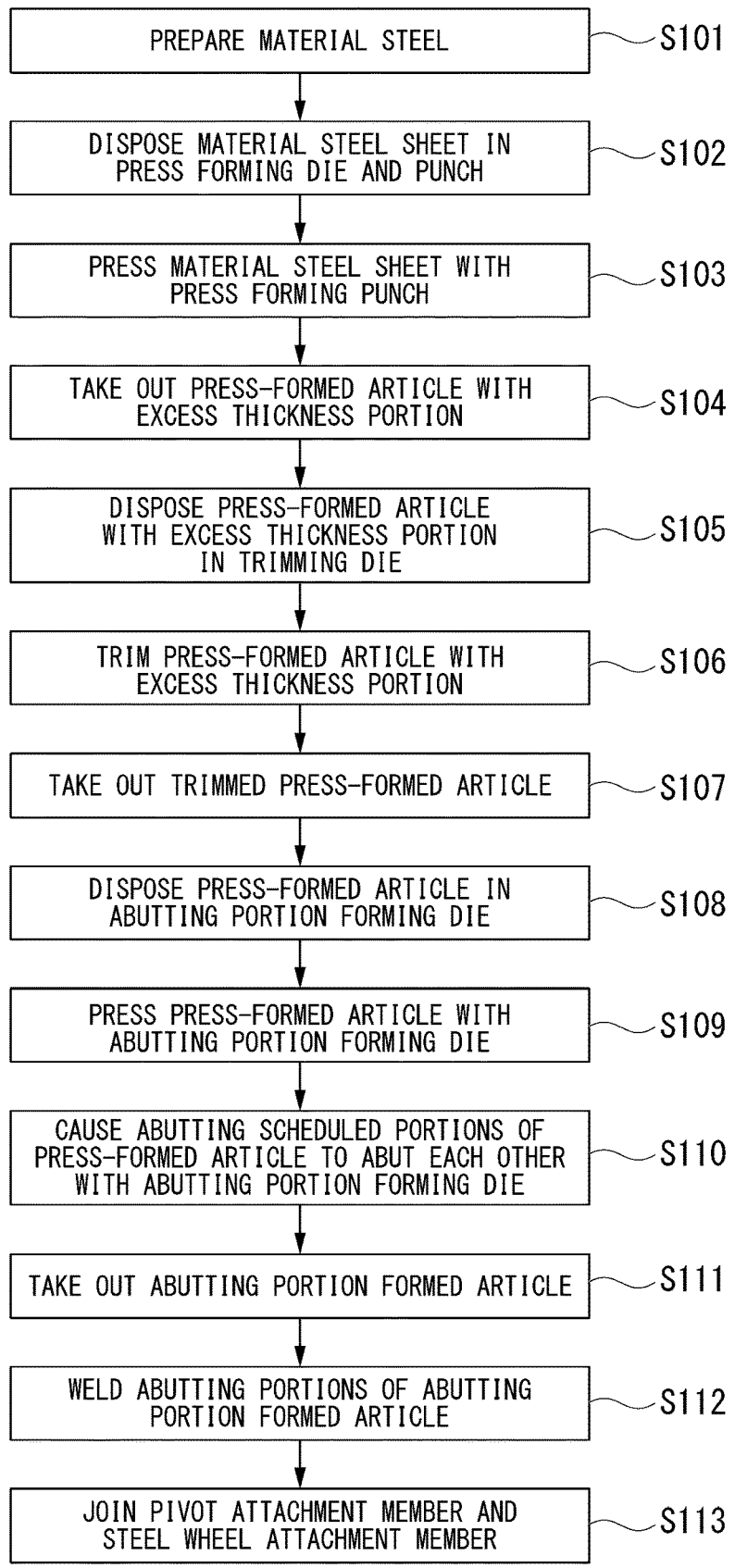
FIG. 9 is a flowchart illustrating a manufacturing process of the trailing arm body according to the first embodiment of the present invention.

FIG. 9 is a flowchart showing an example of a detailed procedure of the manufacturing process of the trailing arm body 100, in which S101 indicates the steel sheet preparation step, S102 to S104 indicate the press forming step, SS105 to S107 indicate the trimming step (flangeless forming step), S108 to S111 indicate the O-forming step (abutting portion forming step), and S112 indicates the joining step. In addition, S113 indicates a step of forming the trailing arm 10 by attaching the pivot attachment member 10F and the steel wheel attachment member 10R to the trailing arm body 100 by welding.

FIGS. 15A to 15G and FIGS. 16A to 16G are views showing details of the manufacturing process of the trailing arm body 100 according to the first embodiment. FIGS. 15A to 15G are views of a forming process of the trailing arm body 100 viewed from the front closed cross section 100F (see FIG. 7B) side, and FIGS. 16A to 16G are views viewed from the rear closed cross section 100R (see FIG. 7B) side.

[Material Steel Sheet Preparation Step]

First, the material steel sheet preparation step (S101) shown in FIG. 9 will be described.

In this embodiment, a material steel sheet (metal material sheet) having an excess thickness portion added to a developed flangeless press-formed article of the trailing arm body 100 is prepared.

Figure 10:
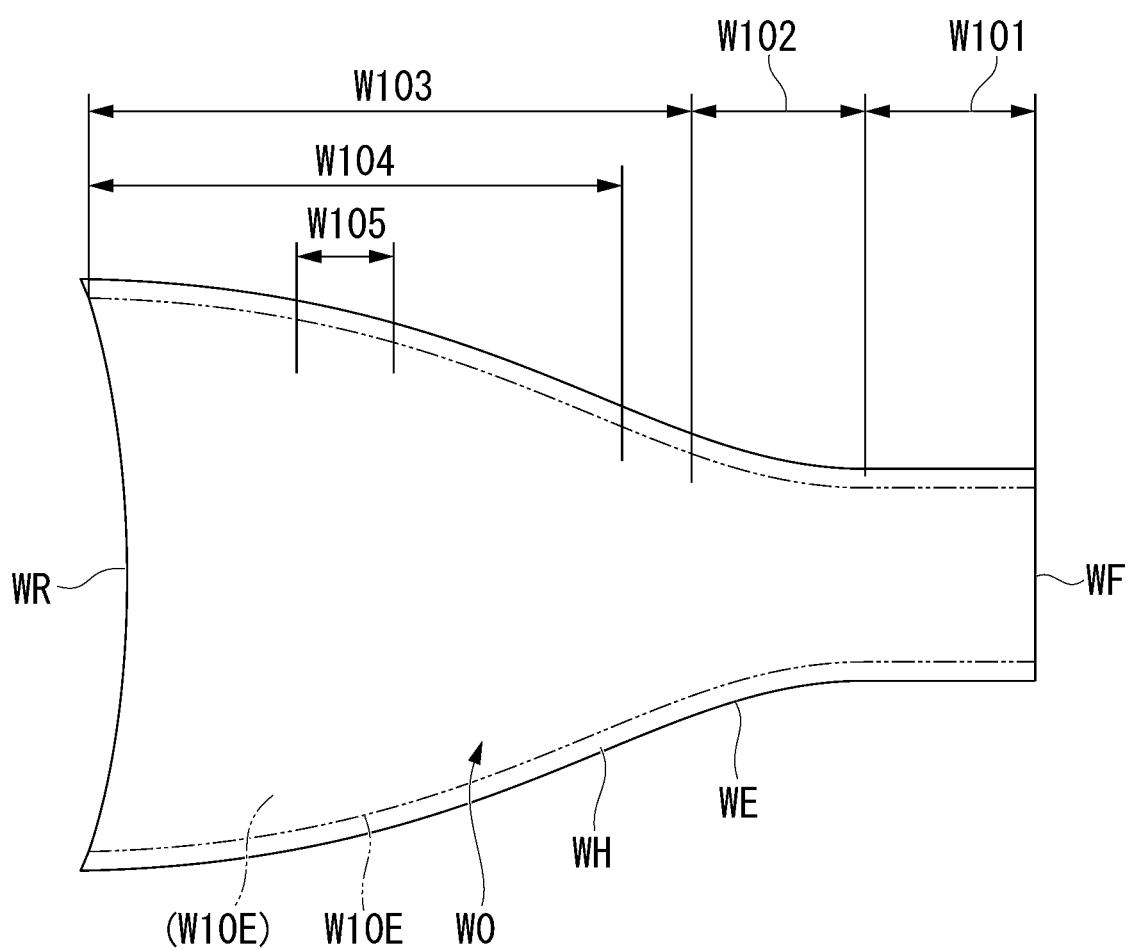
FIG. 10 is a view illustrating a schematic configuration of a material steel sheet for manufacturing the trailing arm body according to the first embodiment of the present invention.

Hereinafter, a material steel sheet W0 will be described with reference to FIG. 10. FIG. 10 is a view illustrating an example of a schematic configuration of the material steel sheet for manufacturing the trailing arm body 100 according to the first embodiment.

As shown in FIG. 10, for example, the material steel sheet W0 has a configuration in which an excess thickness portion WH, which is to be removed in the trimming step, is added to side end portions W10E of a planar figure (the portion indicated by two-dot chain lines) of the flangeless press-formed article of the trailing arm body 100.

The material steel sheet W0 includes, in a direction from a front side end portion WF corresponding to the rectangular closed cross section of the front side of the trailing arm body 100 toward a rear side end portion WR corresponding to the circular closed cross section of the rear side, a straight corresponding portion W101 corresponding to the straight shape portion 101, a cross-sectional shape change corresponding portion W102 corresponding to the cross-sectional shape changing portion 102, a circumferential length change corresponding portion W103 corresponding to the circumferential length changing portion 103, a curved corresponding portion W104 corresponding to the curved portion 104, and a circumferential length change rate change corresponding portion W105 corresponding to the circumferential length change rate changing portion 105, and side portions WE having an excess thickness portion are formed outside the side end portions W10E which are abutting scheduled portions formed to correspond to each portion.

In the material steel sheet W0, the straight corresponding portion W101 is formed in a rectangular shape, the cross-sectional shape change corresponding portion W102 and the curved corresponding portion W103 have an exterior shape formed in a fan shape that gradually increases in width from the front side end portion WF toward the rear side end portion WR and becomes gentle in the degree of width increase in the vicinity of the circumferential length change rate changing portion 105.

In this embodiment, for example, a material steel sheet having a tensile strength of 400 MPa and a sheet thickness of 1.2 mm is applied.

It is not necessary to limit the material and thickness of the steel sheet material. However, it is suitable to apply the press forming method according to the first embodiment to a material steel sheet having a tensile strength of 300 MPa or more, and more preferably 400 MPa or more, and a thickness of about 1.0 to 2.9 mm (for example, a thin steel sheet) from the viewpoint of suppressing the influence of springback.

[Press Forming Step]

In the press forming step, as shown in S102 to S104 in FIG. 9, the material steel sheet is disposed in the press forming die and punch (press forming die and punch) and is pressed by a press forming punch to be press-formed, and the formed press-formed article with an excess thickness portion is taken out.

Figure 11A:
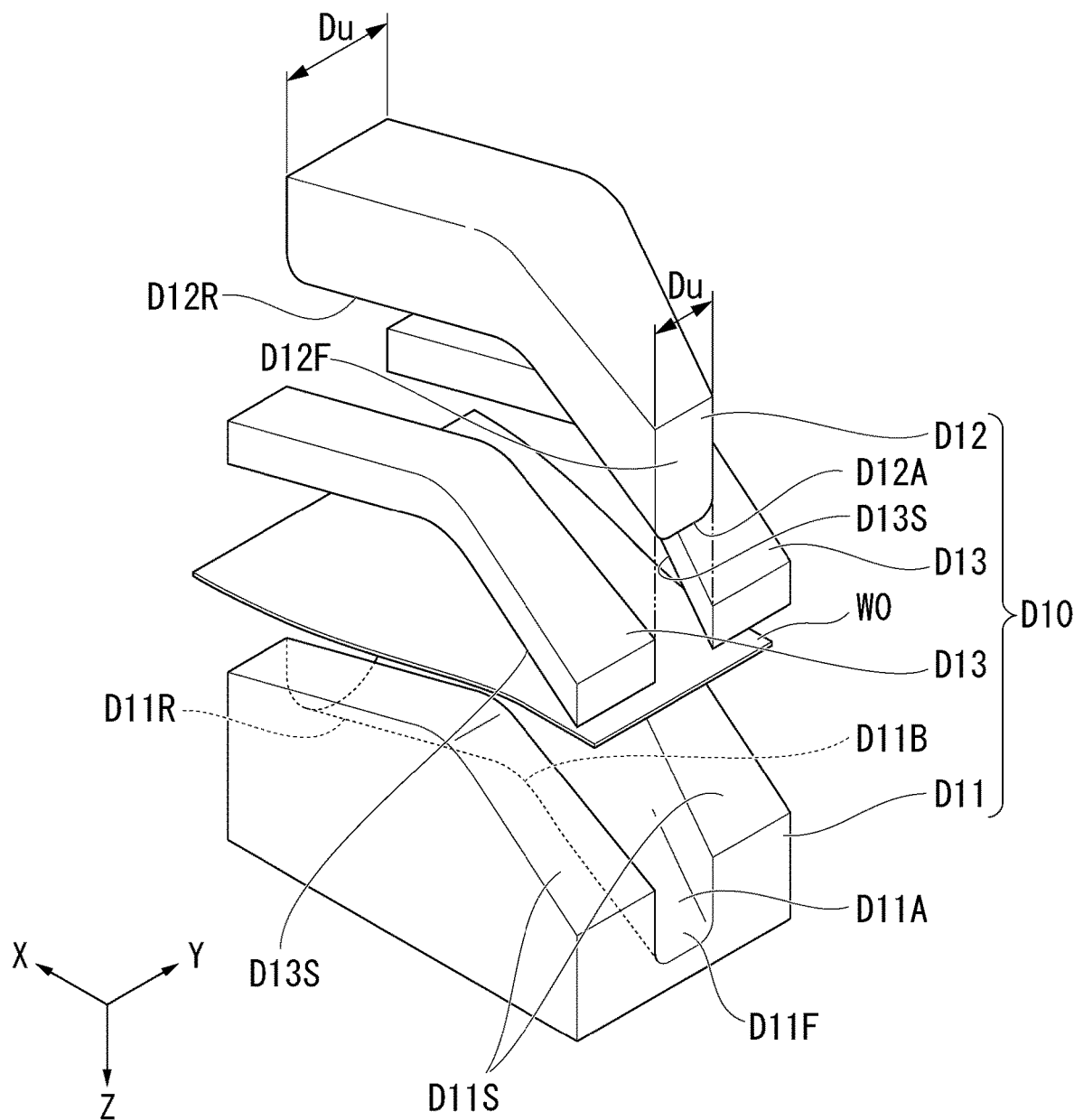
FIG. 11A is a view illustrating a press forming step in the manufacturing of the trailing arm body according to the first embodiment, and is a perspective view showing a schematic configuration of a press forming die and punch.

Hereinafter, a schematic configuration of a press forming die and punch D10 will be described with reference to FIGS. 11A, 15A, 15B, 16A, and 16B. FIG. 11A is a perspective view illustrating a schematic configuration of a press forming die and punch according to the first embodiment.

In this embodiment, as shown in FIGS. 11A, 15A, 15B, 16A, and 16B, the press forming die and punch D10 includes, for example, a press forming lower die (press forming recessed die) D11 which is a fixed die, a press forming punch D12 which is disposed above the press forming lower die D11 and is able to advance and retreat in an up-down direction (Z-axis direction) with respect to the press forming lower die D11, and a steel sheet pressing tool D13 that presses the material steel sheet W0 against the press forming lower die D11 on both sides of the press forming punch D12 during press forming.

Figure 15B:
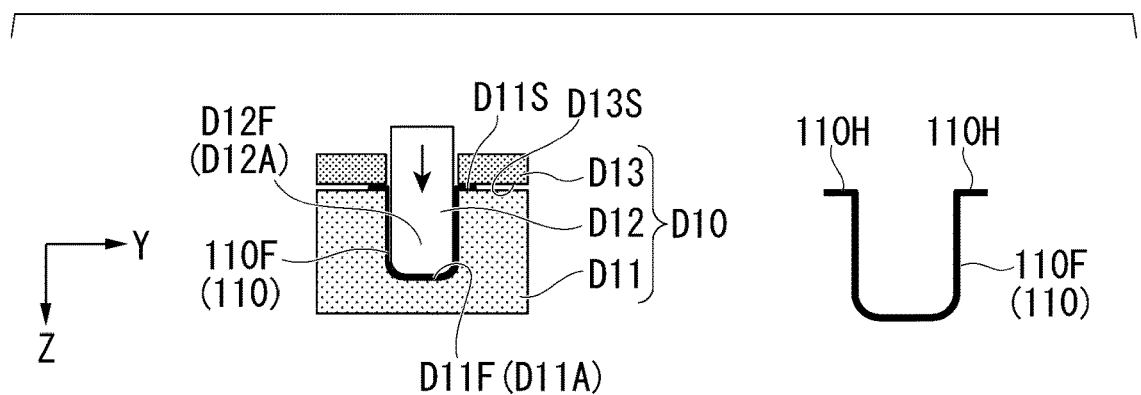
FIG. 15B is a view illustrating the outline of the manufacturing method of a trailing arm body according to the first embodiment of the present invention, and is a view of a state in which the material steel sheet is pressed against a press forming recessed die by a press forming punch and press-formed, and a press-formed article with an excess thickness portion, viewed from the front side of the trailing arm body.
Figure 16A:
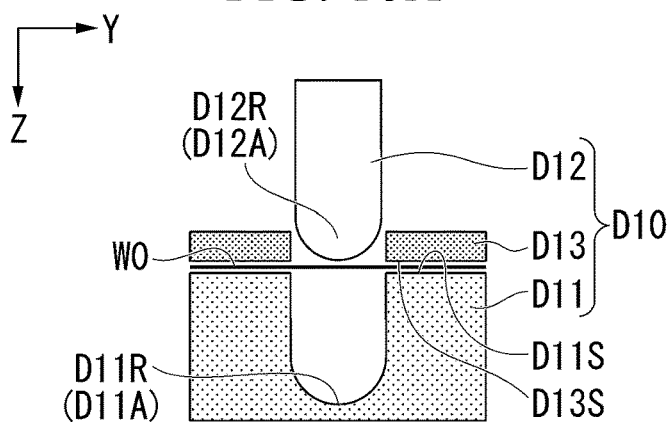
FIG. 16A is a view illustrating the outline of the manufacturing method of a trailing arm body according to the first embodiment of the present invention, and is a view of the state in which the material steel sheet is placed in the press forming die and punch, viewed from a rear side of the trailing arm body.
Figure 16B:
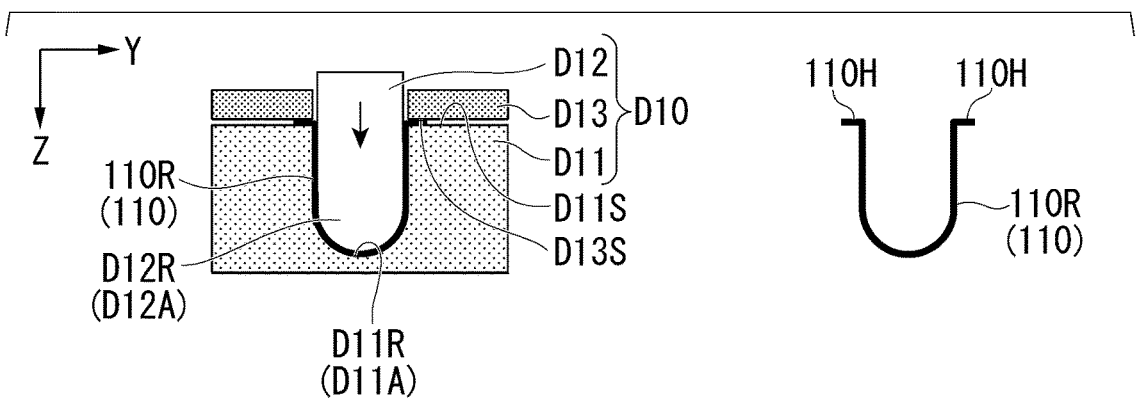
FIG. 16B is a view illustrating the outline of the manufacturing method of a trailing arm body according to the first embodiment of the present invention, and is a view of the state in which the material steel sheet is pressed against the press forming recessed die by the press forming punch and press-formed, and the press-formed article with an excess thickness portion, viewed from the rear side of the trailing arm body.

As shown in FIG. 11A, the press forming lower die D11 has a press forming recessed part D11A over a range from a front side shape portion D11F forming a portion corresponding to a front side closed cross section 110F (see FIG. 15B) in a press-formed article 110 with an excess thickness portion to a rear side shape portion D11R forming a portion corresponding to a rear side closed cross section 110R (see FIG. 16B).

In the press forming recessed part D11A, a forming shape portion corresponding to the straight shape portion 101 having the rectangular closed cross section of the trailing arm body 100, the cross-sectional shape changing portion (specific three-dimensional shape portion) 102, the circumferential length changing portion 103, the curved portion (specific three-dimensional shape portion) 104, and the circumferential length change rate changing portion (specific three-dimensional shape portion) 105 in the press-formed article 110 with an excess thickness portion is formed.

The press forming punch (U-forming punch) D12 is a die that press-forms the material steel sheet W0 in cooperation with the press forming lower die D11 to form the press-formed article 110 with an excess thickness portion when the trailing arm body 100 is manufactured.

As shown in FIG. 11A, in the press forming punch D12, a press forming protrusion D12A is formed over a range from a front side forming protrusion D12F corresponding to the front side closed cross section 110F (see FIG. 15B) of the press-formed article 110 with an excess thickness portion to a rear side forming protrusion D12R corresponding to the rear side closed cross section 110R (see FIG. 16B) of the press-formed article 110 with an excess thickness portion. A width Du of the press forming punch D12 shown in FIG.

11A is the width of a portion corresponding to abutting scheduled portions when a flangeless press-formed article 120 is formed by trimming the press-formed article 110 with an excess thickness portion (the distance between the inner circumferential surfaces of the portion).

The press forming protrusion D12A has a forming shape portion corresponding to the straight shape portion 101 having the rectangular closed cross section of the trailing arm body 100, the cross-sectional shape changing portion (specific three-dimensional shape portion) 102, the circumferential length changing portion 103, the curved portion (specific three-dimensional shape portion) 104, and the circumferential length change rate changing portion (specific three-dimensional shape portion) 105 in the press-formed article 110 with an excess thickness portion.

In addition, a steel sheet pressing shape portion D11S corresponding to the press forming recessed part D11A is formed on both sides of the press forming recessed part D11A of the press forming lower die D11 such that, for example, the material steel sheet W0 placed on the steel sheet pressing shape portion D11S can be pressed until the material steel sheet W0 is drawn into the press forming recessed part D11A and press-formed.

For example, the steel sheet pressing tool D13 is disposed above the press forming lower die D11 across the press forming recessed part D11A of the press forming lower die D11 and is able to advance and retreat in the up-down direction (Z-axis direction) with respect to the press forming lower die D11.

In addition, in the steel sheet pressing tool D13, a steel sheet pressing shape portion D13S corresponding to the steel sheet pressing shape portion D11S is formed on the lower surface to press the material steel sheet W0 against the press forming lower die D11 on both sides of the press forming punch D12 during press forming.

Figure 11B:
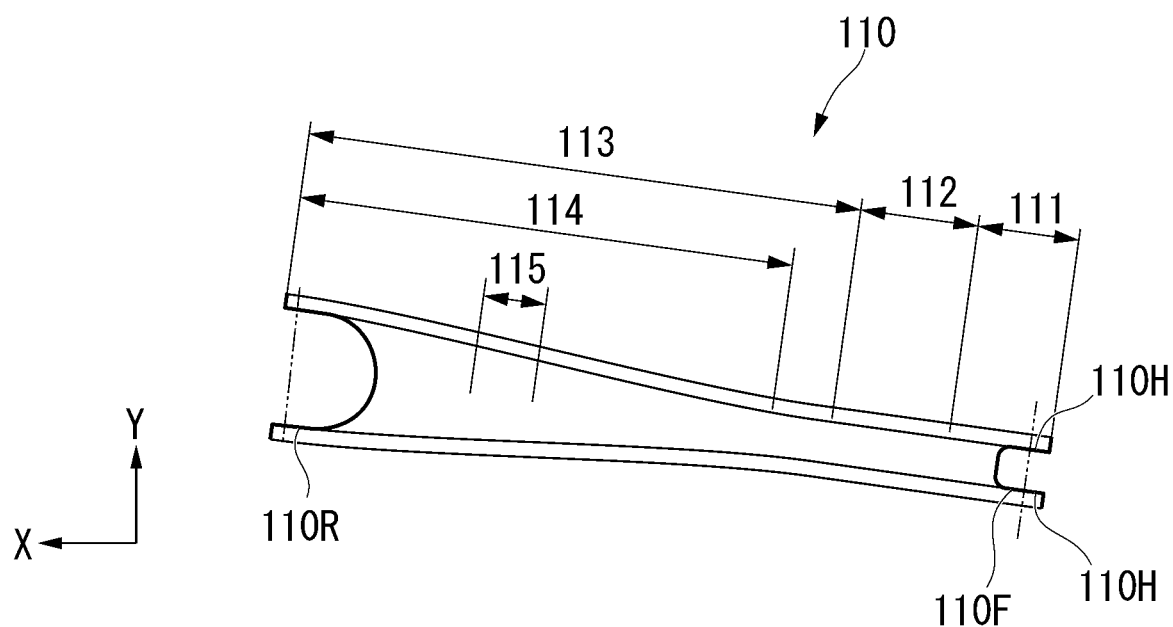
FIG. 11B is a view illustrating the press forming step in the manufacturing of the trailing arm body according to the first embodiment, and is a view of a press-formed article with an excess thickness portion formed in the press forming step viewed from a side opposite to a press forming punch in a press forming direction.
Figure 11C:
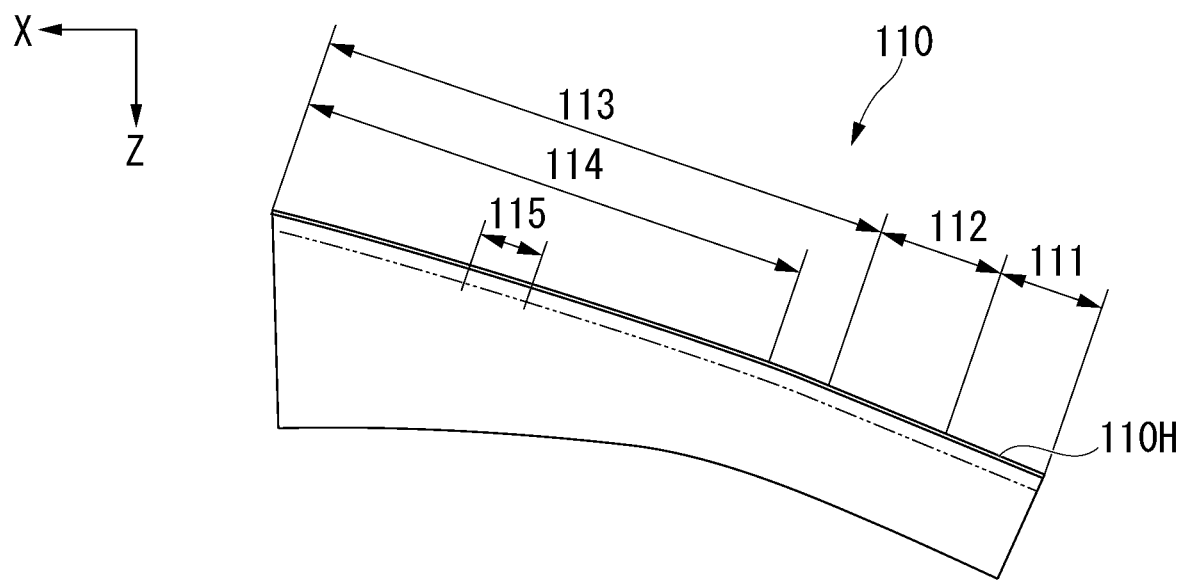
FIG. 11C is a view illustrating the press forming step in the manufacturing of the trailing arm body according to the first embodiment, and is a view of the press-formed article with an excess thickness portion formed in the press forming step viewed from a side orthogonal to the press forming direction.

As shown in FIGS. 11B and 11C, the press-formed article 110 with an excess thickness portion formed in the press forming step according to this embodiment is configured to include a straight shape recessed formed portion 111, a cross-sectional shape change recessed formed portion 112, a circumferential length change recessed formed portion 113, a curved recessed formed portion 114, and a circumferential length change rate change recessed formed portion 115 respectively corresponding to the straight shape portion 101 of the trailing arm body 100, the cross-sectional shape changing portion 102, the circumferential length changing portion 103, and the curved portion (specific three-dimensional shape portion) 104 and the circumferential length change rate changing portion 105 formed in the circumferential length changing portion 103.

FIG. 11B is a view of the press-formed article 110 with an excess thickness portion when viewed from the lower side (opposite side to the press forming punch D12), and FIG. 11C is a view of the press-formed article 110 viewed in a direction orthogonal to a plane that includes the centroid line and is formed in the forming direction (that is, from a side).

Hereinafter, the procedure in the press forming step will be described.

(1) First, the material steel sheet W0 is disposed in the press forming die and punch D10 (S102).

Figure 15A:
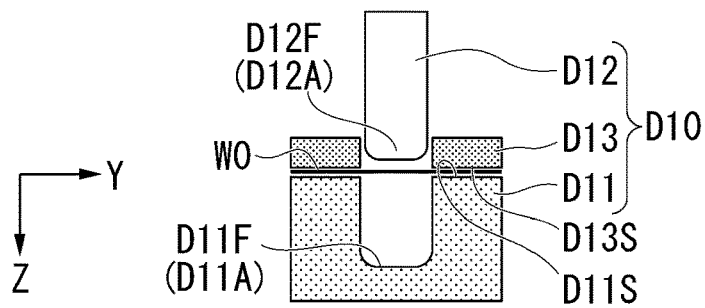
FIG. 15A is a view illustrating an outline of a manufacturing method of a trailing arm body according to the first embodiment of the present invention, and is a view of a state in which a material steel sheet is placed in a press forming die and punch, viewed from a front side of the trailing arm body.

When the material steel sheet W0 is disposed in the press forming die and punch D10, as shown in FIGS. 15A and 16A, the material steel sheet W0 is placed on the press forming recessed die D11, and the steel sheet pressing tool D13 is lowered to interpose the material steel sheet W0 between the steel sheet pressing shape portion D13S and the steel sheet pressing shape portion D11S.

In addition, the press forming punch D12 is located above the material steel sheet W0.

(2) The material steel sheet W0 is pressed by the press forming punch D12 (S103).

When the material steel sheet W0 is pressed by the press forming punch D12, as shown in FIGS. 15B and 16B, in a state in which the press forming punch D12 is lowered in the Z-axis direction and the material steel sheet W0 is interposed between the press forming punch D12 and the steel sheet pressing member D13, the material steel sheet W0 is pressed by the press forming protrusion D12A.

The material steel sheet W0 placed on the press-formed lower die D11 is interposed between the steel sheet pressing shape portion D11S and the steel sheet pressing shape portion D13S by the steel sheet pressing member D13 until the material steel sheet W0 is press-formed in the press forming recessed part D11A, and the material steel sheet W0 is drawn by the press forming protrusion D12A in cooperation with the press forming recessed part D11A.

As a result, a press-formed article 110 with an excess thickness portion (press-formed article) is formed. In addition, since the material steel sheet W0 is pressed by the steel sheet pressing member D13, the material steel sheet W0 can be stably drawn.

At the time of press forming, there may be partially a point which is not drawn.

In FIGS. 15A, 16A, 15B, and 16B, reference numerals D11F and D11R respectively denote the front side shape portion and the rear side shape portion of the press forming recessed part D11A, and reference numerals D12F and D12R respectively denote the front side shape portion and the rear side shape portion of the press forming protrusion D12A.

(3) The press-formed article 110 with an excess thickness portion (press-formed article) is taken out of the press forming lower die D11 (S104).

As shown in the right figures of FIGS. 15B and 16B, the press-formed article 110 with an excess thickness portion (press-formed article) has a recessed shape portion, in which one end side in the longitudinal direction is the front side cross section 110F corresponding to the front side closed cross section 100F (see FIG. 7B) of the trailing arm 100, and the other end side is the rear side cross section 110R corresponding to the rear side closed cross section 100R (see FIG. 7B).

In addition, at both side end portions of the recessed cross-sectional shape portion of the press-formed article 110 with an excess thickness portion, a flange-shaped excess thickness portion (extending portion) 110H extending outward from both the side end portions is formed.

[Trimming Step (Flangeless Forming Step)]

In the first embodiment, in the trimming step (flangeless forming step), as shown in S105 to S107 in FIG. 9, the press-formed article 110 with an excess thickness portion is disposed in the trimming die, the excess thickness portion of the press-formed article is removed in the trimming die to form a flangeless press-formed article, and the flangeless press-formed article is taken out of the trimming die.

In this embodiment, an example of a case in which the flange-shaped excess thickness portion (extending portion) 110H extending outward from both side end portions is formed at both end portions of the press-formed article 110 with an excess thickness portion (press-formed article) shown in FIGS. 15B and 16B and the excess thickness portion 110H is removed in the trimming step is described. Whether or not the trimming step is provided can be set as necessary. For example, in a case where the extending portion does not exist, the trimming step may be omitted.

Figure 12A:
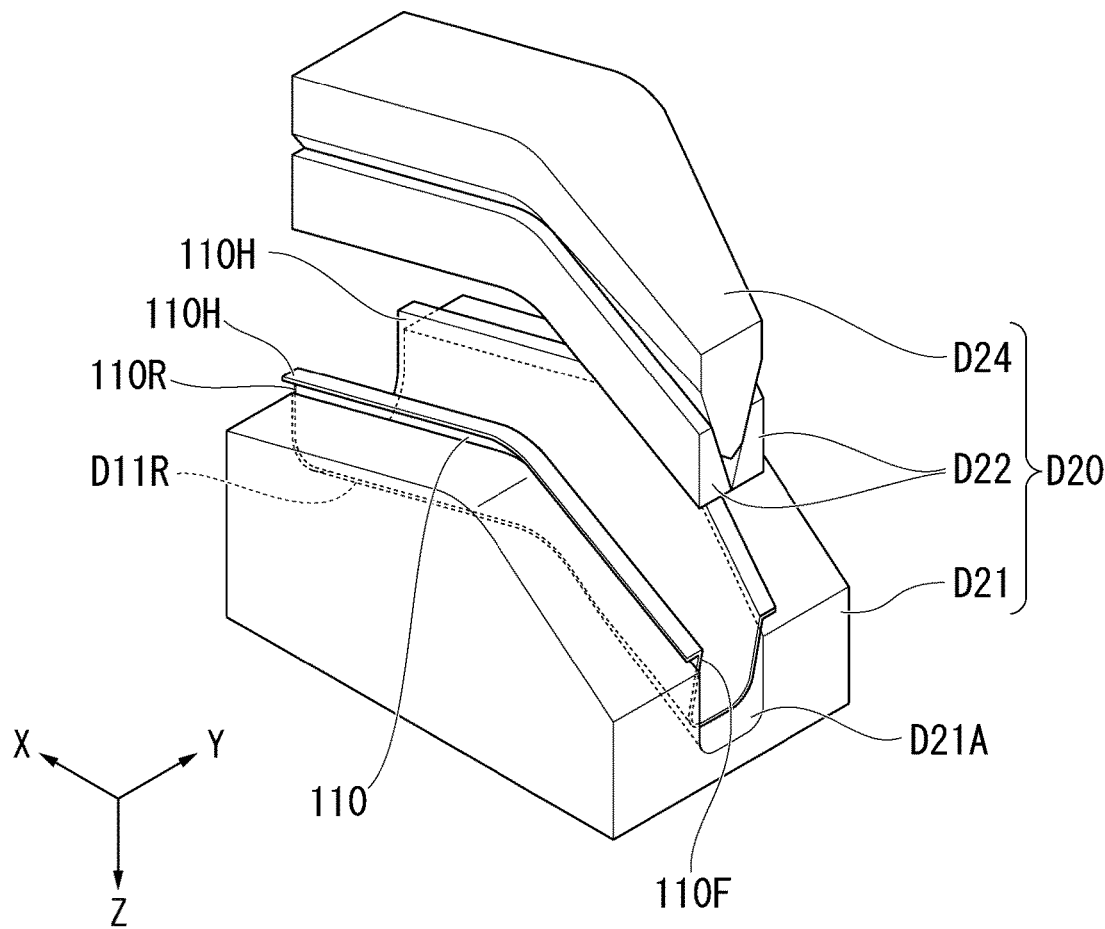
FIG. 12A is a view illustrating an outline of a trimming step in the manufacturing of the trailing arm body according to the first embodiment, and is a perspective view showing a schematic configuration of a trimming die.

Hereinafter, a schematic configuration of a trimming die D20 will be described with reference to FIGS. 12A, 15C, and 16C. FIG. 12A is a perspective view illustrating the schematic configuration of the trimming die D20 according to the first embodiment.

Figure 15C:
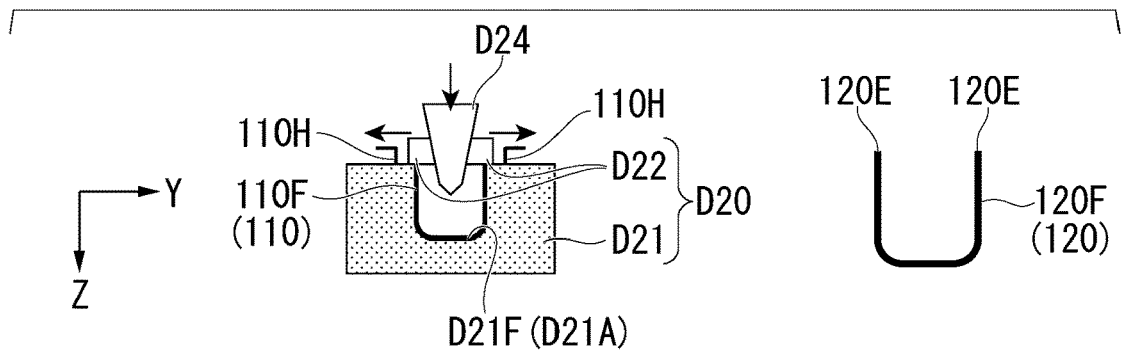
FIG. 15C is a view illustrating the outline of the manufacturing method of a trailing arm body according to the first embodiment of the present invention, and is a view of a state in which the press-formed article with an excess thickness portion is trimmed and a flangeless press-formed article after the trimming, viewed from the front side of the trailing arm body.
Figure 16C:
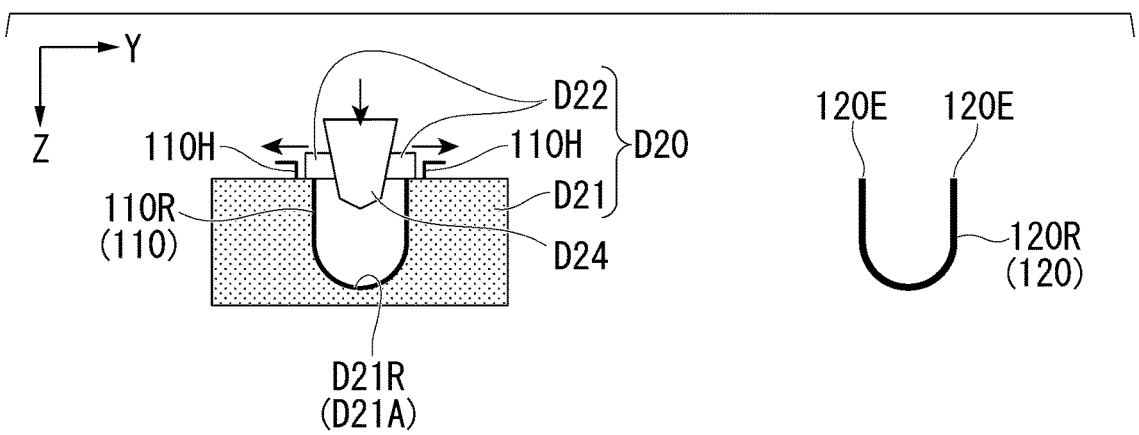
FIG. 16C is a view illustrating the outline of the manufacturing method of a trailing arm body according to the first embodiment of the present invention, and is a view of the state in which the press-formed article with an excess thickness portion is trimmed and the flangeless press-formed article after the trimming, viewed from the rear side of the trailing arm body.

As shown in FIGS. 11A, 15C, and 16C, for example, the trimming die D20 includes a trimming lower die D21, a pair of trimming blades D22 disposed above the trimming lower die D21, and a wedge mechanism D24 that is lowered to separate the trimming blades D22 from each other in a Y-axis direction. In the trimming lower die D21, a recessed part D21A in which the press-formed article 110 with an excess thickness portion (press-formed article) is disposed in a state in which the excess thickness portions 110H and 110H can be removed is formed over a range from the front side shape portion 110F to the rear side shape portion 110R.

The trimming blades D22 and the wedge mechanism D24 are configured so as to be able to advance and retreat in the Z-axis direction with respect to the trimming lower die D21, and are configured so that the wedge mechanism D24 is lowered in a state in which the trimming blades D22 are disposed at predetermined positions with respect to the press-formed article 110 with an excess thickness portion (press-formed article) to move the trimming blades D22 outward in the Y-axis direction and remove the excess thickness portions 110H and 110H in cooperation with the trimming lower die D21.

Figure 12B:
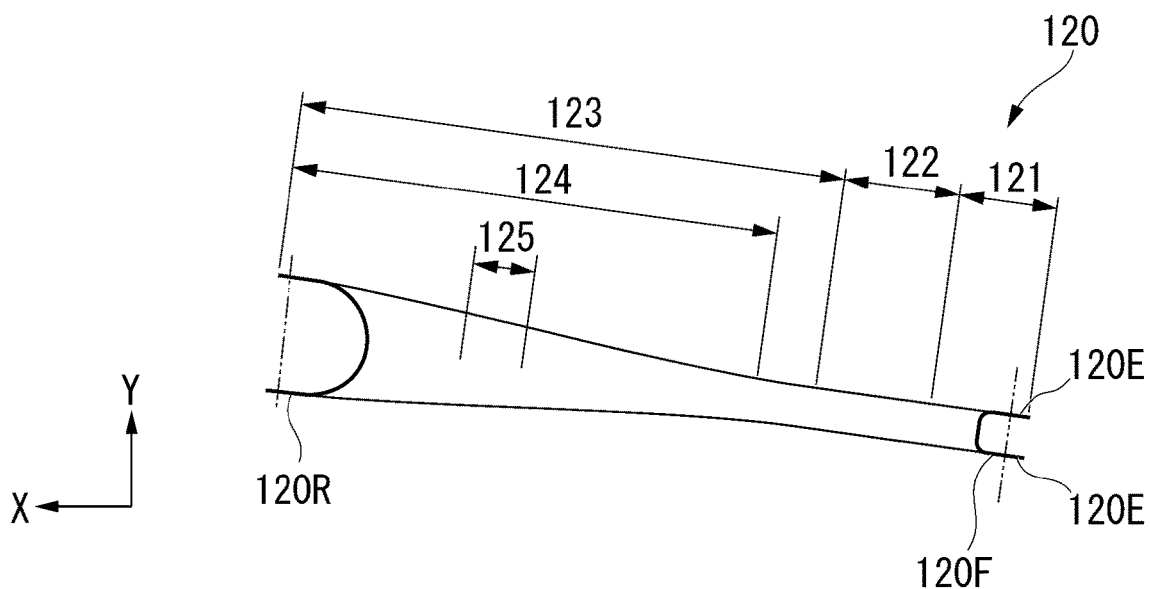
FIG. 12B is a view illustrating the outline of the trimming step in the manufacturing of the trailing arm body according to the first embodiment, and is a view of a flangeless press-formed article viewed from a side to the press forming punch in the press forming direction.
Figure 12C:
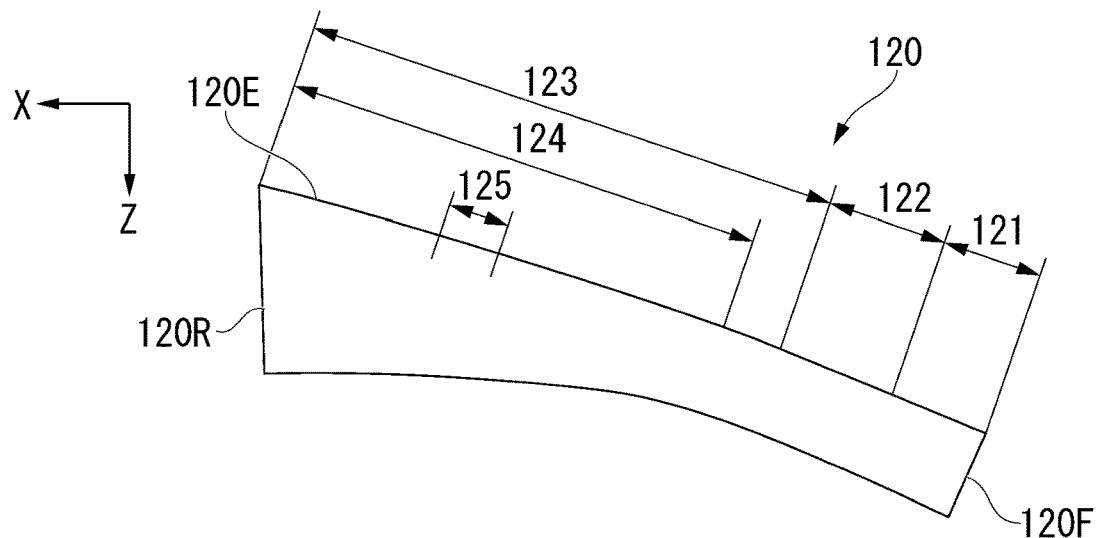
FIG. 12C is a view illustrating the outline of the trimming step in the manufacturing of the trailing arm body according to the first embodiment, and is a view of the flangeless press-formed article viewed from a side orthogonal to the press forming direction.

As shown in FIGS. 12B and 12C, the flangeless press-formed article 120 after the trimming includes a straight shape recessed formed portion 121, a shape change recessed formed portion 122, a circumferential length change recessed formed portion 123, a curved shape recessed formed portion 124, and a circumferential length change rate fluctuation recessed formed portion 125.

The straight shape recessed formed portion 121, the shape change recessed formed portion 122, the circumferential length change recessed formed portion 123, the curved shape recessed formed portion 124, and the circumferential length change rate fluctuation recessed formed portion 125 are configured by removing the excess thickness portions 110H and 110H from the straight shape recessed formed portion 111, the cross-sectional shape change recessed formed portion 112, the circumferential length change recessed formed portion 113, the curved recessed formed portion 114, and the circumferential length change rate change recessed formed portion 115 of the press-formed article 110 with an excess thickness portion, respectively.

FIG. 12B is a view of the flangeless press-formed article 120 after the trimming viewed from the lower side (opposite side to the press forming punch D12 in the press forming step), and FIG. 12C is a view of the flangeless press-formed article 120 viewed in a direction orthogonal to a plane that includes the centroid line and is formed in the forming direction (that is, from a side).

Hereinafter, the procedure in the trimming step (flangeless forming step) will be described.

(1) The press-formed article 110 with an excess thickness portion (press-formed article) is disposed in the trimming die D20 (S105).

Specifically, as shown in FIGS. 15C and 16C, the press-formed article 110 with an excess thickness portion is disposed in the recessed part D21A of the trimming lower die D21, and the trimming blades D22 and the wedge mechanism D24 located thereabove are lowered to locate the left and right trimming blades D22 between the excess thickness portions 110H and 110H formed at both side end portions of the press-formed article 110 with an excess thickness portion.

Then, the wedge mechanism D24 is driven (the wedge mechanism D24 is further lowered) to move the left and right trimming blades D22 outward from the excess thickness portions 110H and 110H in the Y-axis direction such that the flange-shaped excess thickness portions 110H and 110H are sheared and removed.

(2) By trimming the flange-shaped excess thickness portions 110H and 110H on both sides with the trimming die D20, the flangeless press-formed article 120 in which side end portions (abutting scheduled portions) 120E and 120E are formed is formed (S106).

(3) The formed flangeless press-formed article 120 is taken out of the trimming die D20 (S107).

As a result, as shown in FIGS. 15C and 16C, the press-formed article (flangeless press-formed article) 120 after the trimming in which the side end portion 120E and 120E are accurately formed by removing the excess thickness portions 110H and 110H of the press-formed article 110 is formed.

[O-Forming Step]

In the O-forming step (abutting portion forming step), as shown in S108 to S111 of FIG. 9, the flangeless press-formed article is disposed in the O-forming die (abutting portion forming die), the flangeless press-formed article is pressed in the O-forming die to cause the abutting scheduled portions (side end portions) of the flangeless press-formed article to abut each other, and the abutting portion formed article is taken out.

Figure 13A:
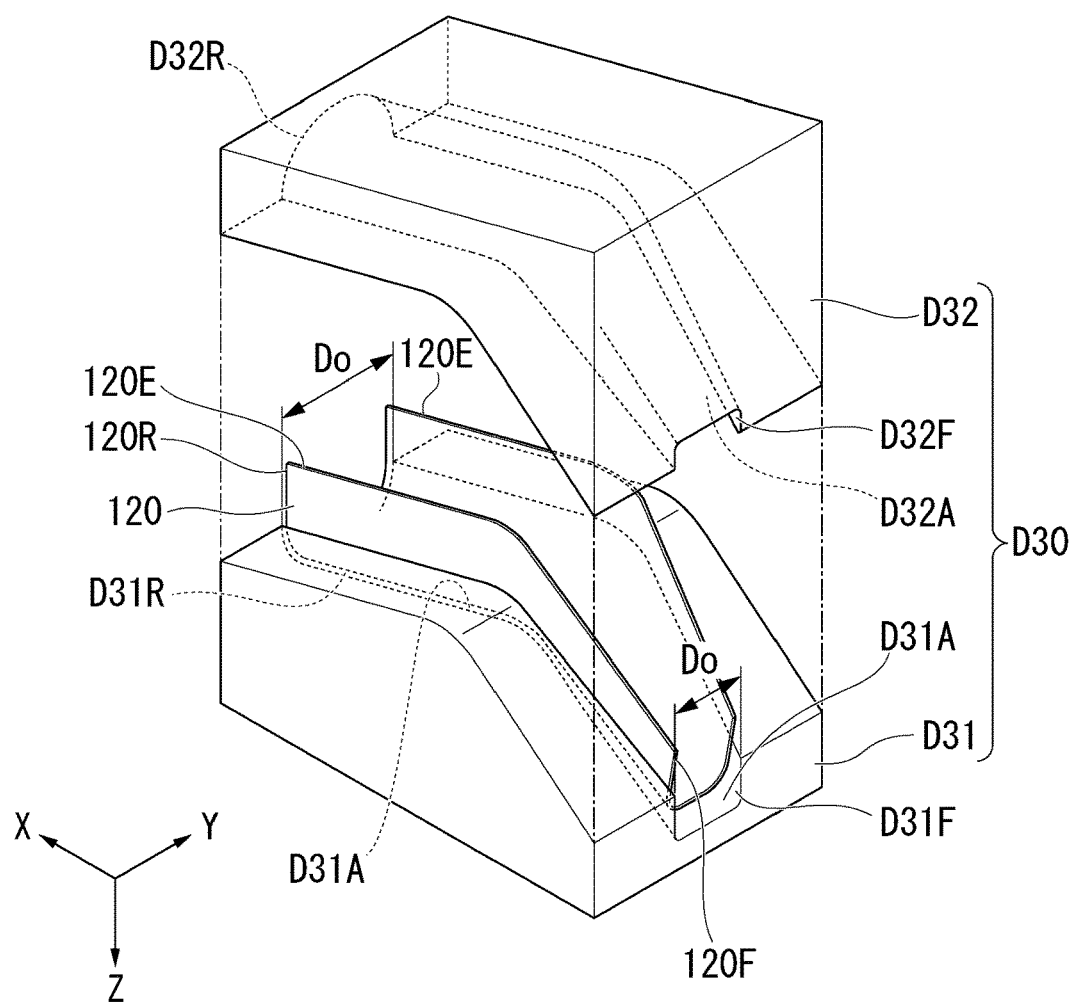
FIG. 13A is a view illustrating an outline of an abutting portion forming step in the manufacturing of the trailing arm body according to the first embodiment, and is a perspective view showing a schematic configuration of an O-forming die.

Hereinafter, a schematic configuration of an O-forming die D30 will be described with reference to FIGS. 13A, 15D to 15F, and 16D to 16F. FIG. 13A is a perspective view illustrating the O-forming die D30 in the manufacturing of the trailing arm body according to the first embodiment.

As shown in FIGS. 13A, 15D to 15F, and 16D to 16F, the O-forming die D30 includes, for example, a lower die (first recessed die) D31 which is a fixed die, and an upper die (second recessed die) D32 which is disposed above the lower die D31 and is able to advance and retreat in the Z-axis direction with respect to the lower die D31.

As shown in FIG. 13A, in the lower die D31, a lower die recessed part D31A in which the flangeless press-formed article 120 is disposed is formed over a range from a front side shape portion 120F to a rear side shape portion 120R of the flangeless press-formed article 120.

In the upper die D32, an upper die recessed part D32A is formed which causes the side end portions 120E on both sides of the flangeless press-formed article 120 to follow the upper die recessed part D32A in cooperation with the lower die recessed part D31A so that the side end portions 120E are caused to approach and abut each other over a range from the front side shape portion 120F to the rear side shape portion 120R to form an abutting portion formed article 130.

Figure 13B:
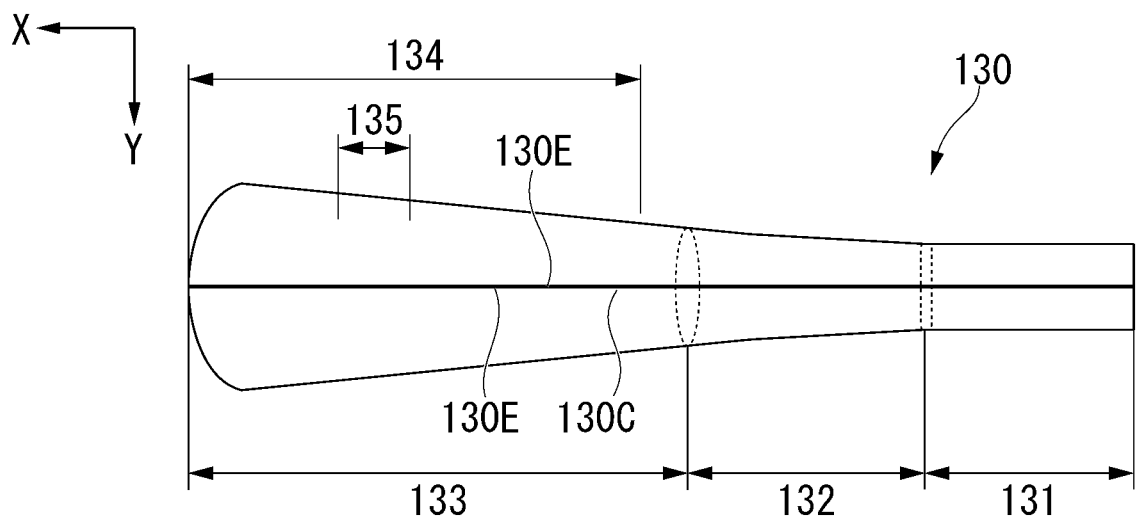
FIG. 13B is a view illustrating the outline of the abutting portion forming step in the manufacturing of the trailing arm body according to the first embodiment, and is a view of an abutting portion formed article viewed from an abutting portion side.
Figure 13C:
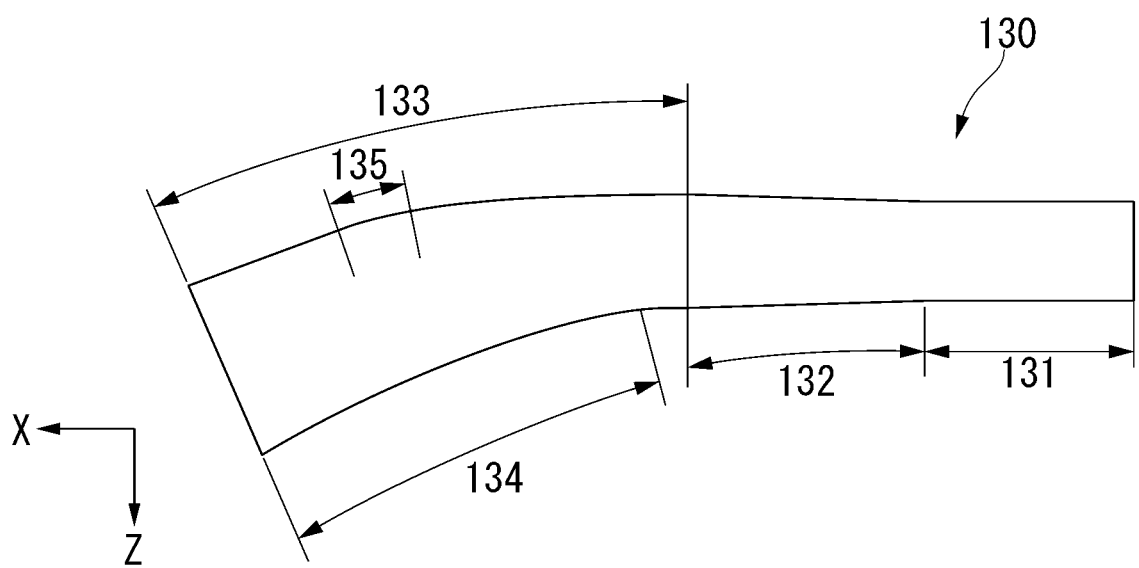
FIG. 13C is a view illustrating the outline of the abutting portion forming step in the manufacturing of the trailing arm body according to the first embodiment, and is a view of the abutting portion formed article viewed from a side orthogonal to a forming direction during abutting portion forming.

As shown in FIGS. 13B and 13C, the abutting portion formed article 130 includes a straight shape portion 131, a cross-sectional shape changing portion 132, a circumferential length changing portion 133, a curved portion 134, and a circumferential length change rate changing portion 135.

The straight shape portion 131, the cross-sectional shape changing portion 132, the circumferential length changing portion 133, the curved portion 134, and the circumferential length change rate changing portion 135 have configurations respectively corresponding to the straight shape portion 101, the cross-sectional shape changing portion 102, the circumferential length changing portion 103, the curved portion 104, and the circumferential length change rate changing portion 105 of the trailing arm body 100.

Reference numeral Do shown in FIG. 13A denotes the width of the lower die recessed part D31A of the lower die (first recessed die) D31.

FIG. 13B is a view of the abutting portion formed article 130 viewed from the upper die D32 side, and FIG. 13C is a view of the abutting portion formed article 130 viewed in a direction orthogonal to a plane that is formed in the forming direction and includes the centroid line (that is, from a side).

Figure 14:
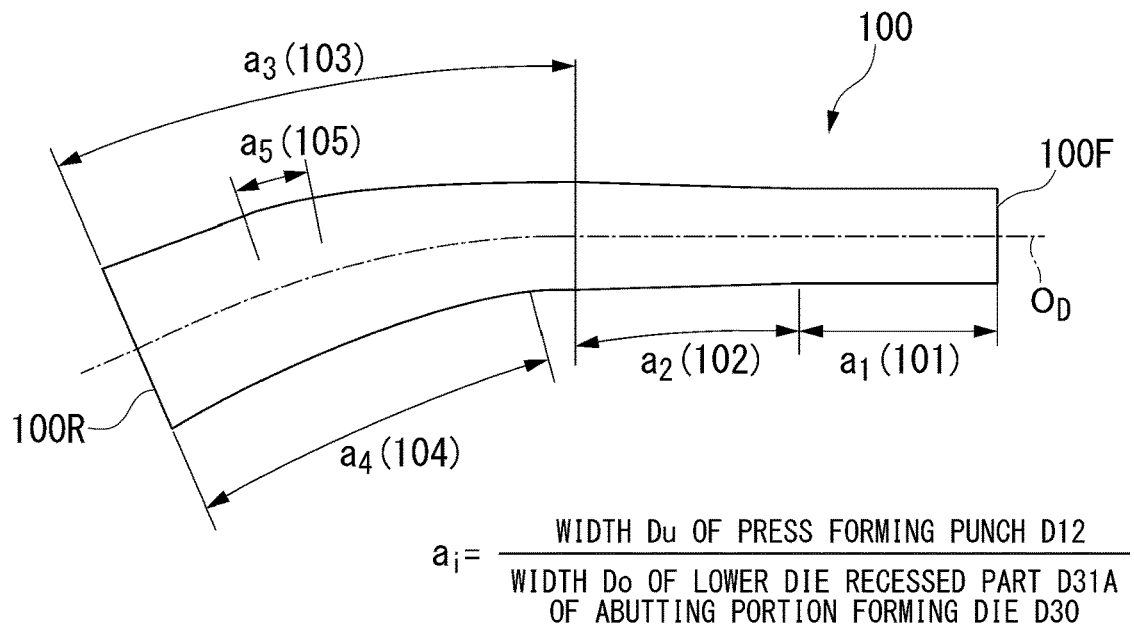
FIG. 14 is a view illustrating an outline of a forming condition ratio a (=Du/Do) in a die and punch according to the first embodiment of the present invention.

Here, with reference to FIG. 14, the forming condition ratio a when manufacturing the trailing arm body 100, the width Du of the press forming punch of the press forming die and punch D10 shown in FIG. 11A, and the width Do of the lower die recessed part D31A of the lower die (first recessed die) D31 shown in FIG. 13A will be described. FIG. 14 is a view illustrating an outline of the forming condition ratio a (=Du/Do) in the dies and punches (the press forming die and punch D10 and the abutting portion forming die D30) according to the first embodiment.

As shown in FIG. 14, the forming condition ratio a (=Du/Do) when manufacturing the trailing arm body 100 is configured to change along the longitudinal direction (centroid line) of the trailing arm body 100.

Forming condition ratios $a_1$, $a_2$, $a_3$, $a_4$, and $a_5$ shown in FIG. 14 respectively correspond to the straight shape portion 101, the cross-sectional shape changing portion 102, the circumferential length changing portion 103, the curved portion 104, and the circumferential length change rate changing portion 105 of the trailing arm body 100, and are configured to change along the centroid line of the trailing arm body 100. The forming condition ratios $a_1$, $a_2$, $a_3$, $a_4$, and $a_5$ are appropriately set to 0.85 to 0.95. These values may be set by performing the above-described forming condition ratio setting step in one or a plurality of cycles.

In FIG. 14, the forming condition ratio $a_4$ and the forming condition ratio $a_5$ are included in the forming condition ratio $a_3$. In such a case, a suitable forming condition ratio a for either or both can be appropriately used.

The forming condition ratios $a_1$, $a_2$, $a_3$, $a_4$, and $a_5$ are defined by the mathematical expression representing a forming condition ratio $a_1$ shown in FIG. 14, and the width Du of the press forming punch D12 corresponds to reference numeral Du shown in the press forming punch D12 of the press forming die and punch D10 in FIG. 11A. The width Do of the lower die recessed part (abutting portion forming recessed part) D31A of the abutting portion forming die D30 corresponds to reference numeral Do shown in the lower die recessed part (abutting portion forming recessed part) D31A of the lower die (first recessed die) D31 in FIG. 13A.

The width Du of the press forming punch D12 shown in FIG. 11A and the width Do of the lower die recessed part D31A of the O-forming die D30 shown in FIG. 13A correspond to each other at positions of the press forming punch D12 and the lower die recessed part (abutting portion forming recessed part) D31A corresponding to each other in the longitudinal direction (X-axis direction).

The width Du of the press forming punch D12 and the width Do of the lower die recessed part D31A of the O-forming die D30 are values corresponding to each portion in the trailing arm body 100 shown in FIG. 14. For example, the width Du of the press forming punch D12 and the width Do of the lower die recessed part D31A of the O-forming die D30 corresponding to the forming condition ratio $a_2$ are the width Du and the width Do of the portion for forming the cross-sectional shape changing portion 132. Therefore, even in a case where the forming condition ratio a changes along the centroid line, the press forming punch in the press forming step and the first recessed die and the second recessed die in the O-forming step do not need to relatively move in the direction orthogonal to the centroid line.

Hereinafter, the step procedure in the abutting portion forming step will be described.

(1) The flangeless press-formed article 120 is disposed in the O-forming die D30 (S108).

Figure 15D:
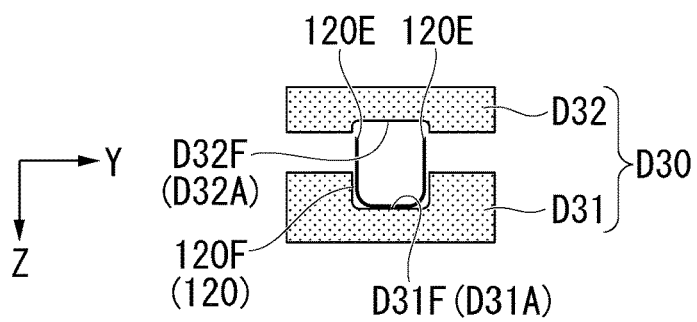
FIG. 15D is a view illustrating the outline of the manufacturing method of a trailing arm body according to the first embodiment of the present invention, and is a flangeless press-formed article.
Figure 16D:
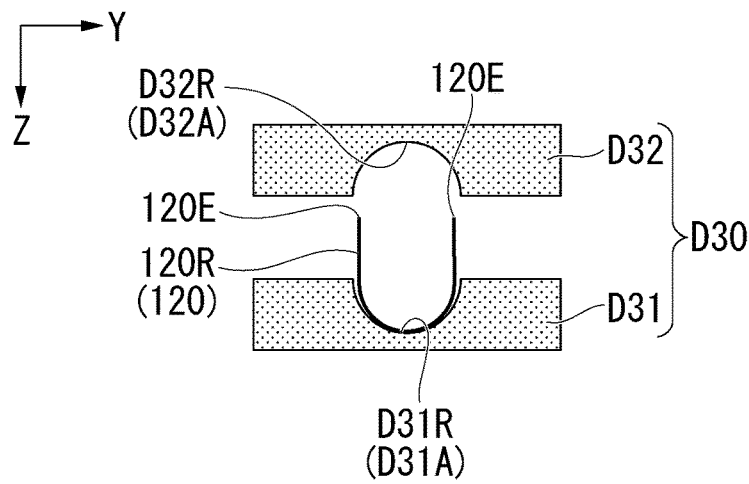
FIG. 16D is a view illustrating the outline of the manufacturing method of a trailing arm body according to the first embodiment of the present invention, and is a view of the state in which the flangeless press-formed article is disposed in the O-forming die, viewed from the rear side of the trailing arm body.

When the flangeless press-formed article 120 is disposed in the O-forming die D30, as shown in FIGS. 15D and 16D, the flangeless press-formed article 120 is disposed in the lower die D31 in which the lower die recessed part D31A is formed, and the upper die D32 in which the upper die recessed part D32A is formed is located thereabove.

(2) The flangeless press-formed article 120 is pressed by the O-forming die D30 (S109).

When the flangeless press-formed article 120 is pressed by the O-forming die D30, as shown in FIGS. 15D and 16D, the flangeless press-formed article 120 is disposed in the lower die D31 and the upper die D32 is lowered to deform the side end portions (abutting scheduled portions) 120E on both sides of the flangeless press-formed article 120 to follow the upper die recessed part D32A.

(3) The abutting scheduled portions of the flangeless press-formed article 120 are caused to abut each other (S110).

Figure 15E:
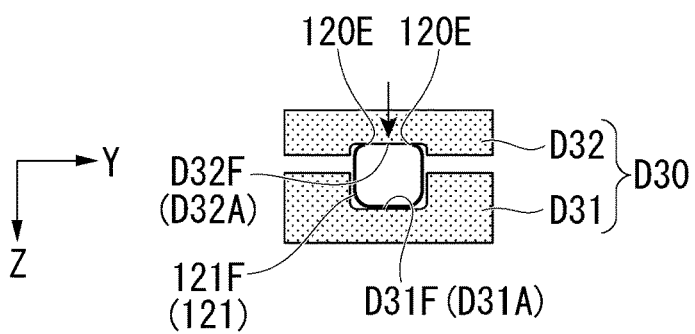
FIG. 15E is a view illustrating the outline of the manufacturing method of a trailing arm body according to the first embodiment of the present invention, and is a view a state in which the flangeless press-formed article is formed into an abutting portion formed article by an O-forming die, viewed from the front side of the trailing arm body.
Figure 16E:
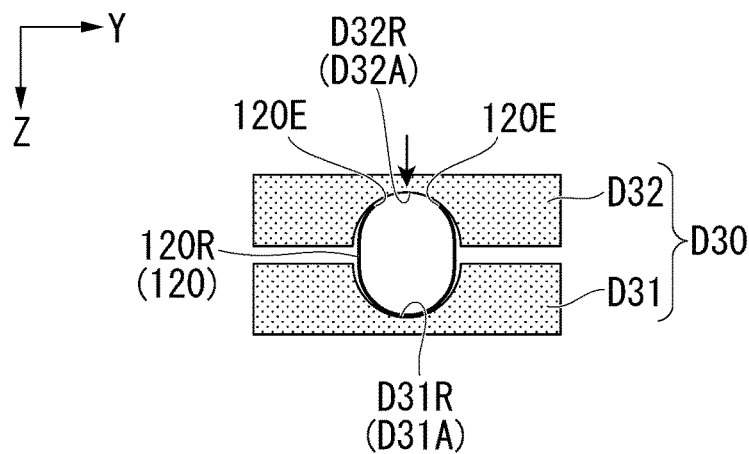
FIG. 16E is a view illustrating the outline of the manufacturing method of a trailing arm body according to the first embodiment of the present invention, and is a view of the state in which the flangeless press-formed article is formed into the abutting portion formed article by the O-forming die, viewed from the rear side of the trailing arm body.

As shown in FIGS. 15E and 16E, by pressing the flangeless press-formed article 120 by the upper die recessed part D32A, the flangeless press-formed article 120 is formed to follow the upper die recessed part D32A and the lower die recessed part D31A.

As a result, the side end portions 120E on both sides of the flangeless press-formed article 120 abut each other.

Figure 15F:
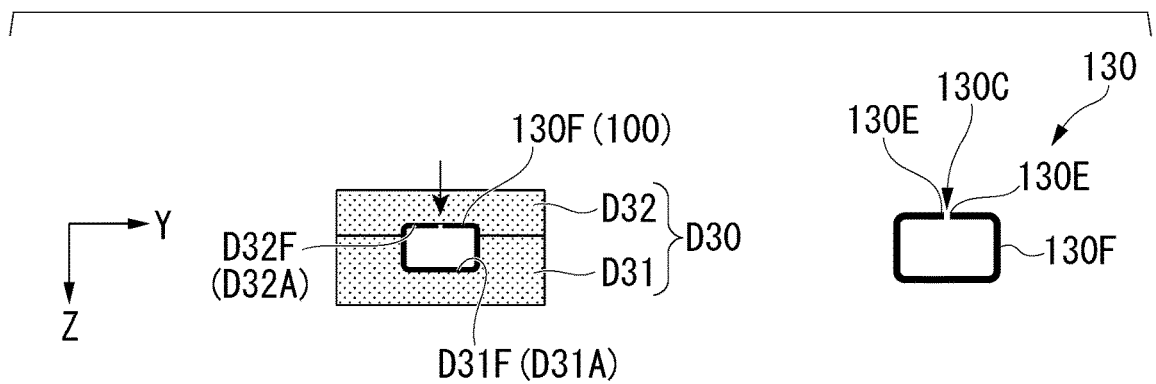
FIG. 15F is a view illustrating the outline of the manufacturing method of a trailing arm body according to the first embodiment of the present invention, and is a view of a state in which the abutting portion formed article is formed by the O-forming die and the formed abutting portion formed article, viewed from the front side of the trailing arm body.
Figure 16F:
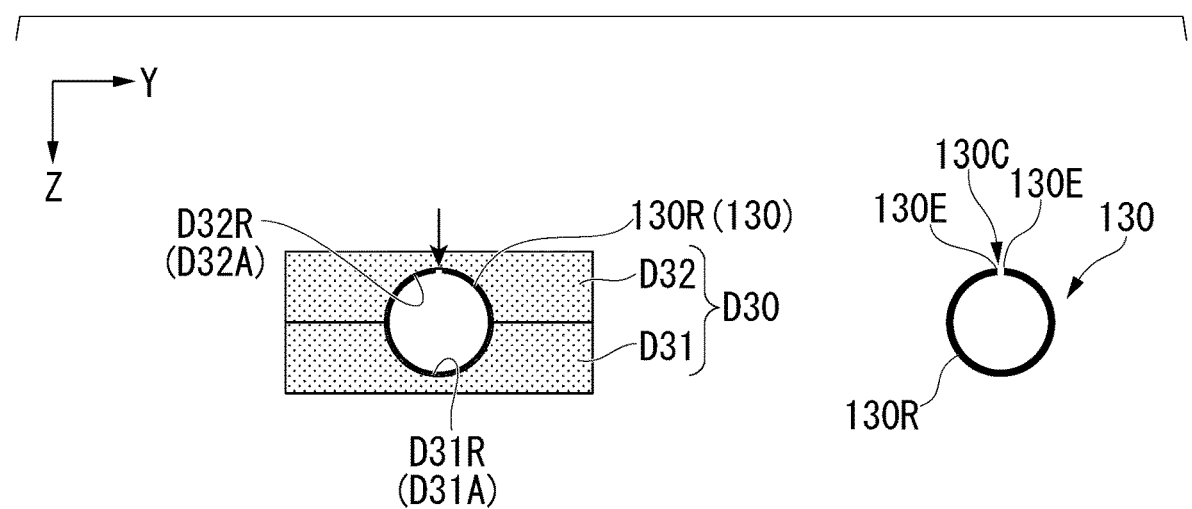
FIG. 16F is a view illustrating the outline of the manufacturing method of a trailing arm body according to the first embodiment of the present invention, and is a view of the state in which the abutting portion formed article is formed by the O-forming die and the formed abutting portion formed article, viewed from the rear side of the trailing arm body.

In FIGS. 15F and 16F, reference numerals D31F and D31R respectively denote the front side shape portion and the rear side shape portion of the lower die recessed part (abutting portion forming recessed part) D31A, and reference numerals D32F and D32R respectively denote the front side shape portion and the rear side shape portion of the upper die recessed part (abutting portion forming recessed part) D32A.

(4) The abutting portion formed article 130 is taken out of the O-forming die D30 (S111).

As shown in the right figures of FIGS. 15F and 16F, in the abutting portion formed article 130, the side end portions 120E on both sides of the flangeless press-formed article 120 abut each other and form abutting portions 130C.

In addition, in the abutting portion formed article 130, one end side is a front side cross section 130F corresponding to the front side closed cross section 100F of the trailing arm body 100, and the other end side is a rear side cross section 130R corresponding to the rear side closed cross section 100R.

[Joining Step]

In this embodiment, in the joining step, both the side end portions 130E of the abutting portions 130C of the abutting portion formed article 130 are joined by welding to form the seam portion (joint portion) 100S (S112).

Figure 15G:
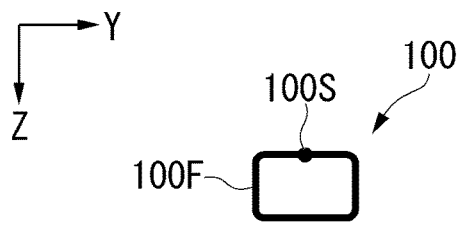
FIG. 15G is a view illustrating the outline of the manufacturing method of a trailing arm body according to the first embodiment of the present invention, and is a view of the abutting portion formed article viewed from the front side of the trailing arm body.
Figure 16G:
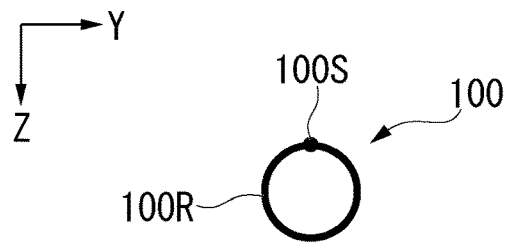
FIG. 16G is a view illustrating the outline of the manufacturing method of a trailing arm body according to the first embodiment of the present invention, and is a view of the abutting portion formed article viewed from the rear side of the trailing arm body.

When the abutting portions 130C of the abutting portion formed article 130 are joined by welding, as shown in FIGS. 15G and 16G, the seam portion 100S is formed. As a result, the trailing arm body 100 is formed.

When joining the seam portion (joint portion) 100S, laser welding or the like as well as arc welding can be applied.

[Member Attaching Step]

In this embodiment, in a member attaching step, the pivot attachment member 10F and the steel wheel attachment member 10R are joined to the railing arm body 100 by welding (S113).

The pivot attachment member 10F and the steel wheel attachment member 10R are joined (welded) and attached to the trailing arm body 100.

As a result, the trailing arm 10 as shown in FIGS. 6 and 7A to 7D is formed.

According to the manufacturing method of the trailing arm body 100 (member for a vehicle) according to the first embodiment, the trailing arm body 100 including the cross-sectional shape changing portion 102, the curved portion 104, and the circumferential length change rate changing portion 105 can be efficiently manufactured.

According to the trailing arm body 100 and the manufacturing method of the trailing arm body 100 according to the first embodiment, since the forming condition ratio a which is the ratio of the width Du of the press forming punch used when forming the press-formed portion from the metal material sheet W0 in the press forming step to the width Do of the recessed part of the O-forming die D30 (more specifically, the width Do of the lower die recessed part (abutting portion forming recessed part) D31A of the lower die D31 and the upper die recessed part (abutting portion forming recessed part) D32A of the upper die D32) is set to 0.85 to 0.95, the springback can be appropriately suppressed, and the side end portions 120E on both sides can be accurately and efficiently brought into close contact with each other or approach a target position.

In addition, after the O-forming step, since both the side end portions 120E forming the abutting portions 130C are disposed close to each other, the side end portions 120E can be efficiently joined to each other without using a complex jig or the like.

In addition, since the forming condition ratio a (=Du/Do) is set to less than 1.0, the press-formed article 120 can be easily disposed in the lower die recessed part D31A and the upper die recessed part D32A of the O-forming die D30.

As a result, the trailing arm body 100 can be efficiently manufactured. Furthermore, a reduction in the weight of the member and the member for a vehicle can be easily achieved and the manufacturing cost can be reduced.

According to the manufacturing method of the trailing arm body 100 according to the first embodiment, since the curved portion 104 bent in the plane along the forming direction is formed by the press forming die and punch D30, the trailing arm body 100 including the curved portion 104 can be efficiently formed.

According to the trailing arm body 100 and the manufacturing method of the trailing arm body 100 according to the first embodiment, since the forming condition ratio a is adjusted and set according to the position along the centroid line of the trailing arm body 100, the abutting portions 130C of the abutting portion formed article 130 can be accurately abut each other (or approach to a position where joining is possible).

As a result, the trailing arm body 100 can be efficiently manufactured.

Second Embodiment

Hereinafter, a second embodiment of the present invention will be described with reference to FIGS. 17A to 17C.

Figure 17A:
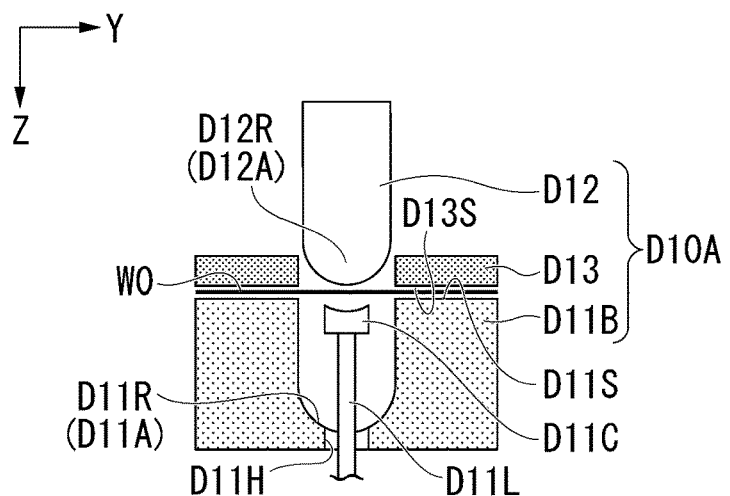
FIG. 17A is a view illustrating an outline of a manufacturing method of a trailing arm body according to a second embodiment of the present invention, and is a view of a state in which a material steel sheet is pressed by a steel sheet pressing member in a press forming die and punch, viewed from the rear side of the trailing arm body.
Figure 17B:
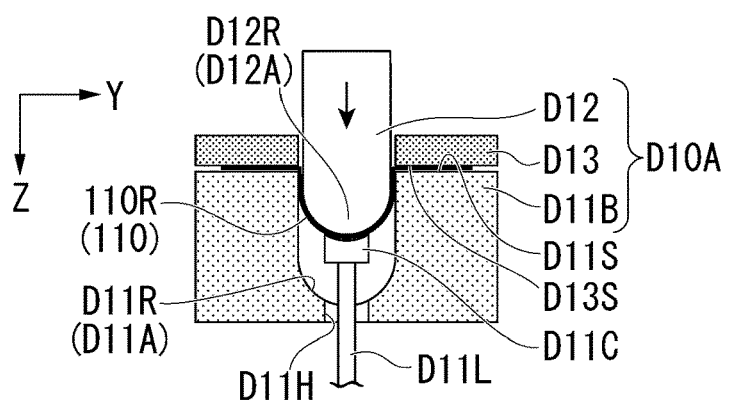
FIG. 17B is a view illustrating the outline of the manufacturing method of a trailing arm body according to the second embodiment of the present invention, and is a view of a state in which the material steel sheet is pressed against a press forming recessed die by a press forming punch in cooperation with a counter in the press forming die and punch and press-formed, viewed from the rear side of the trailing arm body.
Figure 17C:
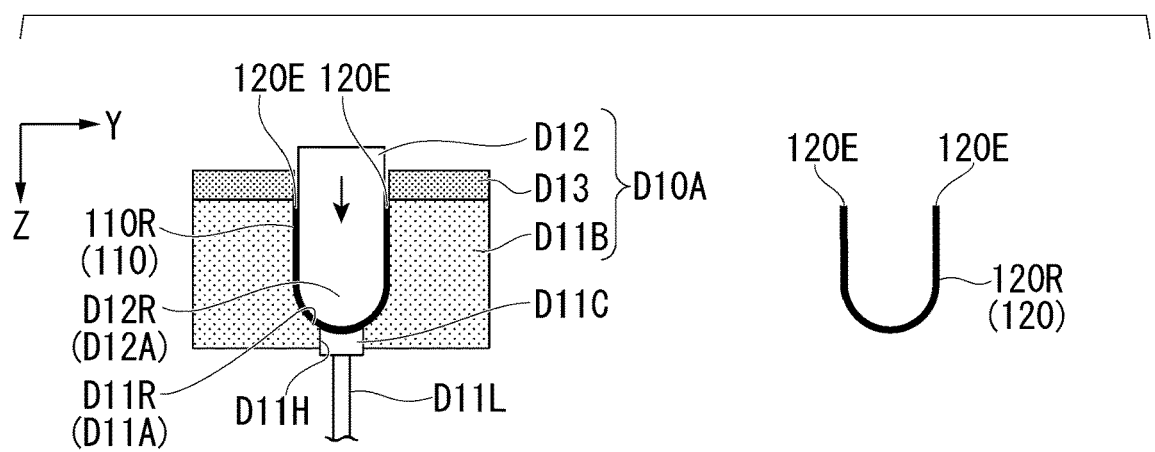
FIG. 17C is a view illustrating the outline of the manufacturing method of a trailing arm body according to the second embodiment of the present invention, and is a view of a state in which a flangeless press-formed article is formed by completing the press forming, viewed from the rear side of the trailing arm body.

FIGS. 17A to 17C are views illustrating an outline of a manufacturing method of a trailing arm body according to the second embodiment of the present invention, FIG. 17A is a view showing a state in which a material steel sheet is pressed by a steel sheet pressing tool in a press forming die and punch, FIG. 17B is a view showing a state in which the material steel sheet is pressed against a press forming recessed die by a press forming punch in cooperation with a counter to be press-formed in the press forming die and punch, and FIG. 17C is a view showing a state in which the press forming is completed and a flangeless press-formed article (press-formed article) is formed. In the second embodiment, description will be provided using each view from the rear side of the trailing arm body.

In the second embodiment, dies and punches used in the manufacturing process of the trailing arm 10 includes, for example, a press forming die and punch used in a press forming step and an O-forming die used in an O-forming step.

The second embodiment is different from the first embodiment in that when press forming is performed in the press forming step, a material steel sheet without the above-described excess thickness portion is used, and a flangeless forming step of forming the corresponding side end portions is completed in the press forming die and punch. Therefore, it is not necessary to take out a press-formed article with an excess thickness portion from the press forming die and punch shown in S03 of FIG. 8 and S105 to S107 of FIG. 9 and remove the excess thickness portion by a trimming die. Others are the same as those in the first embodiment, and thus the description thereof will be omitted.

The material steel sheet W0 according to the second embodiment has a configuration in which, for example, the portion indicated by two-dot chain lines in FIG. 9 shown in the first embodiment corresponds to the exterior shape. As necessary, shape adjustment for completing the flangeless forming step in the press forming die and punch may be performed.

Hereinafter, the press forming step and the flangeless forming step according to the second embodiment will be described with reference to FIGS. 17A to 17C.

As shown in FIGS. 17A to 17C, a press forming die and punch D10A includes, for example, a press forming lower die (press forming recessed die) D11B which is a fixed die, the press forming punch D12 which is disposed above the press forming lower die D11B and is able to advance and retreat in an up-down direction (Z-axis direction) with respect to the press forming lower die D11B, the steel sheet pressing tool D13 that presses the material steel sheet W0 against the press forming lower die D11B on both sides of the press forming punch D12 during press forming, and a counter D11C.

As in the press forming lower die D11 shown in FIG. 11A, the press forming lower die D11B has the press forming recessed part D11A over a range from a front side shape portion forming a portion corresponding to the front side closed cross section in the flangeless press-formed article 120 to the rear side shape portion D11R forming a portion corresponding to the rear side closed cross section 120R in the flangeless press-formed article 120.

In the press forming recessed part D11A, a forming shape portion corresponding to the straight shape portion 101 having the rectangular closed cross section of the trailing arm body 100, the cross-sectional shape changing portion (specific three-dimensional shape portion) 102, the circumferential length changing portion 103, the curved portion (specific three-dimensional shape portion) 104 formed in the circumferential length changing portion 103, and the circumferential length change rate changing portion (specific three-dimensional shape portion) 105 in the flangeless press-formed article 120 is formed.

Furthermore, in this embodiment, a hole D11H in which the counter D11C is accommodated is formed at the bottom part of the press forming recessed part D11A.

The counter D11C has, for example, a shape portion corresponding to the press forming recessed part D11A formed on the upper surface thereof, and is supported by a support rod D11L connected to the lower side thereof.

In addition, the counter D11C can be accommodated in the hole D11H formed at the bottom part of the press forming recessed part D11A and can advance and retreat in the press forming recessed part D11A.

Furthermore, the counter D11C causes the material steel sheet W0 to be interposed between the counter D11C and the press forming punch D12 and pressed against the press forming recessed part D11A, thereby performing press forming in cooperation with the press forming punch D12.

The press forming punch D12, the press forming protrusion D12A, and the steel sheet pressing member D13 are the same as those in the first embodiment, and thus the description thereof will be omitted.

Hereinafter, the procedure in the press forming step will be described.

(1) First, as shown in FIG. 17A, the material steel sheet W0 is disposed in the press forming recessed die D11B.

When the material steel sheet W0 is disposed in the press forming recessed die D11B, as shown in FIG. 17A, the steel sheet pressing tool D13 is lowered to hold the material steel sheet W0 between the steel sheet pressing shape portion D13S and the steel sheet pressing shape portion D11S.

Then, the press forming punch D12 is located above the material steel sheet W0, and the counter D11C is raised to the vicinity of the material steel sheet W0.

(2) Next, as shown in FIG. 17B, the press forming punch D12 is lowered to interpose the material steel sheet W0 between the press forming punch D12 and the counter D11C, and the material steel sheet W0 is pressed against the press forming recessed part D11A. As a result, the material steel sheet W0 is formed into the flangeless press-formed article 120 along the press forming recessed part D11A.

When the press forming punch D12 is lowered for press forming, both sides of the material steel sheet W0 are pressed by the steel sheet pressing tool D13.

(3) Next, as shown in FIG. 17C, the press forming punch D12 performs processing up to the lowering end, and the counter D11C is accommodated in the hole D11H.

The entire material steel sheet W0 is formed along the press forming recessed part D11A, both the end portions WE10 of the material steel sheet W0 are separated from the steel sheet pressing tool D13 and drawn into the press forming recessed part D11A, so that the side end portions 120E are formed between the press forming punch D12 and the press forming recessed part D11A. At the time of press forming, there may be partially a point which is not drawn.

As a result, the formation of the side end portions is completed by the press forming die and punch D10A, and it is not necessary to provide the trimming step (flangeless forming step) by the trimming die.

According to the manufacturing method of a member according to the second embodiment, the flangeless press-formed article 120 in which the side end portions 120E are formed can be formed in the press forming recessed die D11A by using the material steel sheet W0.

As a result, it is not necessary to provide the flangeless forming step using the trimming die, and the flangeless press-formed article 120 can be efficiently formed, thereby improving productivity.

According to the manufacturing method of a member according to the second embodiment, since the press forming punch D12 and the counter D11C cooperate with each other to perform press forming, when both the end portions WE10 are separated from the steel sheet pressing tool D13 and drawn into the press forming recessed part D11A, a portion corresponding to the side end portions 120E is stably press-formed, so that the side end portions can be stably formed.

As a result, the flangeless press-formed article 120 can be formed stably and with high quality.

Third Embodiment

Next, a third embodiment will be described. The third embodiment is an example in which the trailing arm body 100 described above is manufactured by bending forming. Since the structures of the trailing arm body 100, the trailing arm 10, and the torsion beam Assy 1 are the same as those in the first embodiment, the description thereof will be omitted.

Figure 22:
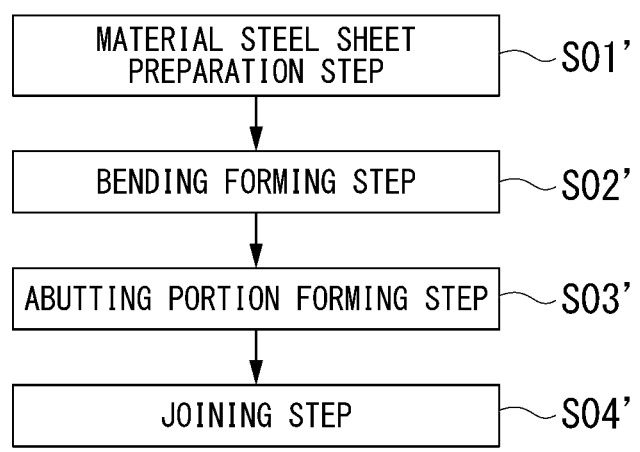
FIG. 22 is a flowchart illustrating an example of an outline of a manufacturing process of a member according to the present invention.

First, with reference to FIG. 22, an outline of the manufacturing method of the trailing arm body 100 to which a manufacturing method of a member according to the third embodiment is applied will be described. FIG. 22 is an example of a flowchart illustrating the outline of the manufacturing method of the member according to the third embodiment.

As shown in FIG. 22, the manufacturing process of the trailing arm body 100 includes, for example, a material steel sheet (metal material sheet) preparation step (S01'), a bending forming step (S02'), and an abutting portion forming step (S03'), and a joining step (S04').

In this embodiment, die and punches used in the manufacturing process of the trailing arm body 100 include a bending forming die and punch used in the bending forming step, and an O-forming die (abutting portion forming die) used in the O-forming step (abutting portion forming step).

[Material Steel Sheet (Metal Material Sheet) Preparation Step]

(1) The material steel sheet preparation step is a step of preparing a material steel sheet (metal material sheet) to be formed in the bending forming step (S01').

In the material steel sheet preparation step, for example, a material steel sheet having an exterior shape in which a bending-formed article (bending-formed portion) is developed is prepared.

As necessary, in the exterior shape of the bending-formed article (bending-formed portion), an excess thickness portion remaining outside a bending forming recessed die in a state in which the bending forming step is completed may be formed. In this case, after bending forming is performed, the excess thickness portion may be removed by trimming.

[Bending Forming Step]

(2) The bending forming step is a step of bending-forming the material steel sheet (metal material sheet) with the bending forming die and punch to form a bending-formed portion of which a bending forming punch side in a Z-axis direction is open (S02').

In the bending forming step, the material steel sheet (metal material sheet) is bending-formed by the bending forming die and punch to form a bending-formed article (bending-formed portion).

[O-Forming Step]

(3) The O-forming step (abutting portion forming step) is a step of causing both end portions (abutting scheduled portions) of a bending-formed article 120' (see FIG. 25B) to abut each other with the O-forming die (abutting portion forming die) (S03').

In this embodiment, the O-forming step is a step of causing both the side end portions (abutting scheduled portions) of the bending-formed article 120' to abut each other by an O-forming die D30'.

In the bending forming step, in a case of forming a bending-formed article from a material steel sheet W0' that does not correspond to the outer circumference of the bending-formed article 120', a configuration in which the abutting portion forming step is performed after removing an excess thickness portion formed in the outer circumference of the bending-formed article by trimming may be adopted.

[Joining Step]

(4) The joining step is a step of joining both side end portions of an abutting portion formed article (O-formed article) to each other to form a joint portion (S04').

In the joining step, both side end portions of abutting portions of the abutting portion formed article are joined to each other by welding or the like to form a seam portion (joint portion).

For joining of the seam portion (joint portion), laser welding or the like as well as arc welding can be applied.

Next, the details of the manufacturing procedure of the trailing arm body 100 according to the third embodiment will be described with reference to FIGS. 23, 24, 25A to 25C, 26A to 26C, 27, 28A to 28F, and 29A to 29F.

Figure 23:
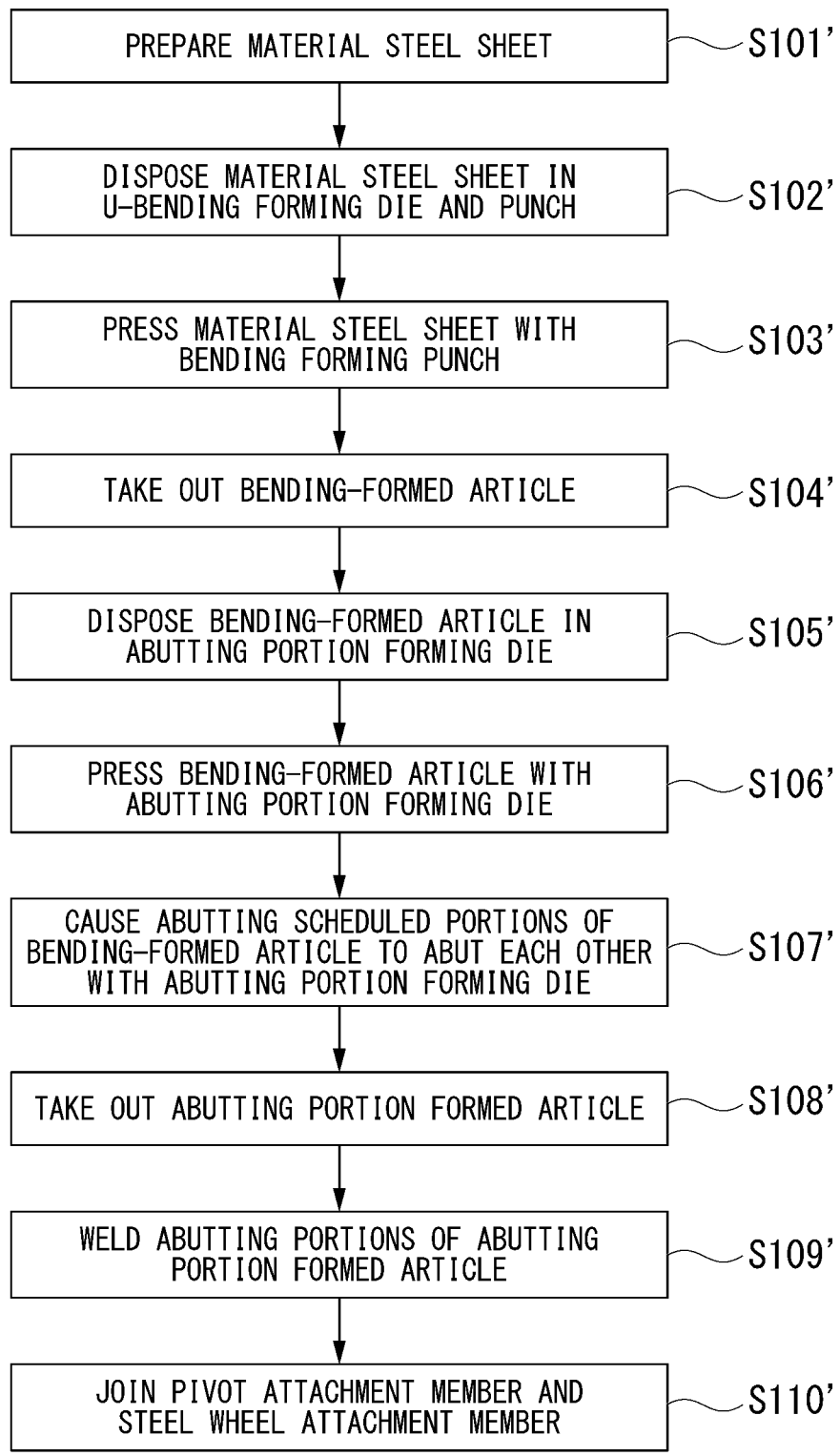
FIG. 23 is a flowchart illustrating a manufacturing process of a trailing arm body according to an embodiment of the present invention.

FIG. 23 is a flowchart showing an example of a detailed procedure of the manufacturing process of the trailing arm body 100, in which S101' indicates the steel sheet preparation step, S102' to S104' indicate the bending forming step, S105' to S108' indicate the O-forming step (abutting portion forming step), and S109' indicates the joining step. In addition, S110' indicates a step of forming the trailing arm 10 by attaching the pivot attachment member 10F and the steel wheel attachment member 10R to the trailing arm body 100 by welding.

FIGS. 28A to 28F and 29A to 29F are views showing details of the manufacturing process of the trailing arm body 100 according to the third embodiment. FIGS. 28A to 28F are views of a forming process of the trailing arm body 100 viewed from the front closed cross section 100F (see FIG. 7B) side, and FIGS. 15A to 15F are views viewed from the rear closed cross section 100R (see FIG. 7B) side.

[Material Steel Sheet Preparation Step]

First, the material steel sheet preparation step (S101') shown in FIG. 23 will be described.

In this embodiment, the material steel sheet (metal material sheet) W0' formed in a shape in which the trailing arm body 100 is developed is prepared.

Figure 24:
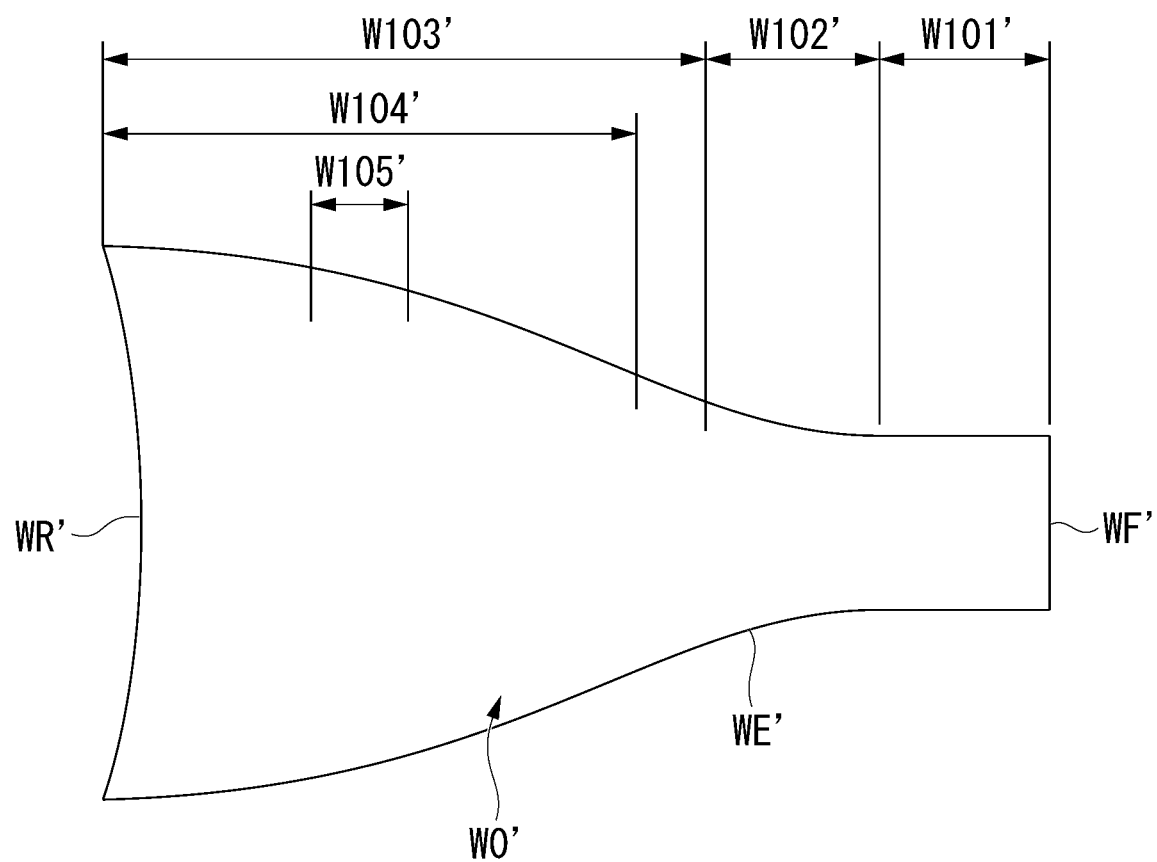
FIG. 24 is a view illustrating a schematic configuration of a material steel sheet for manufacturing the trailing arm body according to the embodiment of the present invention.

Hereinafter, the material steel sheet W0' will be described with reference to FIG. 24. FIG. 24 is a view illustrating an example of a schematic configuration of the material steel sheet for manufacturing the trailing arm body 100 according to the third embodiment.

As shown in FIG. 24, the material steel sheet W0 includes, for example, in a direction from a front side end portion WF' corresponding to the rectangular closed cross section of the front side of the trailing arm body 100 toward a rear side end portion WR' corresponding to the circular closed cross section of the rear side, a straight corresponding portion W101' corresponding to the straight shape portion 101, a cross-sectional shape change corresponding portion W102' corresponding to the cross-sectional shape changing portion 102, a circumferential length change corresponding portion W103' corresponding to the circumferential length changing portion 103, a curved corresponding portion W104' corresponding to the curved portion 104, and a circumferential length change rate change corresponding portion W105' corresponding to the circumferential length change rate changing portion 105, and side end portions WE' formed to correspond to each portion are abutting scheduled portions.

In the material steel sheet W0', the straight corresponding portion W101' is formed in a rectangular shape, the cross-sectional shape change corresponding portion W102' and the curved corresponding portion W103' have an exterior shape formed in a fan shape that gradually increases in width from the front side end portion WF' toward the rear side end portion WR' and becomes gentle in the degree of width increase in the vicinity of the circumferential length change rate changing portion 105'.

In this embodiment, for example, a material steel sheet having a tensile strength of 400 MPa and a sheet thickness of 1.2 mm is applied.

It is not necessary to limit the material and thickness of the steel sheet material. However, it is suitable to apply the bending forming method according to the third embodiment to a material steel sheet having a tensile strength of 300 MPa or more, and more preferably 400 MPa or more, and a thickness of about 1.0 to 2.9 mm (for example, a thin steel sheet) from the viewpoint of suppressing the influence of springback.

[Bending Forming Step]

In the bending forming step, as shown in S102' to S104' in FIG. 23, the material steel sheet is disposed in the bending forming die and punch and is pressed by a bending forming punch to be bending-formed, and the formed bending-formed article (bending-formed portion) is taken out.

Hereinafter, a schematic configuration of a bending forming die and punch D10' will be described with reference to FIGS. 25A, 28A, 28B, 29A, and 29B. FIG. 11A is a perspective view illustrating a bending forming die and punch in the manufacturing of the trailing arm body according to the third embodiment.

In this embodiment, as shown in FIGS. 25A, 28A, 28B, 29A, and 29B, the bending forming die and punch D10' includes, for example, a bending forming recessed die D11' which is a fixed die, and a bending forming punch D12' which is disposed above the bending forming recessed die D11' and is able to advance and retreat in an up-down direction (Z-axis direction) with respect to the bending forming recessed die D11'.

Figure 25A:
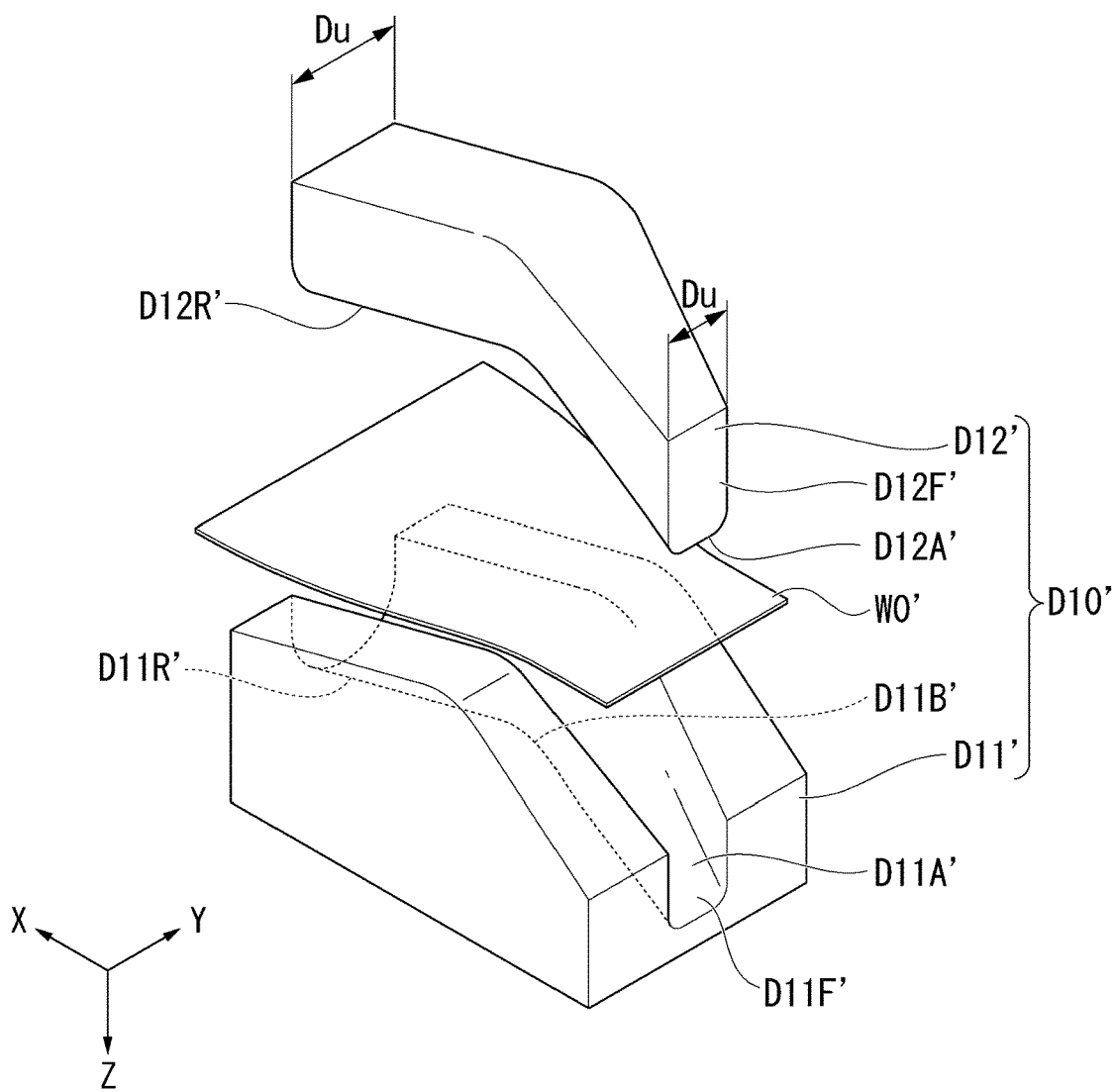
FIG. 25A is a view illustrating a bending forming step in the manufacturing of the trailing arm body according to the embodiment, and is a perspective view showing a schematic configuration of a bending forming die and punch.
Figure 25B:
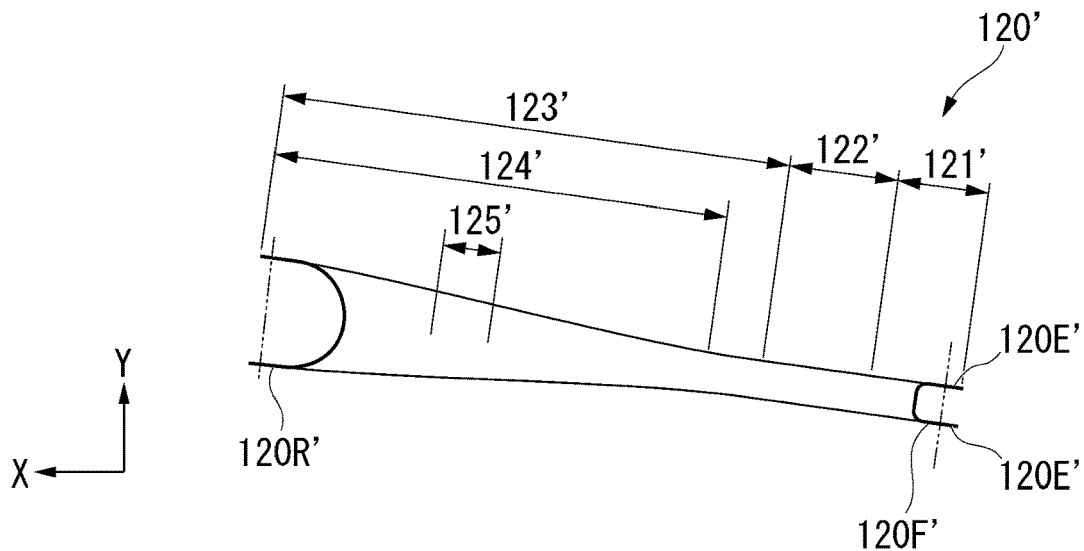
FIG. 25B is a view illustrating an outline of a bending-formed article formed in the bending forming step according to the embodiment, and is a view of the bending-formed article viewed from a side opposite to a bending forming punch in a bending forming direction.

As shown in FIG. 25A, the bending forming recessed die D11' has a bending forming recessed part D11A' over a range from a front side shape portion D11F' forming a portion corresponding to a front side closed cross section 120F' in the bending-formed article 120' shown in FIG. 25B to a rear side shape portion D11R' forming a portion corresponding to a rear side closed cross section 120R'.

In the bending forming recessed part D11A', a forming shape portion corresponding to the straight shape portion 101 having the rectangular closed cross section of the trailing arm body 100, the cross-sectional shape changing portion 102, the circumferential length changing portion 103, the curved portion 104, and the circumferential length change rate changing portion 105 in the bending-formed article 120' is formed.

The bending forming punch (U-forming punch) D12' is a die that bending-forms the material steel sheet W0' in cooperation with the bending forming recessed die D11' to form the bending-formed article 120' when the trailing arm body 100 is manufactured.

In the bending forming punch D12', a bending forming protrusion D12A' is formed over a range from a front side forming protrusion D12F' corresponding to the front side closed cross section 120F' (see FIG. 25B) of the bending-formed article 120' to a rear side forming protrusion D11R' corresponding to the rear side closed cross section 120R' (see FIG. 25B) of the bending-formed article 120'.

The bending forming protrusion D12A' has a forming shape portion corresponding to the straight shape portion 101 having the rectangular closed cross section of the trailing arm body 100, the cross-sectional shape changing portion 102, the circumferential length changing portion 103, the curved portion 104, and the circumferential length change rate changing portion 105 in the bending-formed article 120'.

Reference numeral Du shown in FIG. 25A denotes the width of the bending forming protrusion D12A' of the bending forming punch D12'.

Figure 25C:
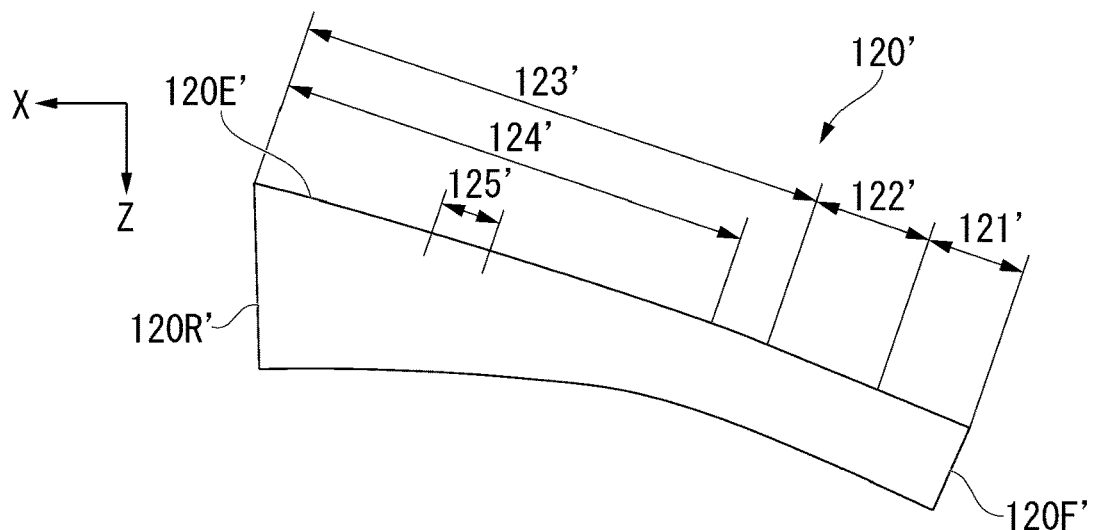
FIG. 25C is a view illustrating an outline of the bending-formed article formed in the bending forming step according to the embodiment, and is a view of the bending-formed article viewed from a side orthogonal to the bending forming direction.

As shown in FIGS. 25B and 25C, the bending-formed article 120' formed in the bending forming step according to this embodiment is configured to include a straight shape bent portion 121', a cross-sectional shape change bent portion 122', a circumferential length change bent portion 123', a curved bent portion 124', and a circumferential length change rate change bent portion 125' respectively corresponding to the straight shape portion 101 of the trailing arm body 100, the cross-sectional shape changing portion 102, the circumferential length changing portion 103, and the curved portion (specific three-dimensional shape portion) 104 and the circumferential length change rate changing portion 105 formed in the circumferential length changing portion 103.

FIG. 25B is a view of the bending-formed article 120' when viewed from the upper side (the bending forming punch D12' side), and FIG. 25C is a view of the bending-formed article 120' viewed in a direction orthogonal to a plane that is formed in the forming direction and includes the centroid line (that is, from a side).

As shown in FIGS. 25B and 25C, the bending-formed article 120' includes the straight shape bent portion 121', the cross-sectional shape change bent portion 122', the circumferential length change bent portion 123', the curved shape bent portion 124', and the circumferential length change rate change bent portion 125'.

Hereinafter, the step procedure in the bending forming step will be described.

(1) First, the material steel sheet W0' is disposed in the bending forming die and punch D10' (S102').

Figure 28A:
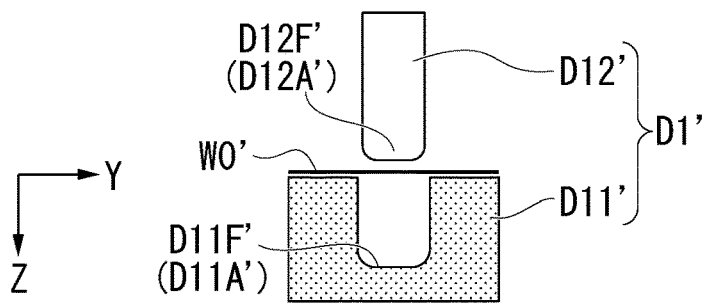
FIG. 28A is a view illustrating an outline of a manufacturing method of a trailing arm body according to the embodiment of the present invention, and is a view of a state in which the material steel sheet is placed in the bending forming die and punch, viewed from the front side of the trailing arm body.
Figure 29A:
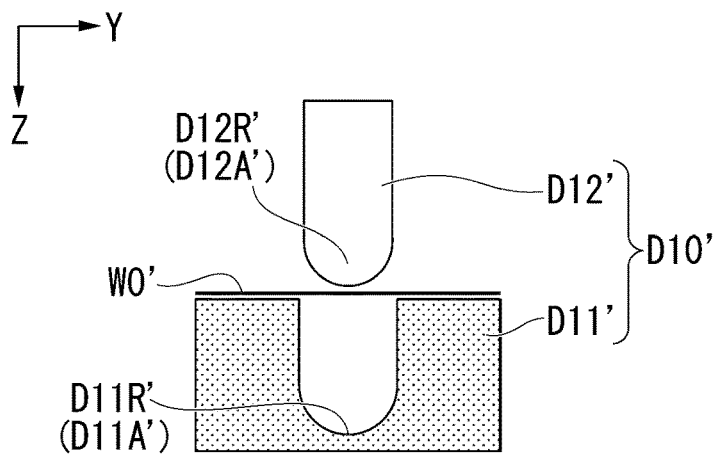
FIG. 29A is a view illustrating the outline of the manufacturing method of a trailing arm body according to the embodiment of the present invention, and is a view of the state in which the material steel sheet is placed in the bending forming die and punch, viewed from the rear side of the trailing arm body.

When the material steel sheet W0' is disposed in the bending forming die and punch D10', as shown in FIGS. 28A and 29A, the material steel sheet W0' is placed on the bending forming recessed die D11', and the bending forming protrusion D12A' of the bending forming punch D12' is located thereabove.

(2) The material steel sheet W0' is pressed by the bending forming punch D12' (S103').

Figure 28B:
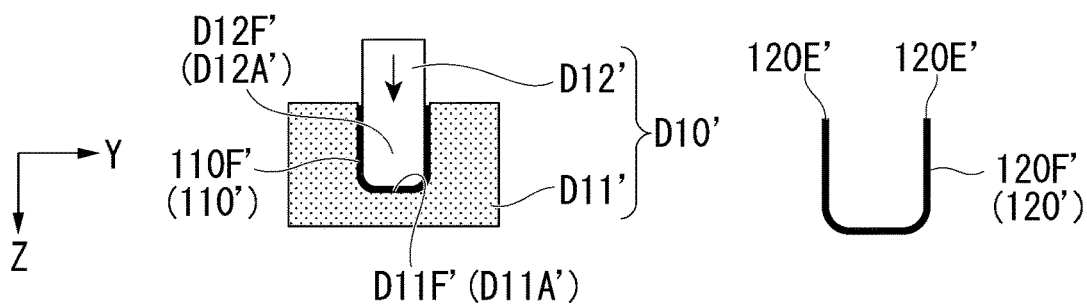
FIG. 28B is a view illustrating the outline of the manufacturing method of a trailing arm body according to the embodiment of the present invention, and is a view of a state in which the material steel sheet is pressed against a bending forming recessed die by a bending forming punch and bending-formed, and a bending-formed article, viewed from the front side of the trailing arm body.
Figure 29B:
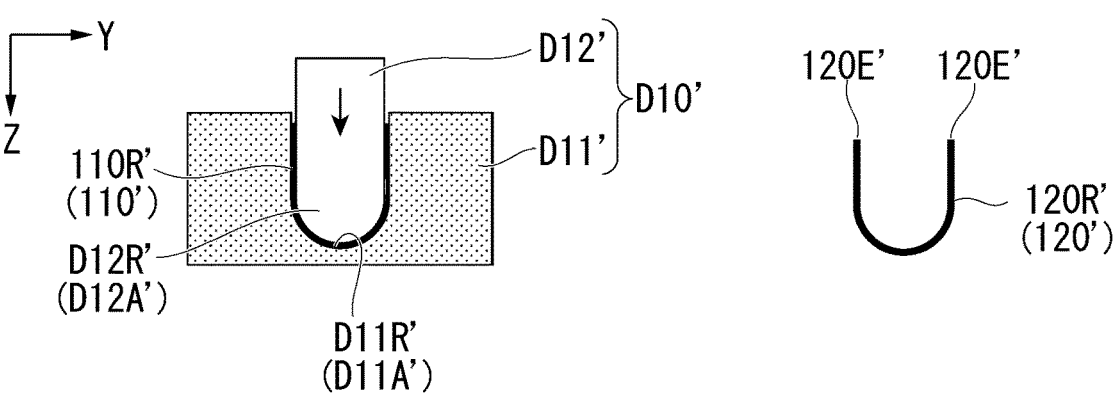
FIG. 29B is a view illustrating the outline of the manufacturing method of a trailing arm body according to the embodiment of the present invention, and is a view of the state in which the material steel sheet is pressed against the bending forming recessed die by the bending forming punch and bending-formed, and the bending-formed article, viewed from the rear side of the trailing arm body.

When the material steel sheet W0' is pressed by the bending forming punch D12', as shown in FIGS. 28B and 29B, the bending forming punch D12' is lowered in the Z-axis direction, and the material steel sheet is lowered to cause the bending forming protrusion D12A' to press the material steel sheet W0', and the material steel sheet W0' is bending-formed to follow the bending forming protrusion D12A' and the bending forming recessed part D11A' by the bending forming punch D12' in cooperation with the bending forming recessed die D11'.

In FIGS. 28A, 29A, 28B, and 29B, reference numerals D11F' and D11R' respectively denote the front side shape portion and the rear side shape portion of the bending forming recessed part D11A', and reference numerals D12F' and D12R' respectively denote the front side shape portion and the rear side shape portion of the bending forming protrusion D12A'.

(3) The bending-formed article 120' is taken out of the bending forming recessed die D11' (S104).

As shown in the right figures of FIGS. 28B and 29B, the bending-formed article 120' has a recessed shape portion, in which one end side is the front side cross section 120F' corresponding to the front side closed cross section 100F (see FIG. 7B) of the trailing arm 100, and the other end side is the rear side cross section 120R' corresponding to the rear side closed cross section 100R (see FIG. 7B).

[O-Forming Step]

In the O-forming step (abutting portion forming step), as shown in S105' to S108' of FIG. 23, the bending-formed article (bending-formed portion) is disposed in the O-forming die (abutting portion forming die), the bending-formed article (bending-formed portion) is pressed in the O-forming die to cause the abutting scheduled portions of the bending-formed article (bending-formed portion) to abut each other, and the abutting portion formed article is taken out.

Figure 26A:
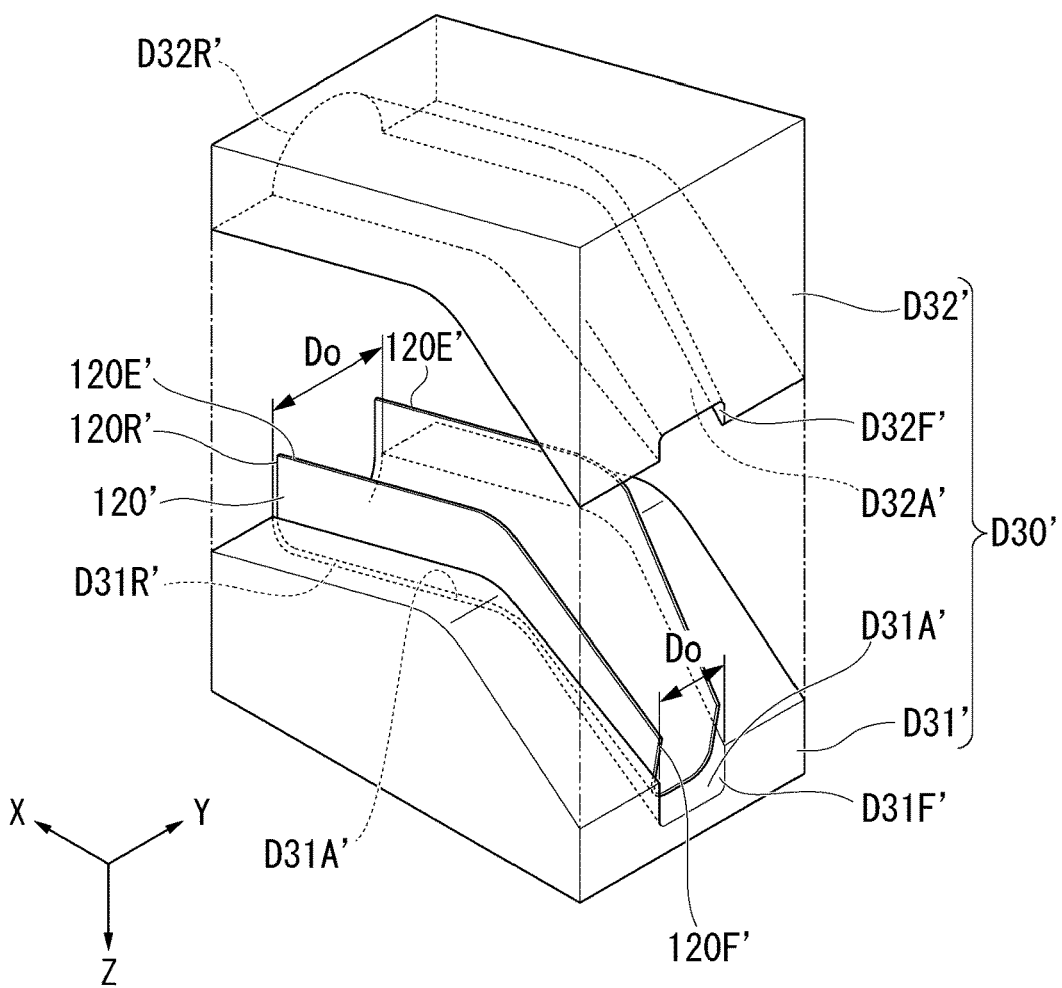
FIG. 26A is a view illustrating an outline of an abutting portion forming step in the manufacturing of the trailing arm body according to the embodiment, and is a perspective view showing a schematic configuration of an O-forming die.

Hereinafter, a schematic configuration of the abutting portion forming die D30' will be described with reference to FIGS. 26A, 28C to 28F, and 29C to 29F. FIG. 26A is a perspective view illustrating the O-forming die D30' in the manufacturing of the trailing arm body according to the third embodiment.

As shown in FIGS. 26A, 28C to 28F, and 29C to 29F, the O-forming die D30' includes, for example, a lower die (first recessed die) D31' which is a fixed die and has an abutting portion forming recessed part formed therein, and an upper die (second recessed die) D32' which is disposed above the lower die D31', is able to advance and retreat in the Z-axis direction with respect to the lower die D31', and has an abutting portion forming recessed part formed therein.

As shown in FIG. 26A, in the lower die D31', a lower die recessed part D31A' in which the bending-formed article 120' is disposed is formed over a range from a front side shape portion 120F' to a rear side shape portion 120R' of the bending-formed article 120'.

In the upper die D32', an upper die recessed part D32A' is formed which causes side end portions 120E' on both sides of the bending-formed article 120' to follow the upper die recessed part D32A' in cooperation with the lower die recessed part D31A' so that the side end portions 120E' are caused to approach and abut each other over a range from the front side shape portion 120F' to the rear side shape portion 120R' to form an abutting portion formed article 130'.

Figure 26B:
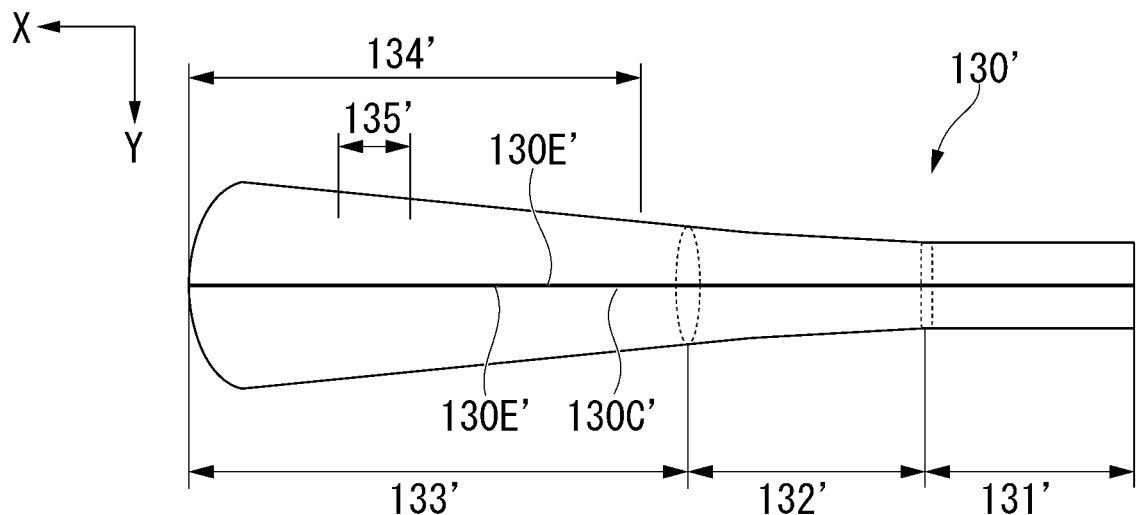
FIG. 26B is a view illustrating an outline of an abutting portion formed article connected in the abutting portion forming step according to the embodiment, and is a view of the abutting portion formed article viewed from an abutting portion side.
Figure 26C:
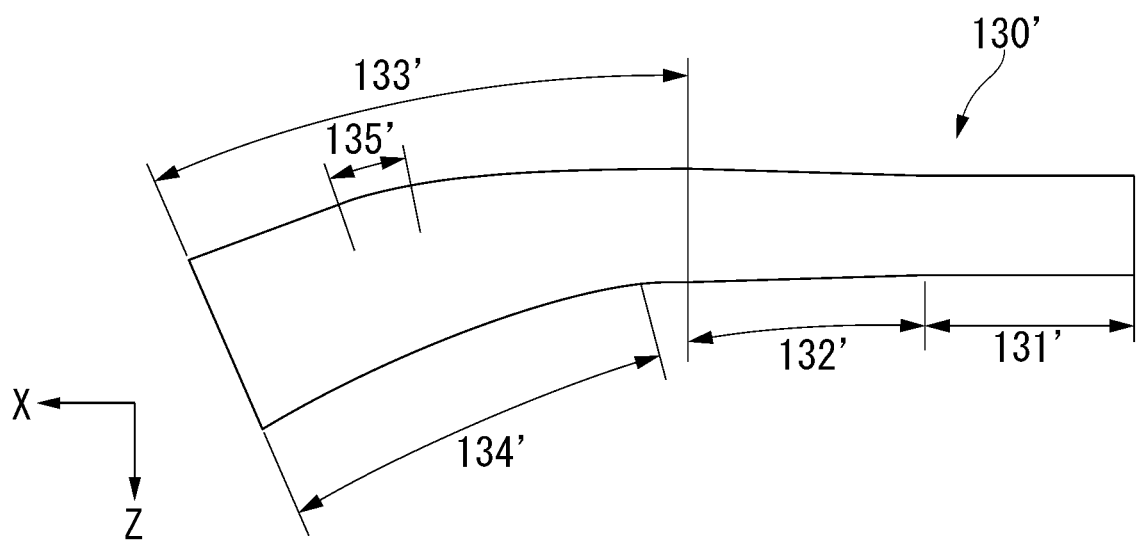
FIG. 26C is a view illustrating an outline of the abutting portion formed article subjected to abutting in the abutting portion forming step according to the embodiment, and is a view of the abutting portion formed article viewed from a side orthogonal to a forming direction during abutting portion forming.

As shown in FIGS. 26B and 26C, the abutting portion formed article 130 includes a straight shape portion 131', a cross-sectional shape changing portion 132', a circumferential length changing portion 133', a curved portion 134', and a circumferential length change rate changing portion 135'.

The straight shape portion 131', the cross-sectional shape changing portion 132', the circumferential length changing portion 133', the curved portion 134', and the circumferential length change rate changing portion 135' have configurations respectively corresponding to the straight shape portion 101, the cross-sectional shape changing portion 102, the circumferential length changing portion 103, the curved portion 104, and the circumferential length change rate changing portion 105 of the trailing arm body 100.

Reference numeral Do shown in FIG. 26A denotes the width of the lower die recessed part D31A' of the lower die (first recessed die) D31'.

FIG. 26B is a view of the abutting portion formed article 130' viewed from the upper die D32 side, and FIG. 26C is a view of the abutting portion formed article 130' viewed in a direction orthogonal to a plane that is formed in the forming direction and includes the centroid line (that is, from a side).

Figure 27:
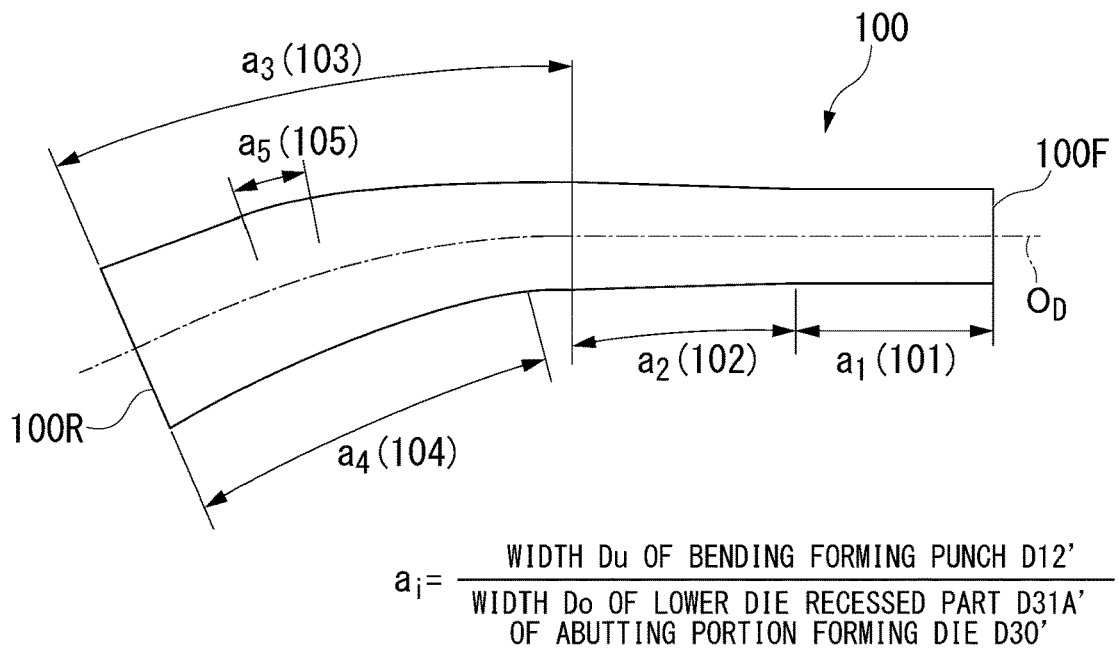
FIG. 27 is a view illustrating an outline of a forming condition ratio a (=Du/Do) in a die and punch according to the embodiment of the present invention.

Here, with reference to FIG. 27, the forming condition ratio a when manufacturing the trailing arm body 100, the width Du of the bending forming punch of the bending forming die and punch D10' shown in FIG. 25A, and the width Do of the lower die recessed part D31A' of the lower die (first recessed die) D31' shown in FIG. 26A will be described. FIG. 27 is a view illustrating an outline of the forming condition ratio a (=Du/Do) in the dies and punches (the bending forming die and punch D10' and the O-forming die D30') according to the third embodiment.

As shown in FIG. 27, the forming condition ratio a (=Du/Do) when manufacturing the trailing arm body 100 is configured to change along the longitudinal direction (centroid line) of the trailing arm body 100.

Forming condition ratios $a_1$, $a_2$, $a_3$, $a_4$, and $a_5$ shown in FIG. 27 respectively correspond to the straight shape portion 101, the cross-sectional shape changing portion 102, the circumferential length changing portion 103, the curved portion 104, and the circumferential length change rate changing portion 105 of the trailing arm body 100, and are configured to change along the centroid line of the trailing arm body 100. The forming condition ratios $a_1$, $a_2$, $a_3$, $a_4$, and $a_5$ are appropriately set to, for example, 0.85 to 0.95. These values may be set by performing the above-described forming condition ratio setting step in one or a plurality of cycles.

In FIG. 27, the forming condition ratio $a_4$ and the forming condition ratio $a_5$ are included in the forming condition ratio $a_3$. In such a case, a suitable forming condition ratio a for either or both can be appropriately used.

The forming condition ratios $a_1$, $a_2$, $a_3$, $a_4$, and $a_5$ are defined by the mathematical expression representing a forming condition ratio $a_1$ shown in FIG. 27, the width Du of the bending forming punch D12' corresponds to reference numeral Du shown in the bending forming punch of the bending forming die and punch D10' in FIG. 25A, and the width Do of the lower die recessed part D31A' of the O-forming die D30' corresponds to reference numeral Do shown in the lower die recessed part (abutting portion forming recessed part) D31A' of the lower die (first recessed die) D31' in FIG. 26A.

The width Du of the bending forming punch D12' shown in FIG. 25A and the width Do of the lower die recessed part D31A' of the O-forming die D30' shown in FIG. 26A correspond to each other at positions of the bending forming punch D12' and the lower die recessed part D31A' corresponding to each other in the longitudinal direction (X-axis direction).

The width Du of the bending forming punch D12' and the width Do of the lower die recessed part D31A' of the O-forming die D30' are values corresponding to each portion in the trailing arm body 100 shown in FIG. 27. For example, the width Du of the press forming punch D12' and the width Do of the lower die recessed part D31A' of the O-forming die D30' corresponding to the forming condition ratio $a_2$ are the width Du and the width Do of the portion for forming the cross-sectional shape changing portion 132'. Therefore, even in a case where the forming condition ratio a changes along the centroid line, the bending forming punch in the bending forming step and the first recessed die and the second recessed die in the O-forming step do not need to relatively move in the direction orthogonal to the centroid line.

Hereinafter, the step procedure in the abutting portion forming step will be described.

(1) The bending-formed article 120' is disposed in the O-forming die D30' (S105').

Figure 28C:
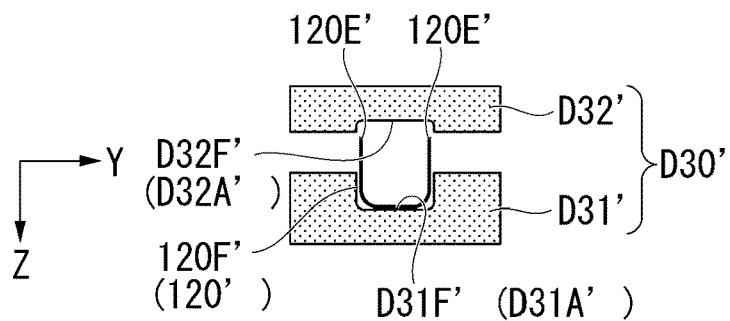
FIG. 28C is a view illustrating the outline of the manufacturing method of a trailing arm body according to the embodiment of the present invention, and is a view of a state in which the bending-formed article is disposed in the O-forming die, viewed from the front side of the trailing arm body.
Figure 29C:
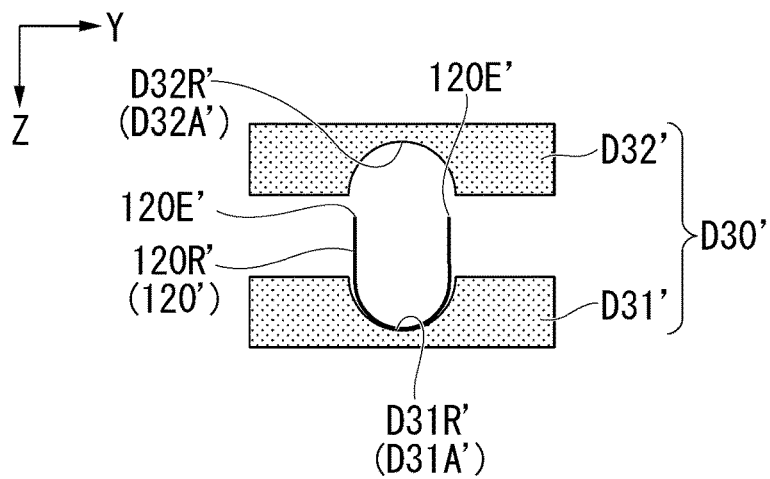
FIG. 29C is a view illustrating the outline of the manufacturing method of a trailing arm body according to the embodiment of the present invention, and is a view of the state in which the bending-formed article is disposed in the O-forming die, viewed from the rear side of the trailing arm body.

When the bending-formed article 120' is disposed in the O-forming die D30', as shown in FIGS. 28C and 29C, the bending-formed article 120' is disposed in the lower die D31' in which the lower die recessed part D31A' is formed, and the upper die D32' in which the upper die recessed part D32A' is formed is located thereabove.

(2) The bending-formed article 120' is pressed by the O-forming die D30' (S106').

When the bending-formed article 120' is pressed by the O-forming die D30', as shown in FIGS. 28C and 29C, the bending-formed article 120' is disposed in the lower die D31' and the upper die D32' is lowered to deform the side end portions (abutting scheduled portions) 120E' on both sides of the bending-formed article 120' to follow the upper die recessed part D32A'.

(3) The abutting scheduled portions of the bending-formed article 120' are caused to abut each other (S107).

Figure 28D:
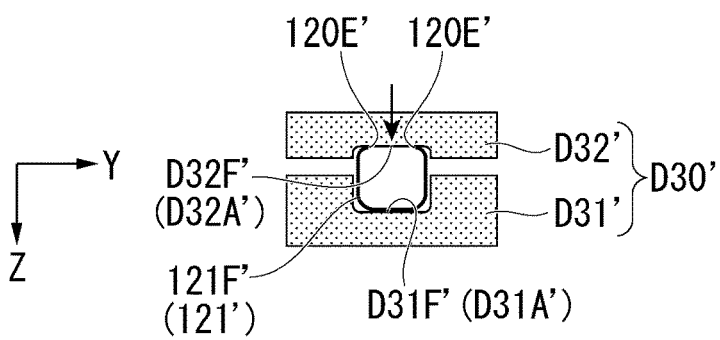
FIG. 28D is a view illustrating the outline of the manufacturing method of a trailing am body according to the embodiment of the present invention, and is a view of a state in which the bending-formed article is formed into an abutting portion formed article having a closed cross section by the O-forming die, viewed from the front side of the trailing arm body.
Figure 29D:
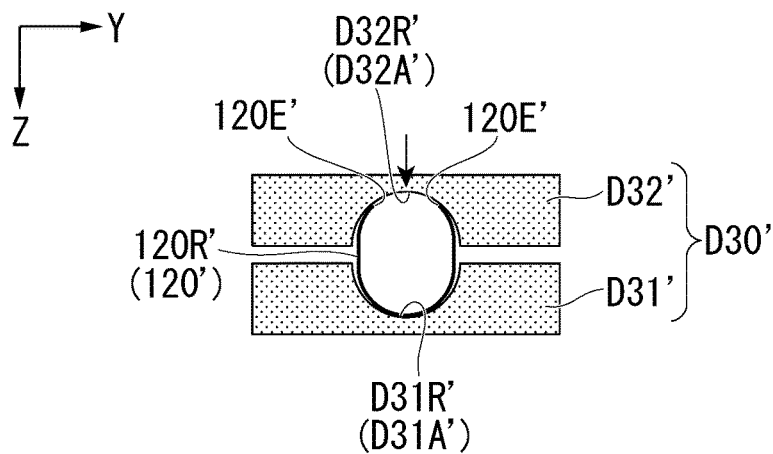
FIG. 29D is a view illustrating the outline of the manufacturing method of a trailing arm body according to the embodiment of the present invention, and is a view of the state in which the bending-formed article is formed into the abutting portion formed article having a closed cross section by the O-forming die, viewed from the rear side of the trailing arm body.

As shown in FIGS. 28D and 29D, by pressing the bending-formed article 120' by the upper die recessed part D32A', the bending-formed article 120' is formed to follow the upper die recessed part D32A' and the lower die recessed part D31A'.

As a result, the side end portions 120E on both sides of the bending-formed article 120' abut each other.

Figure 28E:
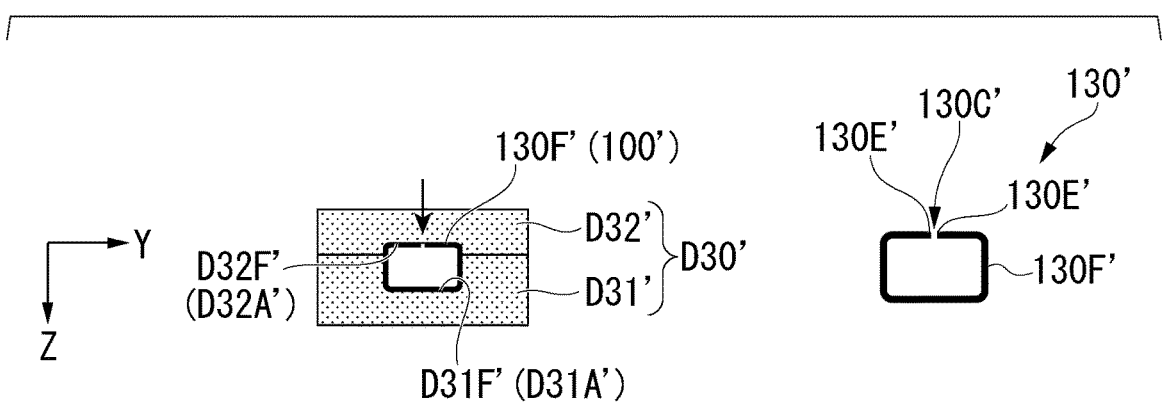
FIG. 28E is a view illustrating the outline of the manufacturing method of a trailing arm body according to the embodiment of the present invention, and is a view of a state in which the abutting portion formed article is formed by the O-forming die and the formed abutting portion formed article, viewed from the front side of the trailing arm body.
Figure 29E:
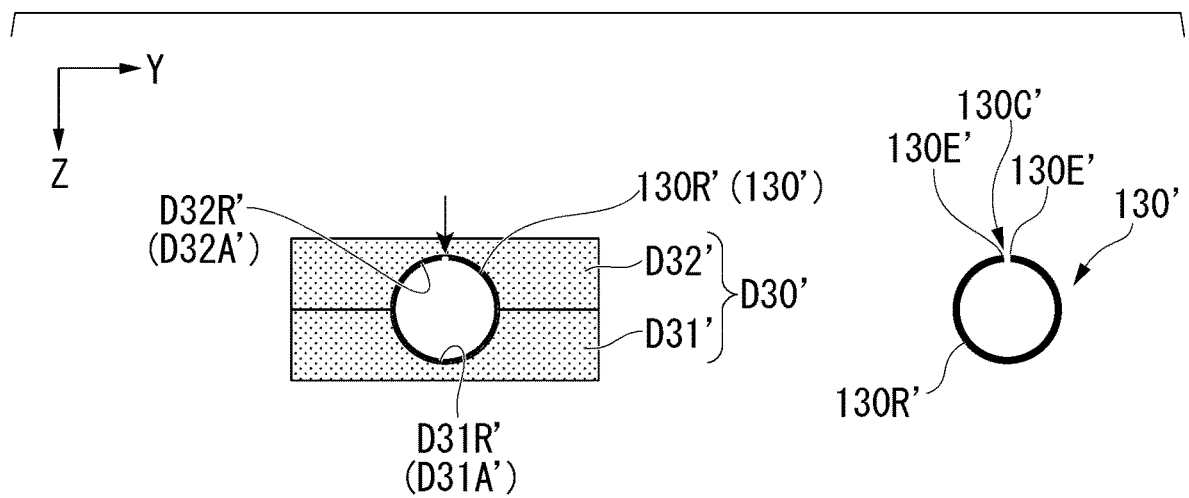
FIG. 29E is a view illustrating the outline of the manufacturing method of a trailing arm body according to the embodiment of the present invention, and is a view of the state in which the abutting portion formed article is formed by the O-forming die and the formed abutting portion formed article, viewed from the rear side of the trailing arm body.

In FIGS. 28E and 29E, reference numerals D31F' and D31R' respectively denote the front side shape portion and the rear side shape portion of the lower die recessed part (abutting portion forming recessed part) D31A', and reference numerals D32F' and D32R' respectively denote the front side shape portion and the rear side shape portion of the upper die recessed part (abutting portion forming recessed part) D32A'.

(4) The abutting portion formed article 130' is taken out of the O-forming die D30' (S108').

As shown in the right figures of FIGS. 28E and 29E, in the abutting portion formed article 130', the side end portions 120E' on both sides of the bending-formed article 120' abut each other and form abutting portions 130C'.

In addition, in the abutting portion formed article 130', one end side is a front side cross section 130F' corresponding to the front side closed cross section 100F of the trailing arm body 100, and the other end side is a rear side cross section 130R' corresponding to the rear side closed cross section 100R.

[Joining Step]

In this embodiment, in the joining step, both the side end portions 130E' of the abutting portions 130C' of the abutting portion formed article 130' are joined by welding to form the seam portion (joint portion) 100S' (S109').

Figure 28F:
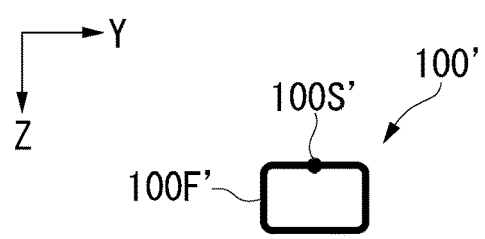
FIG. 28F is a view illustrating the outline of the manufacturing method of a trailing arm body according to the embodiment of the present invention, and is a view of the trailing arm body formed by joining abutting portions of the abutting portion formed article, viewed from the front side.
Figure 29F:
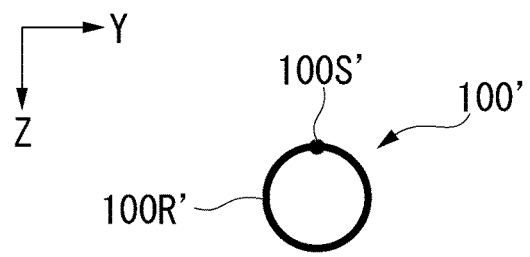
FIG. 29F is a view illustrating the outline of the manufacturing method of a trailing arm body according to the embodiment of the present invention, and is a view of the trailing arm body formed by joining the abutting portions of the abutting portion formed article, viewed from the rear side.

When the abutting portions 130C' of the abutting portion formed article 130' are joined by welding, as shown in FIGS. 28F and 29F, the seam portion 100S' is formed. As a result, the trailing arm body 100 is formed.

When joining the seam portion (joint portion) 100S', laser welding or the like as well as arc welding can be applied.

[Member Attaching Step]

In this embodiment, in a member attaching step, the pivot attachment member 10F and the steel wheel attachment member 10R are joined to the railing arm body 100 by welding (S110').

The pivot attachment member 10F and the steel wheel attachment member 10R are joined (welded) and attached to the trailing arm body 100.

As a result, the trailing arm 10 as shown in FIGS. 6 and 7A to 7D is formed.

According to the manufacturing method of the trailing arm body 100 (member for a vehicle) according to the third embodiment, the trailing arm body 100 including the cross-sectional shape changing portion 102 and the circumferential length change rate changing portion 105 can be efficiently manufactured.

According to the manufacturing method of the trailing arm body 100 according to the third embodiment, since the forming condition ratio a which is the ratio of the width Du of the bending forming punch used when forming the bending-formed portion from the metal material sheet W0' in the bending forming step to the width Do of the O-forming die (more specifically, the width Do of the lower die recessed part (abutting portion forming recessed part) D31A' of the lower die D31' and the upper die recessed part (abutting portion forming recessed part) D32A' of the upper die D32') is set to 0.85 to 0.95, the springback can be appropriately suppressed, and the side end portions 120E' on both sides can be accurately and efficiently brought into close contact with each other or approach a target position.

In addition, after the abutting portion forming step, since both the side end portions 120E' forming the abutting portions 130C' are disposed close to each other, the side end portions 120E' can be efficiently joined to each other without using a complex jig or the like.

In addition, since the forming condition ratio a is set to less than 1.0, the press-formed article 120 can be easily disposed in the lower die recessed part D31A' and the upper die recessed part D32A' of the O-forming die D30'.

As a result, the trailing arm body 100 can be efficiently manufactured. Furthermore, a reduction in the weight of the member and the member for a vehicle can be easily achieved and the manufacturing cost can be reduced.

According to the manufacturing method of the trailing arm body 100 according to the third embodiment, since the curved portion 104 bent in the plane along the forming direction is formed by the press forming die and punch D30', the trailing arm body 100 including the curved portion 104 can be efficiently formed.

According to the trailing arm body 100 and the manufacturing method of the trailing arm body 100 according to the third embodiment, since the forming condition ratio a is adjusted and set according to the position along the centroid line of the trailing arm body 100, the abutting portions 130C' of the abutting portion formed article 130' can be accurately abut each other (or approach to a position where joining is possible).

As a result, the trailing arm body 100 can be efficiently manufactured.

The present invention is not limited to each of the above embodiments, and various modifications can be made without departing from the gist of the invention.

For example, in the above embodiments, the case where the member is the trailing arm body 100 (trailing arm 10) has been described, but the member may be applied to other members for a vehicle instead of the trailing arm body 100.

Instead of the member for a vehicle, the member may be applied to a member forming a building structure or a mechanical structure.

Furthermore, for example, the manufacturing method of a member according to the present invention may be applied to the manufacturing of a line pipe or the like in which a circumferential length change rate changing portion, a cross-sectional shape changing portion, a curved portion, and the like are formed over a part or the entirety of the length thereof.

In addition, in the above embodiments, the case where the forming condition ratio a is set to 0.85 to 0.95 over the entire length of the abutting portion formed article 130 forming the trailing arm body 100 and the forming condition ratio at each portion changes along the centroid line has been described. However, for example, the forming condition ratio a may be set to 0.85 to 0.95 for the entirety or a part of the length of the specific three-dimensional tubular portion and the forming condition ratio a for other portions may be set to a range other than the range of 0.85 to 0.95, or the forming condition ratio a may be set to a constant value over the entire length.

In addition, the forming condition ratio a may be set to 0.85 to 0.95 for the tubular portion other than the cross-sectional shape changing portion, the curved portion, and the circumferential length change rate changing portion.

In the above embodiments, the case where the forming condition ratio a is determined by using the finite element method has been described. However, the forming condition ratio a may be set, for example, by a calculation method other than the finite element method or an experiment.

Furthermore, in the above embodiments, the case where the trailing arm body (member for a vehicle, member) 100) is formed into a tubular portion over the entire length has been described. However, application to a blade-shaped configuration (for example, attachment ribs or stays) other than a tubular shape in a portion of a member or a member having a channel-like configuration (for example, a connection arm portion) can be made.

In addition, in the above embodiments, the case where the side end portions 120E and 120E' on both sides of the press-formed article 120 and the bending-formed article 120' are substantially brought into close contact with each other over the entire length and thereafter are joined to each other has been described. However, the side end portions 120E and 120E' on both sides may abut (oppose) each other at a gap at which the side end portions 120E and 120E' can be joined to each other by welding or the like, a gap may be formed in a portion of the side end portions that are brought into contact, and the side end portions on both sides may be disposed close to each other at a predetermined gap over the entire length.

In a case where a gap is formed, the interval of the gap may be formed to be different depending on the position along the gap.

Whether or not the abutting portions are joined by welding or the like can be set in any method or a configuration in which a portion thereof is joined may be adopted.

In the above embodiments, the case of application to the trailing arm body (member for a vehicle) 100 having a circular closed cross section and a rectangular closed cross section has been described. However, it is needless to say that application to a member having a polygonal (including a regular polygon and figures other than the regular polygon) closed cross section instead of the circular closed cross section and the rectangular closed cross section can be made.

In the above embodiments, the case where the trailing arm body 100 has the cross-sectional shape changing portion 102 in which the change in length in the direction including the centroid line of the cross-sectional shape and the abutting portion is 10% to 50%, the curved portion 104 having a curvature of 0.002 mm$^{-1}$ to 0.02 mm$^{-1}$, and the circumferential length change rate changing portion 105 in which the change in the circumferential length change rate between the first end portion (start point) and the second end portion (end point) is 0.035 mm$^{-1}$ to 0.35 mm$^{-1}$ has been described. However, the trailing arm body 100 may have at least any one of the cross-sectional shape changing portion 102, the curved portion 104, or the circumferential length change rate changing portion 105. The numerical values of the cross-sectional shape changing portion 102, the curved portion 104, and the circumferential length change rate changing portion 105 are not limited to the above ranges and can be appropriately set.

In the above embodiments, the case where the material steel sheets W0 and W0' having a flat sheet shape are press-formed or bending-formed has been described. However, for example, a configuration having a step of imparting curvatures to the side end portions WE and WE' on both sides in the width direction of the material steel sheets W0 and W0' along the edge portion before performing press forming or bending forming shown in FIGS. 15A, 16A, 28A, and 29A may be adopted. In addition, a configuration including a step of performing drilling, imparting local unevenness, or performing restriking before and after the press forming step (or bending forming step) or the O-forming step may be adopted. In the abutting portion forming step, forming may be performed with the core inserted into a portion or the entirety of the tubular portion.

In the above embodiments, the case where the forming condition ratio a which is made suitable by evaluation based on the settings of the forming condition ratio a, the material properties of the member, the shape and sheet thickness of the metal material sheet, the forming conditions in the bending forming step, and the forming conditions in the abutting portion forming step is applied has been described. However, parameters other than the above may be substituted, or the forming condition ratio a including parameters other than the above may be evaluated.

In the first embodiment, the case where the press-formed article 120 after trimming the press-formed article 110 with a flange-shaped excess thickness portion (press-formed article) is subjected to abutting in the abutting portion forming step has been described. However, whether or not the trimming step is provided can be set in any method, and an excess thickness portion (extending portion) extending along a wall portion having a recessed cross-sectional shape may be formed.

In the above embodiments, the case where the trailing arm body 100 is integrally formed in the press forming step (or bending forming step) and the O-forming step has been described. However, for example, the trailing arm body 100 may be formed by forming a circular closed cross section, a polygonal closed cross section, or the like in the press forming step (or bending forming step) and the abutting portion forming step and performing restriking forming thereon.

In the above embodiments, the case where the metal material sheet is applied to the material steel sheet having a tensile strength of, for example, 400 MPa has been described. However, it is needless to say that application to a material steel sheet having a tensile strength of less than 400 MPa other than the material steel sheet having a tensile strength of more than 400 MPa, in which springback is likely to occur, or a metal material sheet other than a steel sheet in which springback occurs can be made.

EXAMPLES

Next, examples of the present embodiments will be described. In this example, the following experiments were conducted in order to confirm the effects of each of the above-described embodiments.

1. Experimental Example 1

In Experimental Example 1, the above-described second model M200 was manufactured by press forming (second finding). As the metal material sheet W200, a steel sheet having a tensile strength of 600 MPa and a thickness of 2.0 mm was used. Then, the second models M200 were manufactured by variously changing the forming condition ratio a and the change Rh in the length in the direction including the centroid line of the cross-sectional shape of the cross-sectional shape changing portion M203 and the abutting portion M200C along the centroid line, and the quality of these second models M200 was evaluated. Rh was the median value of the values measured at both end portions and the central part of the cross-sectional shape changing portion M203 in the longitudinal direction. The outer diameter of the circular closed cross section M202 was set to 40 mm in common. The evaluation items were "gap between abutting portions after springback" and "shape accuracy after springback". The details of the evaluation method are as follows.

(Gap Between Abutting Portions after Springback)

After taking the second model M200 out of the O-forming die D220 (that is, after the second model M200 had undergone springback), the distance between the abutting portion M200C was measured. Then, the gap between the abutting portions after the springback was evaluated according to the following evaluation criteria. A to C were set as acceptable levels. The results are summarized in Table 1.

A: The abutting portions are in close contact with each other.

B: The distance between the abutting portions is 0.5 mm or less.

C: The distance between the abutting portions is less than 2.0 mm.

D: The distance between the abutting portions is 2.0 mm or more.

(Shape Accuracy after Springback)

After taking the second model M200 out of the O-forming die D220 (that is, after the second model M200 had undergone springback), the height of the second model M200 (the distance (that is, outer diameter) from the outer circumferential surface portion in the abutting portion to the outer circumferential surface portion opposing the abutting portion) was measured. Furthermore, the distance (the forming surface height of the O-forming die D220) from the upper end of the upper die recessed part D222A to the lower end of the lower die recessed part D221A was measured in a state where the upper die D222 and the lower die D221 completely abutted each other. Then, based on the evaluation value obtained by dividing the height of the second model M200 by the forming surface height of the O-forming die D220 and the following evaluation criteria, the shape accuracy after springback was evaluated. a to c were set as acceptable levels. The results are summarized in Table 1.

a: The evaluation value is 1.00 or more and less than 1.01.

b: The evaluation value is 1.01 or more and less than 1.03.

c: The evaluation value is 1.03 or more and less than 1.05.
d: The evaluation value is 1.05 or more.

TABLE 1

| | | a | | | | | | | |
|---|---|---|---|---|---|---|---|---|---|
| | | 0.55 | 0.6 | 0.75 | 0.8 | 0.85 | 0.95 | 0.99 | 1 |
| Rh (%) | 8 | A, c | A, b | A, a | A, a | B, a | C, a | D, a | D, a |
| | 10 | A, d | A, c | A, b | A, a | A, a | B, a | C, a | D, a |
| | 30 | A, d | A, d | A, c | A, b | A, a | A, a | B, a | C, a |
| | 50 | A, d | A, d | A, c | A, b | A, a | A, a | B, a | C, a |
| | 52 | A, d | A, d | A, d | A, c | A, a | A, a | B, a | C, a |

2. Experimental Example 2

In Experimental Example 2, the above-described first model M100' was manufactured by bending forming (first finding). As the metal material sheet W100', a steel sheet having a tensile strength of 600 MPa and a thickness of 1.6 mm was used. Then, the quality of the first model M100' was evaluated by variously changing the forming condition ratio a and the circumferential length change rate Rc of the circumferential length change rate changing portion M103'. The circumferential length change rate Rc was a value obtained by dividing the difference in the circumferential length change rate measured at both ends of the circumferential length change rate changing portion M103' by the interval (length or dimension) between both ends along the centroid line. The evaluation items were "gap between abutting portions after springback" and "shape accuracy after springback". The measurement and evaluation of the evaluation items were conducted according to Experimental Example 1. The results are summarized in Table 2.

TABLE 2

| | | a | | | | | | | |
|---|---|---|---|---|---|---|---|---|---|
| | | 0.55 | 0.6 | 0.75 | 0.8 | 0.85 | 0.95 | 0.99 | 1 |
| Rc | 0.01 | A, c | A, b | A, a | A, a | B, a | C, a | D, a | D, a |
| | 0.035 | A, d | A, c | A, b | A, a | A, a | B, a | C, a | D, a |
| | 0.15 | A, d | A, d | A, c | A, b | A, a | A, a | B, a | C, a |
| | 0.35 | A, d | A, d | A, c | A, b | A, a | A, a | B, a | C, a |
| | 0.4 | A, d | A, d | A, d | A, c | A, a | A, a | B, a | C, a |

3. Experimental Example 3

In Experimental Example 3, the above-described third model M300' was manufactured by bending forming (third finding). As the metal material sheet W300', a steel sheet having a tensile strength of 600 MPa and a thickness of 2.8 mm was used. Then, the quality of the third model M300' was evaluated by variously changing the forming condition ratio a and the curvature R1 of the third model M300'. The curvature R1 was the median value of the values measured at both end portions and the central part of the third model M300'. The evaluation items were "gap between abutting portions after springback" and "shape accuracy after springback". The measurement and evaluation of the evaluation items were conducted according to Experimental Example 1. The results are summarized in Table 3.

TABLE 3

| | | a | | | | | | | |
|---|---|---|---|---|---|---|---|---|---|
| | | 0.55 | 0.6 | 0.75 | 0.8 | 0.85 | 0.95 | 0.99 | 1 |
| R1 (mm$^{-1}$) | 0.0001 | A, c | A, b | A, a | A, a | B, a | C, a | D, a | D, a |
| | 0.002 | A, d | A, c | A, b | A, a | A, a | B, a | C, a | D, a |
| | 0.01 | A, d | A, d | A, c | A, b | A, a | A, a | B, a | C, a |
| | 0.02 | A, d | A, d | A, c | A, b | A, a | A, a | B, a | C, a |
| | 0.025 | A, d | A, d | A, d | A, c | A, a | A, a | B, a | C, a |

As is clear from Tables 1 to 3, good results were obtained in a case where the forming condition ratio a was 0.85 to 0.95. In addition to these conditions, better results can be obtained in a case where Rh was 10% to 50%, Re was 0.035 mm$^{-1}$ to 0.35 mm$^{-1}$, and R1 was 0.002 mm$^{-1}$ to 0.02 mm$^{-1}$. Therefore, it could be seen that good results can be obtained by each of the above findings and embodiments.

In the above examples, the experiments were conducted on the steel sheets. However, when the same experiments as in Experimental Examples 1 to 3 were conducted on an Al sheet, the same results as in Experimental Examples 1 to 3 were obtained.

INDUSTRIAL APPLICABILITY

According to the manufacturing method of a member, the manufacturing method of a member for a vehicle, and the die and punch according to this invention, it is possible to efficiently manufacture a member such as a member for a vehicle having a specific three-dimensional tubular portion, which is industrially applicable.

BRIEF DESCRIPTION OF THE REFERENCE SYMBOLS

W0 Material steel sheet (metal material sheet)
10 Trailing arm (member, member for a vehicle)
D10, D10A Press forming die and punch
D11 Press forming recessed die
D11A Press forming recessed part
D11B Press forming recessed part
D11C Counter
D12 Press forming punch
D12A Press forming protrusion
D13 Steel sheet pressing member (metal material pressing member)
D30 O-forming die
D31 Lower die (first recessed die)
D31A Lower die recessed part (first recessed part)
D32 Upper die (second recessed die)
D32A Upper die recessed part (second recessed part)
100 Trailing arm body (tubular portion, member, member for a vehicle)
101 Straight shape portion
102 Cross-sectional shape changing portion
103 Circumferential length changing portion
104 Curved portion
105 Circumferential length change rate changing portion
110 Press-formed article with an excess thickness portion (press-formed article)
110F Front side cross section (press-formed article with an excess thickness portion)
110R Rear side cross section (press-formed article with an excess thickness portion)
120 Flangeless press-formed article (trimming press-formed article)

120F Front side cross section (flangeless press-formed article)
120R Rear side cross section (flangeless press-formed article)
130 Abutting portion formed article
130C Abutting portion
130F Front side cross section (abutting portion formed article)
130R Rear side cross section (abutting portion formed article)

The invention claimed is:

1. A manufacturing method of a member for manufacturing a member which includes a specific three-dimensional tubular portion including at least any one of a cross-sectional shape changing portion in which a cross-sectional shape of a tubular portion changes along a centroid line, a circumferential length change rate changing portion in which a circumferential length of the tubular portion changes along the centroid line and a change rate of the circumferential length changes, and a curved portion in which the centroid line of the tubular portion has a curvature, by processing a metal material sheet, the manufacturing method comprising:
a U-forming step of performing U-forming on the metal material sheet using a U-forming die and punch including a U-forming punch to manufacture a U-formed article having a recessed cross-sectional shape; and
an O-forming step of causing side end portions of the U-formed article to abut each other by an O-forming die to form abutting portions,
wherein a forming condition ratio a=Du/Do which is a ratio of a punch width Du of a portion of the U-forming punch corresponding to the specific three-dimensional tubular portion to a recessed part width Do of a portion of the O-forming die corresponding to the specific three-dimensional tubular portion is set to 0.85 to 0.95;
wherein a forming condition ratio setting step performed in one or a plurality of cycles before the U-forming step,
wherein, in the forming condition ratio setting step, a finite element analysis is performed in consideration of conditions including the forming condition ratio a set in the forming condition ratio setting step in a previous cycle or an initial value of the forming condition ratio a, material properties of the member, a shape and a sheet thickness of the metal material sheet, forming conditions in the U-forming step, and forming conditions in the O-forming step to estimate a shape parameter including a strain amount generated in the U-forming step in a direction along the centroid line of the specific three-dimensional tubular portion, a strain amount generated in the O-forming step in the direction along the centroid line of the specific three-dimensional tubular portion, and relative positions of the side end portions, and the forming condition ratio setting step is repeated until the shape parameter satisfies desired conditions.

2. The manufacturing method of a member according to claim 1,
wherein the U-forming die and punch has a press forming punch which is the U-forming punch, and a press forming recessed die in which a press forming recessed part corresponding to the press forming punch is formed, and
the U-forming step includes
a press forming step of relatively moving the press forming punch in a direction toward the press forming recessed die to form the metal material sheet into a press-formed article having a recessed cross-sectional shape portion and an extending portion extending outward from both side end portions of the recessed cross-sectional shape portion, and
a flangeless forming step of removing the extending portion from the press-formed article to manufacture the U-formed article.

3. The manufacturing method of a member according to claim 1,
wherein the U-forming die and punch has a bending forming punch which is the U-forming punch, and a bending forming recessed die in which a bending forming recessed part corresponding to the bending forming punch is formed, and
in the U-forming step, the bending forming punch is relatively moved in a direction toward the bending forming recessed die to manufacture the U-formed article.

4. The manufacturing method of a member according to claim 1,
wherein the forming condition ratio a changes along the centroid line of the specific three-dimensional tubular portion.

5. A manufacturing method of a member for a vehicle, comprising:
applying the manufacturing method of a member according to claim 1.

6. A die and punch used in the manufacturing method of a member according to claim 1, comprising:
the U-forming die and punch; and
the O-forming die,
wherein the forming condition ratio a is set to 0.85 to 0.95;
wherein the forming condition ratio a is a value set by a forming condition ratio setting step performed in one or a plurality of cycles,
in the forming condition ratio setting step, a finite element analysis is performed in consideration of conditions including the forming condition ratio a set in the forming condition ratio setting step in a previous cycle or an initial value of the forming condition ratio a, material properties of the member, a shape and a sheet thickness of the metal material sheet, forming conditions in the U-forming step, and forming conditions in the O-forming step to estimate a shape parameter including a strain amount generated in the U-forming step in a direction along the centroid line of the specific three-dimensional tubular portion, a strain amount generated in the O-forming step in the direction along the centroid line of the specific three-dimensional tubular portion, and relative positions of the side end portions, and
the forming condition ratio setting step is repeated until the shape parameter satisfies desired conditions.

7. The die and punch according to claim 6,
wherein the U-forming die and punch has a press forming punch which is the U-forming punch, and a press forming recessed die in which a press forming recessed part corresponding to the press forming punch is formed.

8. The die and punch according to claim 6,
wherein the U-forming die and punch has a bending forming punch which is the U-forming punch, and a bending forming recessed die in which a bending forming recessed part corresponding to the bending forming punch is formed.

9. The die and punch according to claim 6,
wherein the forming condition ratio a changes along the centroid line of the specific three-dimensional tubular portion.

* * * * *